(12) United States Patent
Saito et al.

(10) Patent No.: US 8,184,348 B2
(45) Date of Patent: May 22, 2012

(54) COLOR SEPARATION METHOD AND IMAGE PROCESSING APPARATUS

(75) Inventors: Kazuhiro Saito, Yokohama (JP); Masaomi Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 889 days.

(21) Appl. No.: 12/282,661

(22) PCT Filed: Mar. 12, 2007

(86) PCT No.: PCT/JP2007/054823
§ 371 (c)(1),
(2), (4) Date: Sep. 12, 2008

(87) PCT Pub. No.: WO2007/105683
PCT Pub. Date: Sep. 20, 2007

(65) Prior Publication Data
US 2009/0073474 A1    Mar. 19, 2009

(30) Foreign Application Priority Data

| Mar. 14, 2006 | (JP) | 2006-069604 |
| Apr. 4, 2006 | (JP) | 2006-103402 |
| Apr. 17, 2006 | (JP) | 2006-113379 |
| Feb. 20, 2007 | (JP) | 2007-039555 |

(51) Int. Cl.
*H04N 1/46* (2006.01)
*H04N 1/60* (2006.01)
*G06K 9/00* (2006.01)

(52) U.S. Cl. .......... 358/515; 358/1.9; 382/165; 382/167

(58) Field of Classification Search ............ 358/1.9, 358/515, 518, 520, 523, 3.22, 3.23, 529, 358/522; 382/167, 162, 277, 165
See application file for complete search history.

(56) References Cited

U.S. PATENT DOCUMENTS

| 4,672,432 A * | 6/1987 | Sakurada et al. .......... 358/534 |
| 6,088,122 A * | 7/2000 | Coleman .................... 358/1.9 |

(Continued)

FOREIGN PATENT DOCUMENTS

JP    6-226998    8/1994

(Continued)

OTHER PUBLICATIONS

International Preliminary Report on Patentability, in corresponding PCT/JP2007/054823, dated Sep. 25, 2008.

*Primary Examiner* — Madelein A Nguyen
(74) *Attorney, Agent, or Firm* — Fitzpatrick, Cella, Harper & Scinto

(57) ABSTRACT

In a case wherein a color separation table is prepared, color separation is provided, so that the density characteristic to be output is maintained, and the total colorant amount is not beyond the limit value of the total colorant amount. Further, the optimal color separation is performed while taking into account the colorant amount, and the colorant amount of a light color is adjusted in the entire color range to control granularity and consumption of the colorant amount. A color separation method comprising: a step of calculating the total colorant amount by employing a relationship between a total colorant amount limit value and a colorant amount, that includes a colorant amount for a colorant other than the dark colorant and the light colorant; a step of calculating a density; and a step of employing the total colorant amount and the density to calculate the colorant value signals.

16 Claims, 50 Drawing Sheets

U.S. PATENT DOCUMENTS

| | | |
|---|---|---|
| 6,188,786 B1 | 2/2001 | Ueda et al. |
| 6,435,657 B1 * | 8/2002 | Couwenhoven et al. ....... 347/43 |
| 6,498,910 B2 | 12/2002 | Haneda |
| 6,540,327 B1 | 4/2003 | Akiyama et al. |
| 6,897,988 B1 | 5/2005 | Saito et al. |
| 6,922,197 B2 | 7/2005 | Saito |
| 6,923,523 B2 | 8/2005 | Nishikawa et al. |
| 6,995,881 B2 | 2/2006 | Iida et al. |
| 7,016,530 B2 | 3/2006 | Saito et al. |
| 7,123,391 B2 | 10/2006 | Saito |
| 7,227,552 B1 | 6/2007 | Saito |
| 7,355,750 B2 | 4/2008 | Saito et al. |
| 7,365,890 B2 | 4/2008 | Saito et al. |
| 7,382,493 B2 * | 6/2008 | Takahashi ............... 358/1.9 |
| 7,417,763 B2 | 8/2008 | Saito |
| 7,460,283 B2 | 12/2008 | Saito |
| 7,751,086 B2 * | 7/2010 | Sakaue et al. ................ 358/2.1 |
| 7,791,763 B2 * | 9/2010 | Takahashi et al. ............. 358/1.9 |
| 2002/0021458 A1 | 2/2002 | Saito et al. |
| 2003/0169438 A1 * | 9/2003 | Velde et al. ................ 358/1.9 |
| 2004/0070777 A1 | 4/2004 | Nishikawa et al. |
| 2004/0183814 A1 | 9/2004 | Saito |
| 2005/0052666 A1 * | 3/2005 | Yamamoto et al. ............ 358/1.9 |
| 2005/0275858 A1 | 12/2005 | Fan et al. |
| 2007/0024933 A1 * | 2/2007 | Sakaue et al. ................ 358/521 |
| 2007/0070464 A1 | 3/2007 | Saito |
| 2007/0184372 A1 * | 8/2007 | Itakura et al. ............... 430/45.4 |
| 2007/0247678 A1 * | 10/2007 | Takahashi et al. ............ 358/515 |
| 2008/0165237 A1 * | 7/2008 | Yamauchi et al. ............ 347/102 |
| 2009/0185208 A1 * | 7/2009 | Yoshizawa et al. ............ 358/1.9 |

FOREIGN PATENT DOCUMENTS

| | | |
|---|---|---|
| JP | 9-163161 | 6/1997 |
| JP | 10-98625 | 4/1998 |
| JP | 2001-318499 | 11/2001 |
| JP | 2002-33930 | 1/2002 |
| JP | 2002-152529 | 5/2002 |
| JP | 2002-331708 | 11/2002 |
| JP | 2003-116016 | 4/2003 |
| JP | 2003-230020 | 8/2003 |
| JP | 2004-235989 | 8/2004 |
| JP | 2004-291267 | 10/2004 |

* cited by examiner

COLOR SEPARATION METHOD AND IMAGE PROCESSING APPARATUS

TECHNICAL FIELD

The present invention relates to a color separation method and an image processing apparatus, and relates particularly to color separation performed when an image signal is converted into a signal indicating the amount of a colorant, such as ink or toner.

BACKGROUND ART

One conventional example method for performing color separation of an image signal to obtain a signal for a colorant to be used by a printing apparatus, such as a printer, is shown in FIG. 49.

FIG. 49 is a diagram showing the configuration of an image system that performs color separation. R, G and B represent red, green and blue image signals, respectively. Further, C, M, Y, K, Lc and Lm represent cyan, magenta, yellow, black, light cyan and light magenta signals, respectively. A control unit 4901 performs a predetermined color separation process, and converts image signals R0, G0 and B0 and image signals C0, M0, Y0 and K0, which are received from a personal computer, into data for ink C1, M1, Y1 and K1, which are colorants used, for example, by a printer.

In a color separation process, when R0, G0 and B0 are signals indicating monitor colors, such as sRGB, the signals are processed, so that colors reproduced on the monitor are the same as colors reproduced by an image forming apparatus.

Furthermore, when C0, M0, Y0 and K0 are signals indicating colors reproduced through image printing, the signals are processed, so that colors reproduced through image printing are the same as colors reproduced by the image forming apparatus.

Sequentially, a cyan colorant dark and light separation unit 4902 performs color separation and separates a signal value C1 for a cyan colorant into a colorant value C3, for dark cyan, and colorant value Lc3, for light cyan. Similarly, a magenta colorant dark and light separation unit 4903 performs color separation, and separates a signal value M1, for a magenta colorant, into a colorant value M3, for dark magenta, and a colorant value Lm3, for light magenta.

Through this processing, a color separation table for three inputs of R, G and B and six outputs of C, M, Y, K, Lc and Lm can be prepared (see, for example, patent documents 1, 2 and 3).

In addition, patent document 4 discloses a method whereby a LUT is employed to convert data for four colors, of cyan, magenta, yellow and black, into data for a total of seven colors, dark and light cyan, dark and light magenta, dark and light yellow and black.

However, in the above described process, one-dimensional dark and light color separation is independently performed for cyan and magenta colorants. Therefore, depending on the colorant and the characteristic of a printing medium, the total colorant amount, an total amount for all the colorants, would exceed an amount limit, and image quality would be deteriorated.

That is, in a case wherein the total colorant amount for C, M, Y, K, Lc and Lm exceeds a colorant amount total limit for an electrophotographic printer, for example, an image may not be fixed to a printing medium and may peel off. Further, in a case for an inkjet printer, ink may not be absorbed by a printing medium and may run.

To cope with this, a process for correcting colorant amount is performed.

FIG. 50 is a diagram for explaining the correction of colorant amount, and showing an example relationship between a cyan colorant input amount and cyan dark and light colorant output amount. The horizontal axis represents the cyan colorant input amount, and the vertical axis represents the cyan dark and light colorant output amount.

For a case wherein the total colorant amount (the total for the cyan dark and light colorant output amount) exceeds a limitation value (e.g., A %), the total colorant amount can be decreased simply by reducing the cyan colorant input amount.

However, when a cyan colorant input amount reduction percentage ranges from 80% to 100%, the cyan dark and light colorant amount are, to the contrary, increased. Therefore, when processing is performed to reduce the cyan dark and light colorant amount output, a case may be encountered wherein the cyan colorant input amount must not only be reduced to a value equal to, or smaller, than a limitation value, but to a percentage lower than 80%, at which the total cyan dark and light colorant amount is the largest. At this time, in the above described case wherein one-dimensional color dark and light separation is independently performed, the amount of light ink would be increased, and the density would be reduced.

Further, since the process for correcting the colorant amount is performed separately for cyan and magenta, optimal color separation can not be performed while taking into account the amount of four colorants, cyan, magenta, yellow and black.

Thus, as one problem, granularity and the consumed colorant amount can not be controlled by adjusting the amount of a light colorant across an entire color area.

Furthermore, patent document 4 discloses a method whereby a LUT is employed to convert data for four colors, cyan, magenta, yellow and black, into data for a total of seven colors, dark and light cyan, dark and light magenta, dark and light yellow and black. However, a specific preparation method for the LUT is not described.

Patent Document 1: Japanese Patent Application Laid-Open No. 6-226998

Patent Document 2: Japanese Patent Application Laid-Open No. 9-163161

Patent Document 3: Japanese Patent Application Laid-Open No. 2003-230020

Patent Document 4: Japanese Patent Application Laid-Open No. 10-098625

Patent Document 5: Japanese Patent Application Laid-Open No. 2003-116016

DISCLOSURE OF THE INVENTION

The present invention that is provided reflects this viewpoint, and one objective of the present invention is to provide a table used for performing color separation, so that a density characteristic for output is maintained and a total colorant amount does not exceed a total colorant amount limitation value.

Another objective of the present invention is to provide a method whereby optimal color separation is performed while taking into account the amount of four colorants, cyan, magenta, yellow and black, and granularity and the amount of colorant consumed can be controlled by adjusting the amount of cyan colorant across an entire color area.

Therefore, according to the present invention, a color separation method, which is a process for converting an image signal into signals for colorants to be used by a printing apparatus, colorant value signals that include a colorant value for a dark colorant and a colorant value for a light colorant, said method comprising: a step of calculating a total colorant amount of the dark colorant and the light colorant by employing a relationship between a total colorant amount limitation value and a colorant amount, used by the printing apparatus, that includes a colorant amount for a colorant other than the dark colorant and the light colorant; a step of calculating a density represented by a total of the dark colorant and the light colorant amount; and a step of employing the total colorant amount and the density to calculate the colorant value signals for the dark colorant and the light colorant.

Further, according to the present invention, an image processing apparatus, for preparing a color separation table that is used for a process for converting an image signal into signals for colorants to be used by a printing apparatus, colorant value signals that include a colorant value for a dark colorant and a colorant value for a light colorant, said apparatus comprising: means for calculating a total colorant amount for the dark colorant and the light colorant by employing a relationship between a total colorant amount limitation value and a colorant amount, used by the printing apparatus, that includes a colorant amount for a colorant other than the dark colorant and light colorant; means for calculating a density represented by a total of the dark colorant and the light colorant; and means for employing the total colorant amount and the density to calculate the colorant value signals for the dark colorant and the light colorant.

According to the above described arrangement, based on a density characteristic to be output and the total colorant amount of dark ink and light ink to be output, color separation can be performed for an RGB image signal to obtain colorants, including dark ink and light ink.

As a result, a table can be provided with which color separation is performed, while the density characteristic for the output is maintained and the total color colorant amount limitation value is not exceeded. Further, a table can be provided with which color separation is performed, while smooth four-dimensional gradation and optimization are maintained.

BEST MODES FOR CARRYING OUT THE INVENTION

Figure 1:
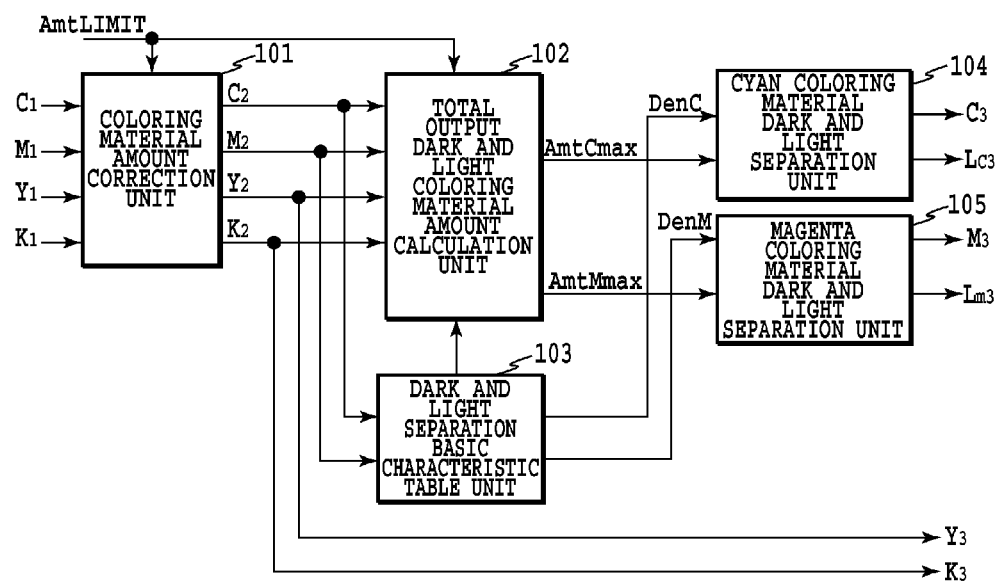
FIG. 1 is a block diagram showing the configuration of an image processing apparatus according to first embodiment of the present invention.

The embodiments according to the present invention will now be described in detail while referring to the drawings.

(First Embodiment)

FIG. 1 is a block diagram showing a configuration for a color separation process according to one embodiment of the present invention. Color separation is performed to convert the colorant values (colorant value signals) for four colorants, which are the C, M, Y and K basic colors, into the colorant values (colorant value signals) for six colorants, C, M, Y, K, Lc and Lm, which includes light colors having the same tone and a low density.

In this drawing, a colorant amount correction unit 101 performs colorant amount correction for C1, M1, Y1 and K1, which are obtained from R, G and B image data of eight bits each, and obtains C2, M2, Y2 and K2, respectively. A well known method is employed for color separation to obtain C1, M1, Y1 and K1 from R, G and B image data. For example, as for grid points on a predetermined line that connects the vertexes of a cube in a RGB space, grid point data (color separation data) are obtained based on the colorimetry value of a patch, and interpolation is performed to obtain the data C1, M1, Y1 and K1.

Since the amount of the colorant should be adjusted in advance by considering, for example, the absorbency of a printing medium of a predetermined area size, the colorant amount correction process is performed, so that the total amount of C, Y, Y and K colorants is equal to or smaller than the colorant amount limitation value (AmtLIMIT), which is the maximum amount of ink that a printing medium of a predetermined area size can absorb. As a result, corrected colorant amount data C2, M2, Y2 and K2 are output. The values of the colorant amount data C2, M2, Y2 and K2 thus corrected are directly output as C3, M3, Y3 and K3.

On the other hand, in a case wherein the total amount of the colorants C, M, Y and K is equal to or smaller than the colorant amount limitation value, the values of data C1, M1, Y1 and K1 are output directly as C2, M2, Y2 and K2. And for the data C2 and M2, a total dark and light colorant output amount calculation unit 102 employs a dark and light separation basic characteristic table unit 103 to calculate a density to be output and the total colorant amount of dark ink (C or M) and light ink (Lc or Lm) to be output. It should be noted that the densities to be output are defined as DenC and DenM, and the total colorant amount are defined as AmtCmax and AmtMmax.

Based on the AmtCmax and the DenC obtained by 102 and 103, a cyan colorant dark and light separation unit 104 performs color dark and light separation in accordance with a map that will be described later, and obtains color separation data C3 for cyan ink and color separation data Lc3 for light cyan ink. Similarly, based on the AmtMmax and the DenM obtained by 102 and 103, a magenta colorant dark and light separation unit 105 performs color dark and light separation in accordance with a map that will be described later, and obtains color separation data M3 for magenta ink and color separation data Lm3 for light magenta ink.

Figure 2:
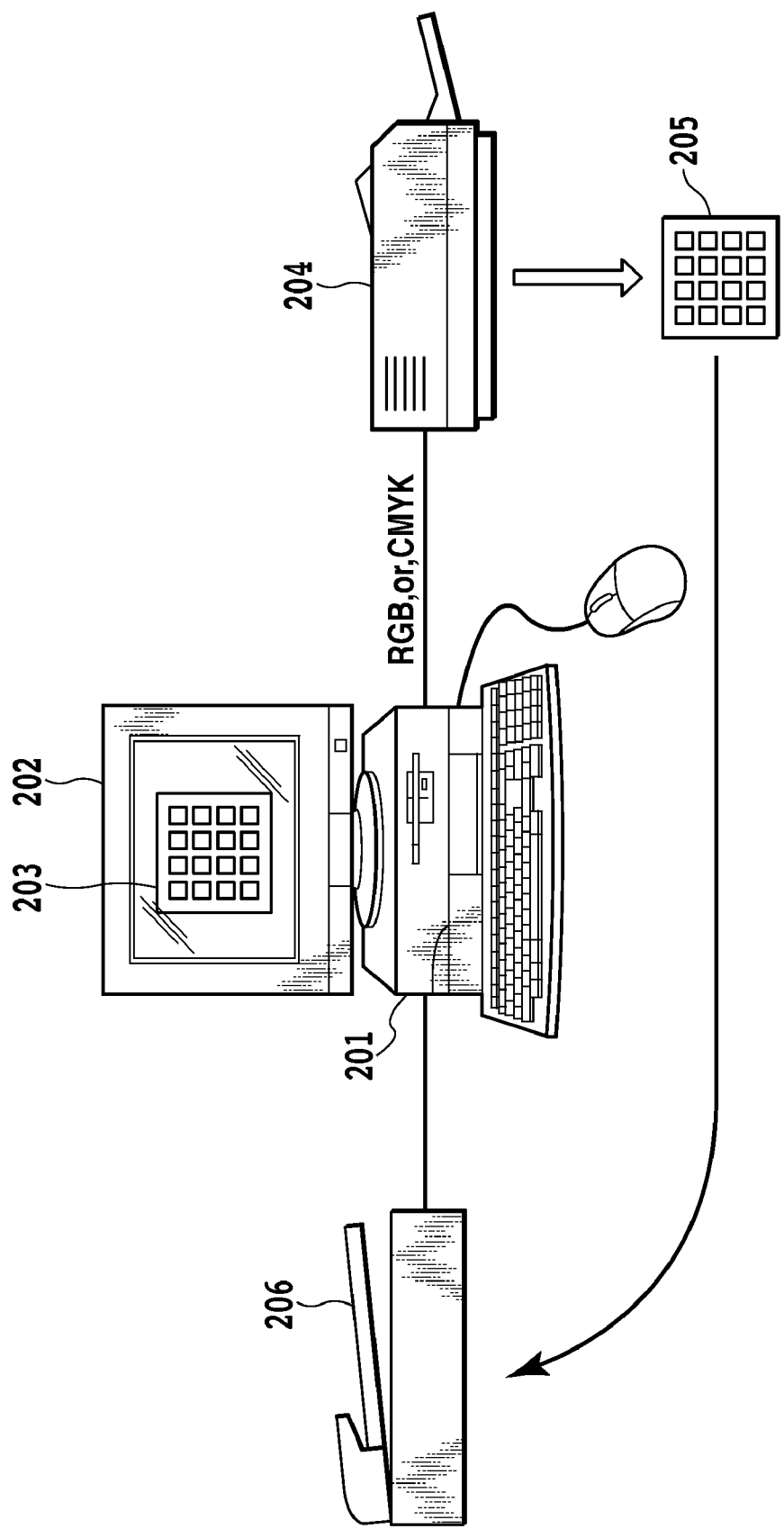
FIG. 2 is a block diagram showing the configuration of a printing system according to first embodiment of the present invention.

FIG. 2 is a block diagram showing the arrangement of a printing system according to first embodiment of the present invention, which is a system that includes a printing apparatus, such as a printer that serves as the image processing apparatus shown in FIG. 1.

In FIG. 2, a computer 201, such as a personal computer, and a display device, such as a monitor, together serve as a host for a printing apparatus 204, such as a printer. That is, in order to permit the printer 204 to print images displayed on the monitor 202, the computer 201 holds image data for printing, and supplies the image data to the printer 204 for printing.

Furthermore, the computer 201 holds patch data for examining the characteristic of a printer, and stores a driver, etc., for printing the patch data using the printer 204. A patch pattern 203 can be displayed on the monitor 202 to examine the characteristic of the printer. Also, a user interface (UI) screen, generated by a driver, can be displayed in order to permit a user to enter various setups. Based on the various setups that are entered, a sample patch 205 output by the printer 204 is measured by a colorimetry device 206, such as a scanner.

Figure 3:
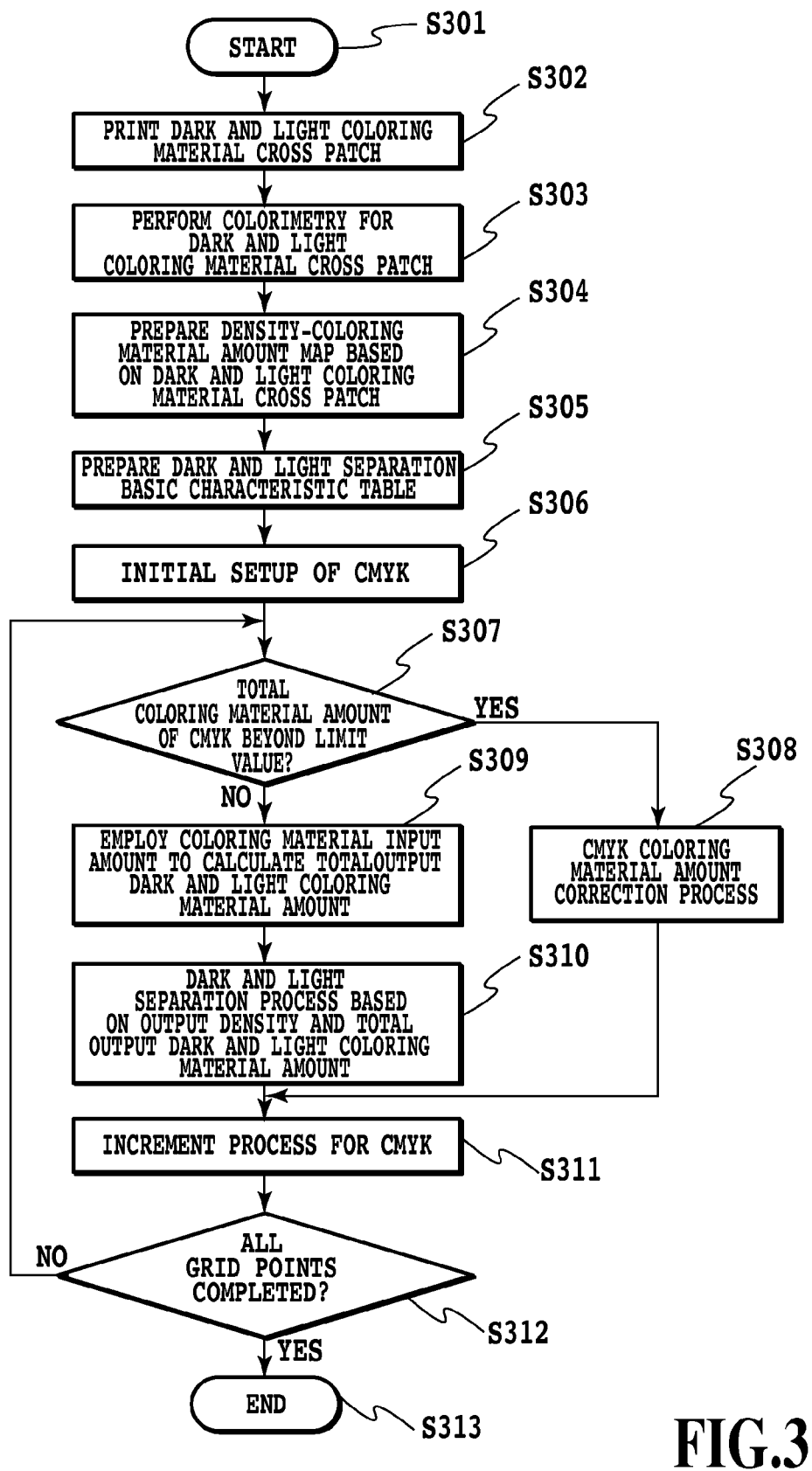
FIG. 3 is a flowchart showing the color separation processing performed for first embodiment of the present invention.

FIG. 3 is a flowchart showing the processing performed by the image processing apparatus to separate the colorant values for four colorants, which are the four basic colors C, M, Y and K, into the colorant values for six colors, including light colors, i.e., C, M, Y, K, Lc and Lm.

Step S301 is a start step, and preparation of a 46 conversion color separation table, used for the color separation of four colorants into six colorants, is started.

Step S302 is a step of printing a cross patch for colorant dark and light.

Figure 4:
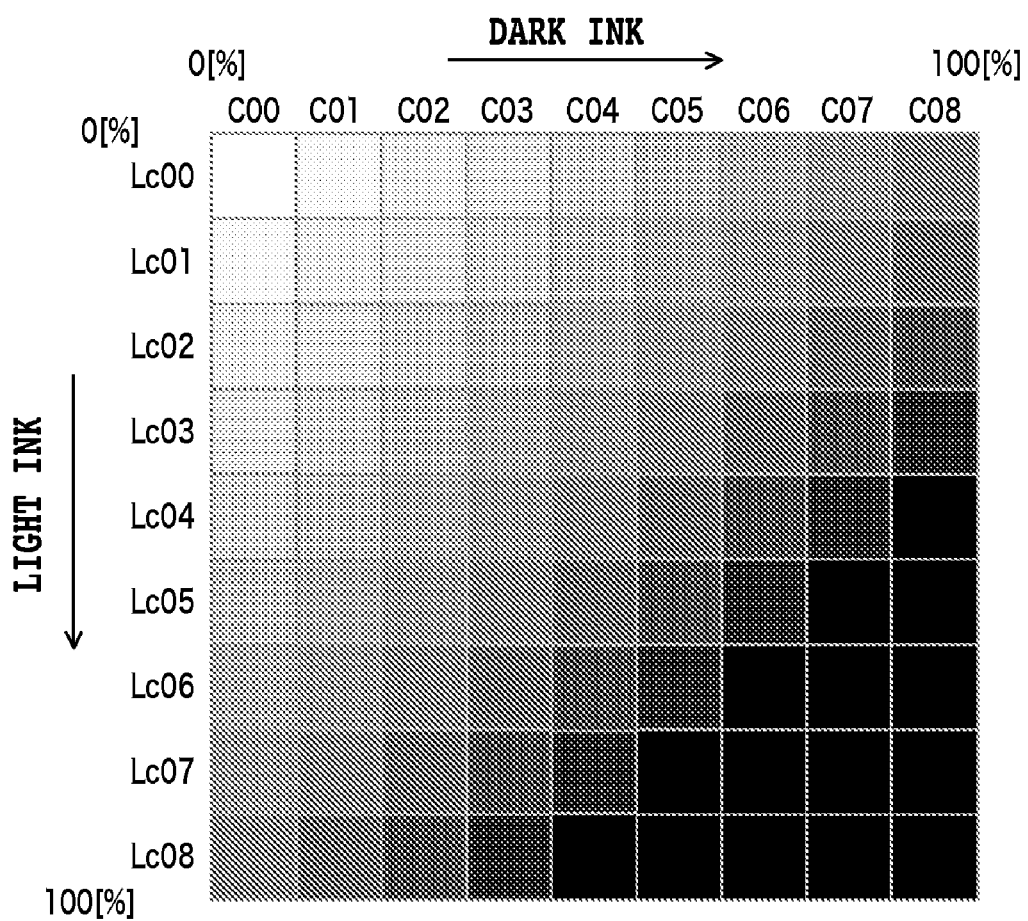
FIG. 4 is a diagram showing a cross patch example according to first embodiment of the present invention.

A cross patch example printed at step S302 is shown in FIG. 4. As shown in this drawing, transversely, from the left to the right, the colorant amount of dark ink is gradually increased from 0% to 100%. And vertically, from the top to the bottom, the colorant amount of light ink is gradually increased from 0% to 100%.

At step S303, colorimetry is performed for the cross patch printed at step S302, and the density characteristic of the dark colorant is obtained. And at step S304, a map showing the density characteristic and the colorant amount characteristic is prepared based on the colorimetry results obtained for the cross patch.

Figure 5:
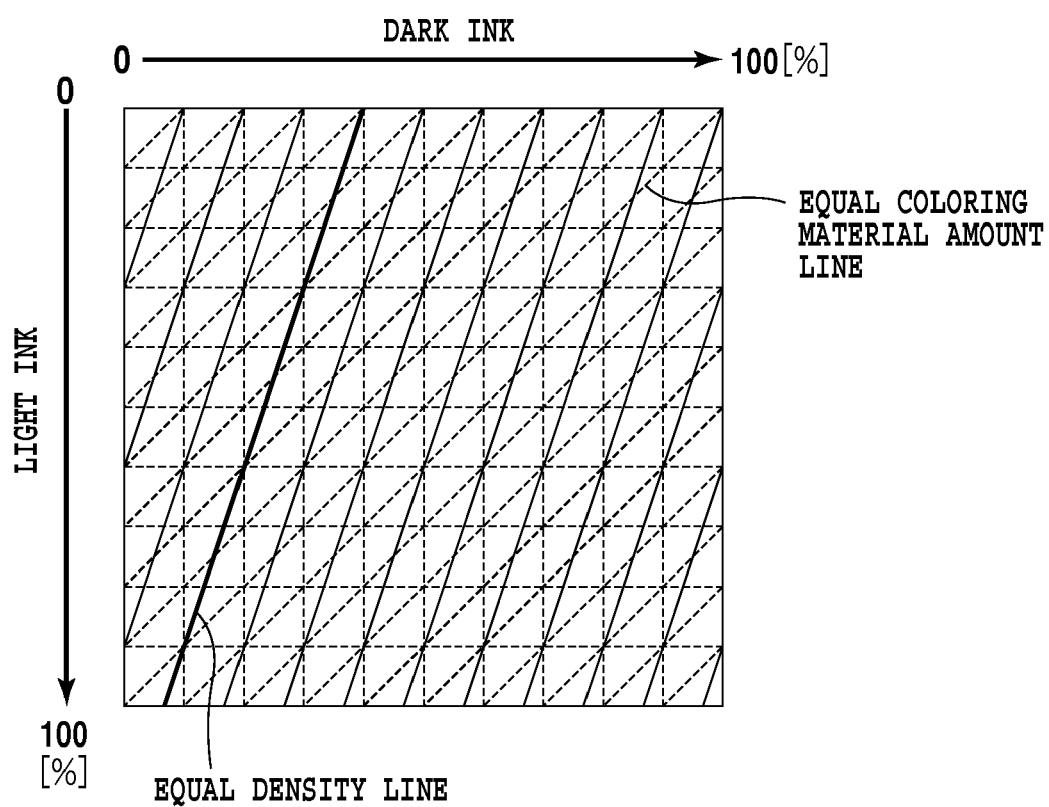
FIG. 5 is a diagram showing a map according to first embodiment of the present invention.

FIG. 5 is a diagram showing an example map prepared at step S304. The horizontal axis represents the density of dark ink, the vertical axis represents the density of light ink, points at which the colors reproduced by a combination of dark ink and light ink having the same density are connected, and this line is defined as an equal density line. Further, points at which the total ink amount (the colorant amount) of dark ink and light ink is the same are connected, and this line is defined as an equal colorant amount line.

Step S305 is a process for creating a color dark and light separation, basic characteristic table. As explained by referring to FIG. 1, the color dark and light separation, basic characteristic table is a basic table used by the total dark and light colorant output quality calculation unit to calculate a density to be output and the total colorant amount of dark ink (C or M) and light ink (Lc or Lm) to be output.

The color dark and light separation, basic table defines colorant amount data (0% to 100%) for dark ink to be entered in the table, and a colorant amount characteristic (C, Lc, M, Lm or Y).

In FIGS. 6 to 9, tables are shown that each define an example relationship between colorant amount data for dark ink, to be entered in the color dark and light separation table, and colorant output amount characteristics. For the tables, the horizontal axis represents a colorant input amount to be entered in the table, and the vertical axis represents a colorant output amount to be output based on the table. These tables show a relationship between colorant input amount data for dark cyan ink, relative to the colorant amount of dark cyan, and the colorant amount of light cyan to be output. However, the same tables are applied for a relationship between colorant input amount data for dark magenta ink, relative to the colorant amount of dark magenta, and the colorant amount of light magenta to be output.

Figure 6:
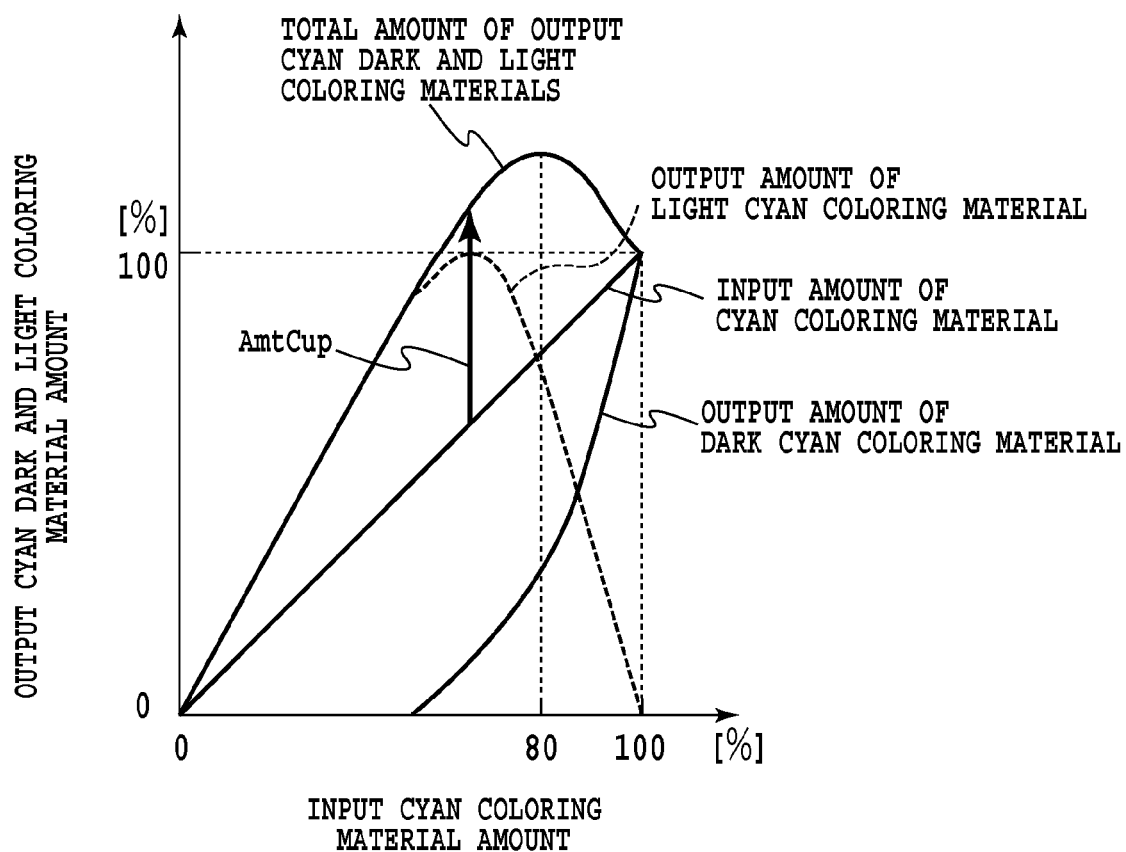
FIG. 6 is a diagram showing a basic table example for color dark and light separation according to first embodiment of the present invention.
Figure 7:
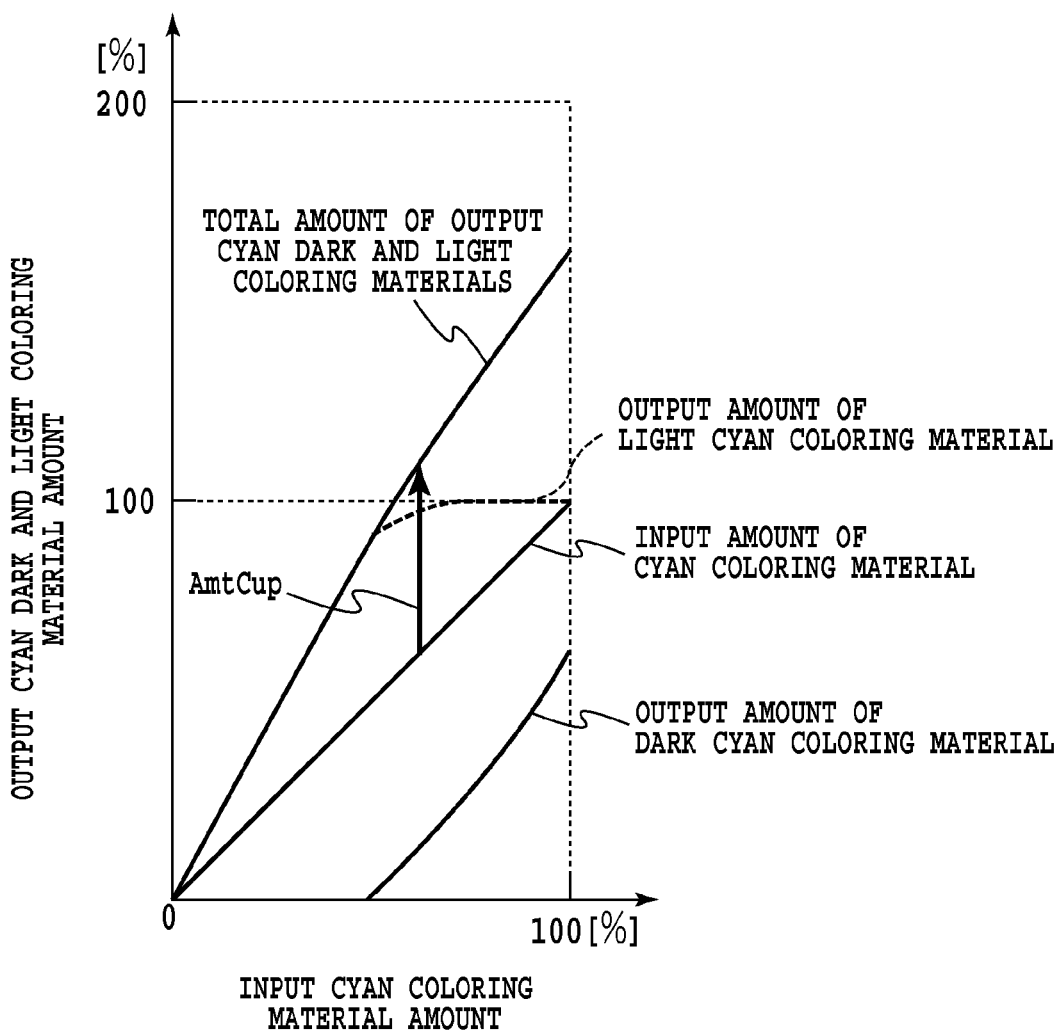
FIG. 7 is a diagram showing the basic table example for color dark and light separation according to first embodiment of the present invention.

In the tables in FIGS. 6 and 7, the relationship shown is that the density characteristic reproduced using dark and light colorants to be output is equal to the density characteristic of a colorant input amount. On the other hand, in the tables in FIGS. 8 and 9, the relationship shown is the case presented in FIG. 10, i.e., that the density characteristic reproduced using dark and light colorants to be output is greater than the density characteristic of a colorant input amount.

While referring to FIG. 6, a characteristic that can be extracted is that when the total cyan dark and light colorant output amount, i.e., the total of the light cyan colorant output amount and the dark cyan colorant output amount, reaches the maximum when the cyan colorant input amount is 80%, and is thereafter reduced. That is, in this table, within a range in which the value of cyan colorant input amount data is small, the colorant amount of the light cyan ink output is greater than the colorant amount of the dark cyan ink 1 output. And a colorant amount characteristic that can be extracted is that when the cyan colorant input amount is equal to or greater than 80%, the colorant output amount of dark cyan ink is greater than the colorant output amount of light cyan ink. Therefore, this dark and light separation, basic characteristic table enables the performance, for a specific period, of color separation for light cyan ink being dominant over dark cyan ink.

While referring to FIG. 7, a characteristic that can be extracted is that as the cyan colorant input amount is increased, the total cyan dark and light colorant output amount is monotonously increased. Also, a colorant amount characteristic that can be extracted is that the light cyan colorant input amount is always greater than the dark cyan colorant input amount. Therefore, this dark and light separation, basic characteristic table enables the performance of color separation for light cyan ink being dominant over dark cyan ink. Another characteristic that can be extracted is that as the cyan colorant input amount is increased, the total cyan dark and light colorant output amount is monotonously increased.

Figure 8:
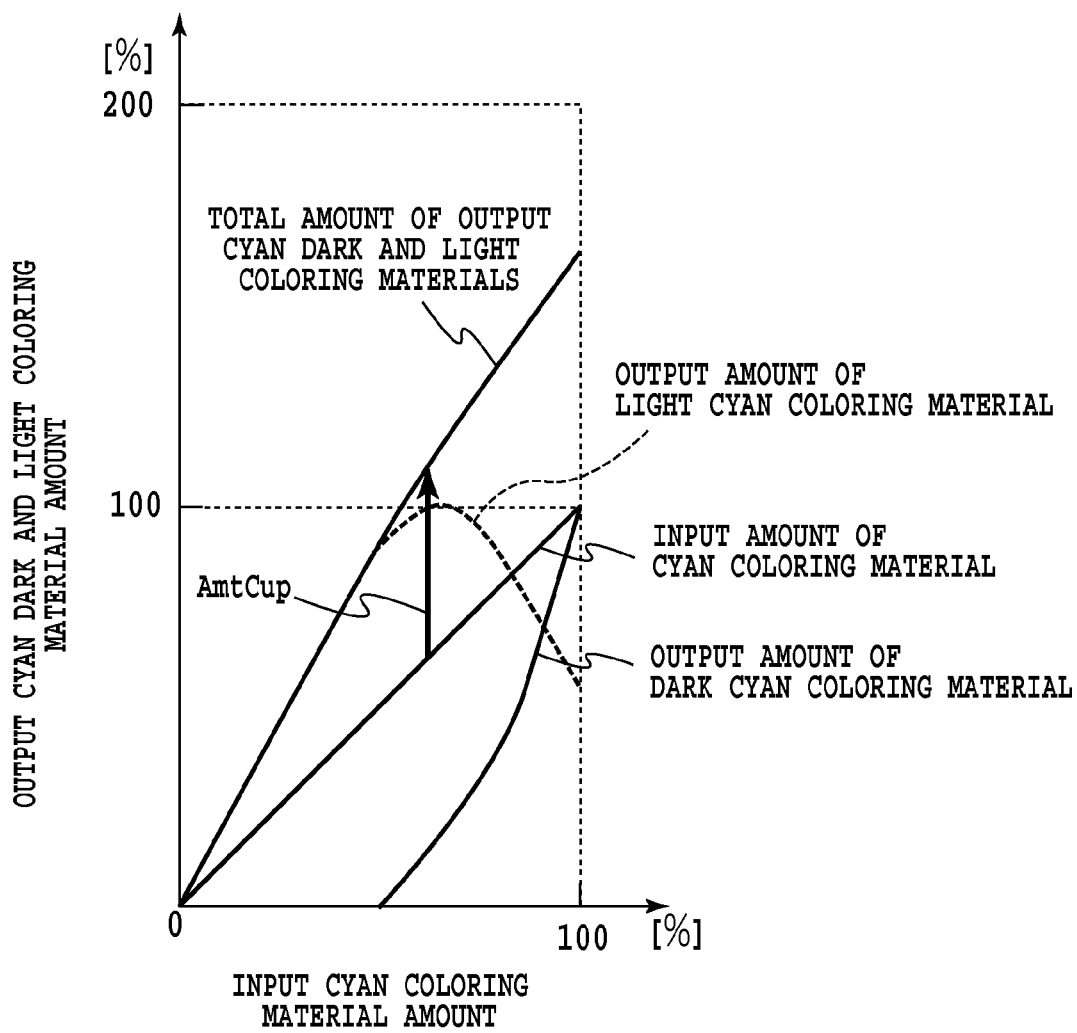
FIG. 8 is a diagram showing a basic table example for color dark and light separation according to first embodiment of the present invention.

FIG. 8 shows a characteristic such that, as the input cyan colorant amount is increased, the total cyan dark and light colorant output amount is monotonously increased. According to this table, in the range wherein the value of input cyan colorant data is small, the colorant amount of light cyan ink output is greater than the colorant amount of dark cyan ink output. And a colorant amount characteristic extracted is that, when the cyan colorant amount input is increased, the colorant amount of dark cyan ink output is greater than the colorant amount of light cyan ink output. Therefore, according to the dark and light separation basic characteristic table, color separation can be performed in a manner such that light cyan ink is dominant over dark cyan ink on the highlighted side, and as the density is increased, dark cyan ink is dominant over light cyan ink.

Figure 9:
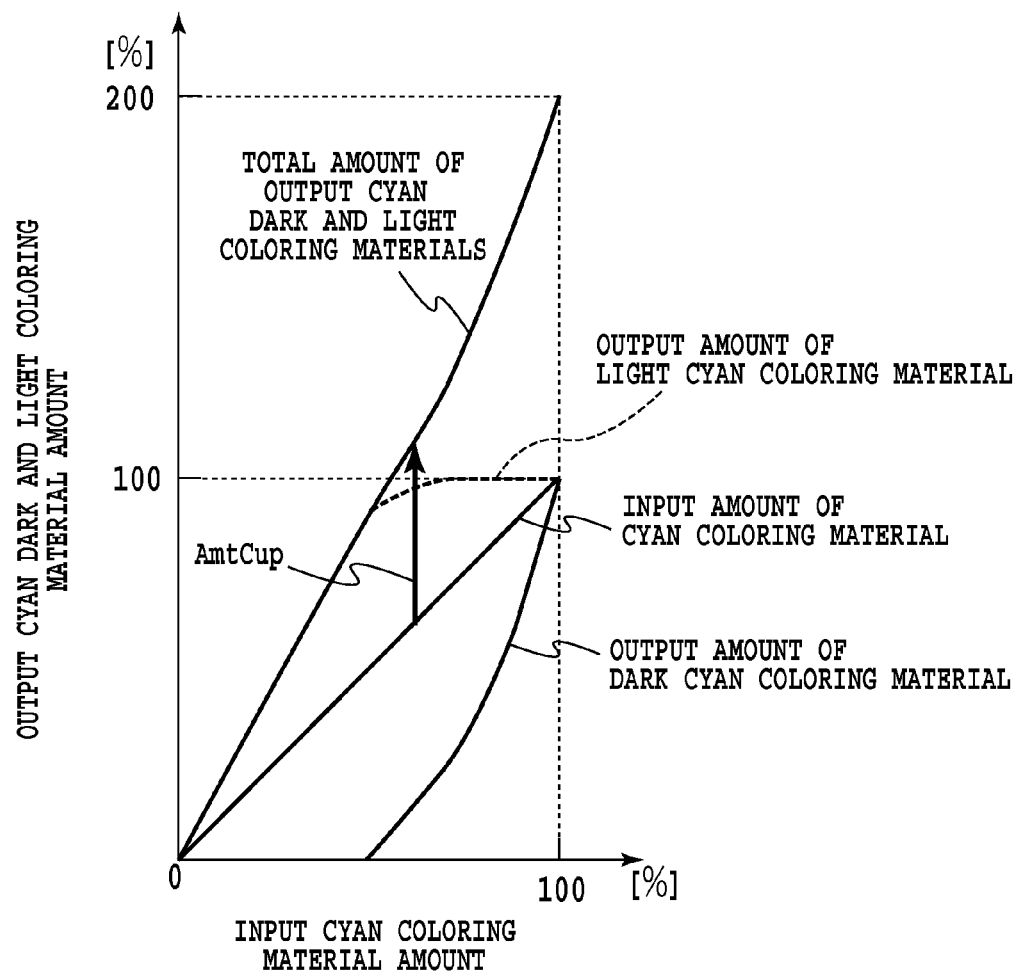
FIG. 9 is a diagram showing the basic table example for color dark and light separation according to first embodiment of the present invention.

FIG. 9 shows a characteristic such that as the cyan colorant input amount is increased, the total cyan dark and light colorant output amount is monotonously increased. According to this table, the colorant amount of light cyan ink output is always greater than the colorant amount of dark cyan ink output. Therefore, according to the dark and light separation basic characteristic table, color separation can be performed in a manner such that light cyan ink is dominant over dark cyan ink on the highlighted side, and as the density is increased, dark cyan ink is dominant over light cyan ink.

On the high density side, dark cyan ink is used, up to 100%.

Figure 10:
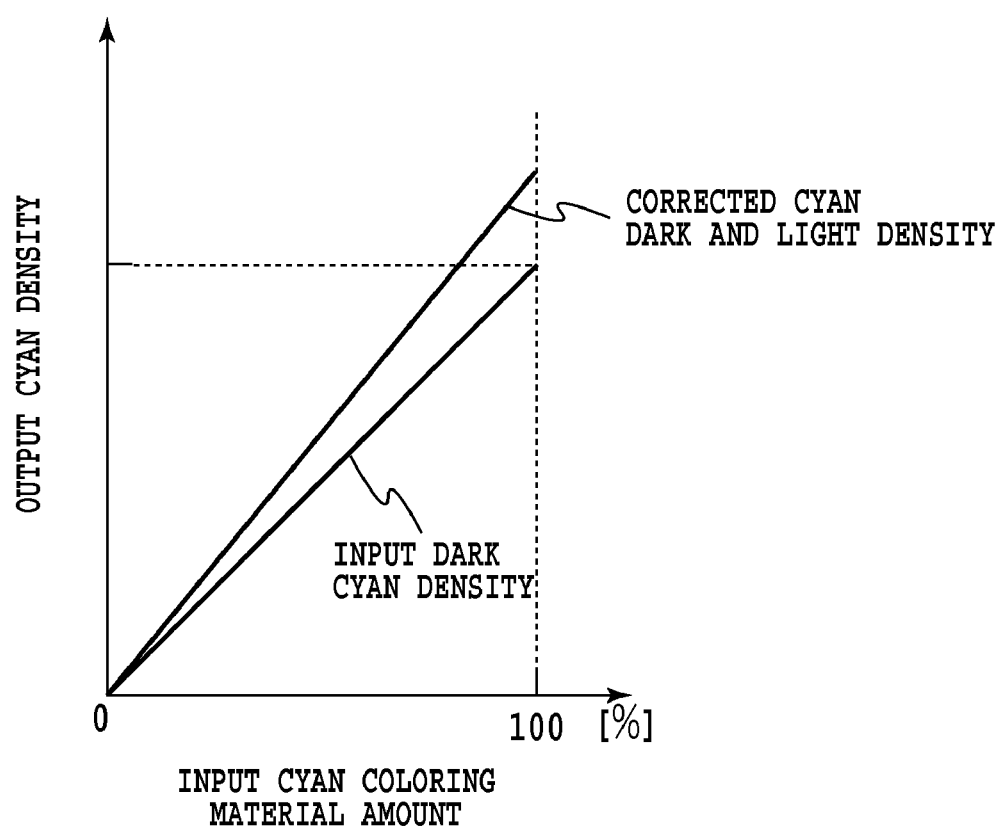
FIG. 10 is a diagram showing a density characteristic table according to first embodiment of the present invention.

FIG. 10 is a table showing an input/output density characteristic, extracted from the dark and light separation basic characteristic tables in FIGS. 8 and 9 that represent the relationship between the output density characteristic and the colorant amount characteristic. The horizontal axis represents a cyan colorant input amount, and the vertical axis represents the cyan density output.

It is understood that the cyan output density is higher for a corrected dark and light cyan density, which is used in a case where color separation is performed to obtain dark and light ink, rather than the dark cyan density input that is used in a case where color separation is not performed to obtain dark and light ink. Therefore, in a case wherein color separation is performed using this dark and light separation, basic characteristic table, a color reproduction range to be output can be expanded.

Referring to FIG. 3 again, step S306 is a process for performing the initial setup of C, M, Y and K to determine C, M, Y and K ink values at the individual grill points. In this embodiment, the grill points form eleven grid cells at an interval of 10% each, from 0% to 100%, and the values of the total number of 11×11×11=14641 grill points are obtained.

For the initial setup, at step S306, the grid points for C, M, Y and K are defined as 0%.

Step S307 is a process for determining whether the total colorant amount for C1, M1, Y1 and K1, obtained by converting R, G and B, is greater than the limited amount. In a case wherein the limited amount is exceeded, the C, M, Y and K colorant amount correction process at step S308 is performed, and program control advances to step S311. That is, in a case wherein the limited amount is exceeded, the total colorant amount for C, M, Y and K is reduced to the limited amount, and since color separation need not be performed for Lc and Lm, program control advances to step S311. In a case wherein the limited amount is not exceeded, C1=C2, M1=M2, Y1=Y2 and K1=K2, without having to perform step S308, and program control advances to step 309.

Step S308 is a process during which the colorant amount correction unit in FIG. 1 performs the C, M, Y and K colorant amount correction. Here, AmtLIMIT denotes the total colorant amount limit value, and Amt (C, M, Y, K) denotes the total colorant amount for C, M, Y and K. Coloring material amount C2, M2, Y2 and K2, obtained after the colorant amount correction, are respectively $$C2=C1\times((\text{AmtLIMIT}-\text{Amt}(0,0,0,K1))/\text{Amt}(C1,M1,Y1,0))$$

$$M2=M1\times((\text{AmtLIMIT}-\text{Amt}(0,0,0,K1))/\text{Amt}(C1,M1,Y1,0))$$

$$Y2=Y1\times((\text{AmtLIMIT}-\text{Amt}(0,0,0,K1))/\text{Amt}(C1,M1,Y1,0))$$

$$K2=K1.$$

As a result, while maintaining the colorant amount for K, the total colorant amount that exceeds the colorant amount limit value can be reduced in consonance with the ratio of the colorant amount of C, M and Y. The output values of C2, M2, Y2 and K2 are input as grid point data.

Step S309 is a process during which the total dark and light colorant output amount calculation unit 102 in FIG. 1 employs the dark and light separation, basic characteristic table unit 103 to calculate the total dark and light colorant amount (AmtCmax or AmtMmax), based on the colorant input amount.

During this process, the total colorant amount of a dark colorant and a light colorant are calculated using the total colorant amount limit value and the amount of a colorant, other than dark and light colorants of a target color.

Here, AmtCup denotes an increasable amount of a cyan colorant, and AmtMup denotes an increasable amount of a magenta colorant. That is, AmtCup and AmtMup are values indicating how much the total colorant amount, after color separation, will be increased relative to the colorant amount before color separation. As shown in FIGS. 6 to 9, AmtCup and AmtMup are respectively $$\text{AmtCup}=\text{total cyan dark and light colorant output amount}-\text{cyan colorant input amount}$$

$$\text{AmtMup}=\text{total magenta dark and light colorant output amount}-\text{magenta colorant input amount}.$$

And AmtCmax and AmtMmax are respectively $$\text{AmtCmax}=(\text{AmtLIMIT}-\text{Amt}(C2,M2,Y2,K2))\times(\text{AmtCup}/(\text{AmtCup}+\text{AmtMup}))+\text{Amt}(C2,0,0,0)$$

$$\text{AmtCmax}=(\text{AmtLIMIT}-\text{Amt}(C2,M2,Y2,K2))\times(\text{AmtCup}/(\text{AmtCup}+\text{AmtMup}))+\text{Amt}(0,M2,0,0)$$

Furthermore, in a case wherein is employed the color dark and light separation basic table related to the output, as shown in FIGS. 8 and 9, a table in FIG. 10 that indicates the input/output density characteristic is employed. That is, in a case wherein the tables in FIGS. 8 and 9 are used, the input/output density characteristic differs. Thus, the cyan output density (DenC) is employed as the corrected cyan dark and light density shown in FIG. 8. Similarly, the magenta output density (DenM) is used as the magenta dark and light density.

Step S310 is a process for performing dark and light separation based on the output density and the total dark and light colorant output amount by using the map, prepared at step S304, that represents the density characteristic and the colorant amount characteristic. By referring to the map, and based on AmtCmax and DenC, C2 is separated to obtain C3 and Lc3. That is, values of dark and light ink are determined by detecting the equal colorant amount line consonant with AmtCmax, and the equal density line consonant with DenC. Similarly, based on AmtMmax and DenM and by referring to the map, M2 is separated to obtain M3 and Lm3. The values C3, M3, Y3, K3, Lc3 and Lm3, including values output by referring to the map, are input as grid point data.

Step S311 is a process for incrementing C, M, Y and K in order to determine an ink value for the next grid point.

In this embodiment, incrementation by 10% is performed.

Step S312 is a process for determining whether an ink value has been decided for all the grid points in the 46 conversion table. When the process has not been completed for all the grid points, the process from steps S307 to S311 is repeated.

In a case wherein it is determined at step S312 that the ink value has been decided for all the grid points, at step S313, the 46 conversion table preparation processing is terminated.

As explained above, in this embodiment, the dark and light separation process is performed based on the density characteristic to be output and the total dark and light colorant amount. Therefore, a remarkable reduction in density, which conventionally occurs when the total colorant amount is below the limit value, can be removed. Further, in the conventional art, since only a one-dimensional dark and light separation table of cyan and magenta is employed to convert four-dimensional input CMYK data into six-dimensional data, there is a problem in that acquisition of smooth, optimal four-dimensional gradation is not ensured. However, in this embodiment, a surplus value relative to the total colorant amount limit value (AmtLIMIT) is divided in accordance with the ratio of the increasable amount (AmtCup and AmtMup) of cyan and magenta colorants, and the total dark and light colorant output amount is obtained. And based on the results, the 46 conversion table is calculated. Thus, optimal color separation can be performed while taking into account the colorant amount of the four colors cyan, magenta, yellow and black.

(Modification of First Embodiment)

Figure 11:
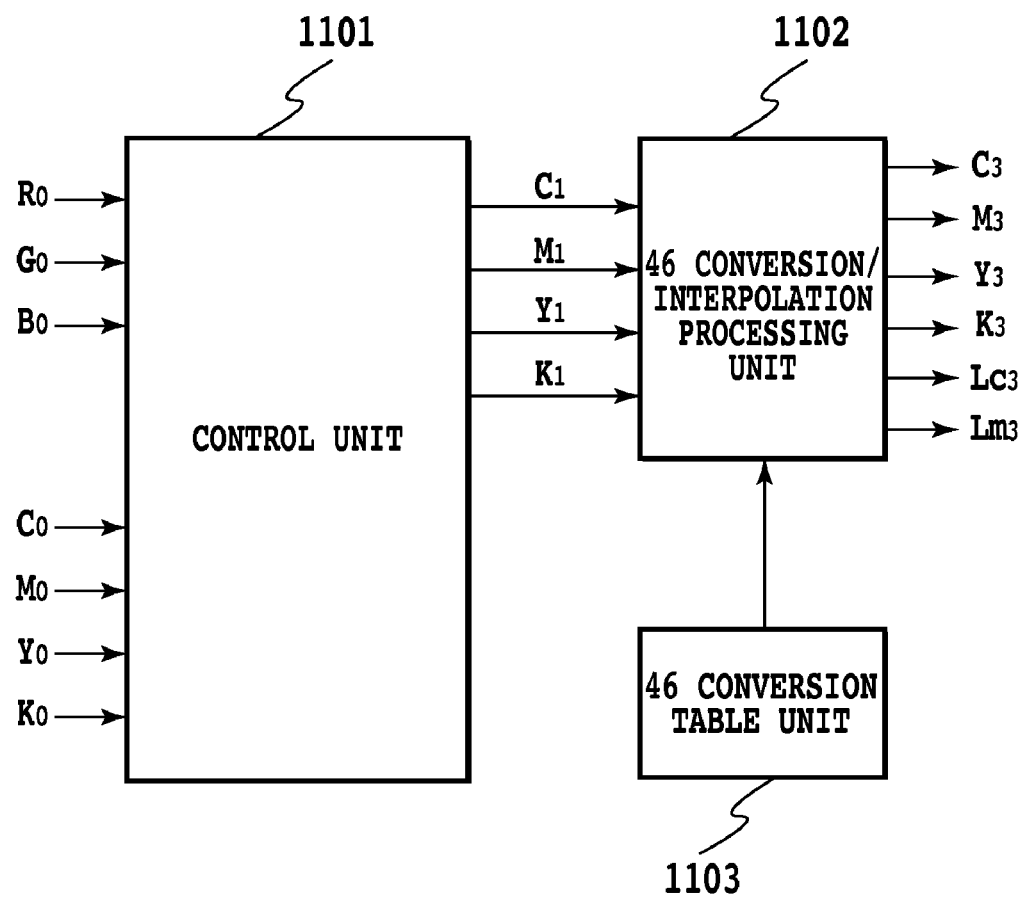
FIG. 11 is a block diagram showing the configuration of another image processing apparatus according to first embodiment of the present invention.

In the above embodiment, an explanation has been given for the color separation method using the color dark and light separation, basic characteristic tables. This embodiment is not limited to this, and as shown in FIG. 11, a 46 conversion table unit 1103 may be provided for the processing. That is, the processing performed for this embodiment is prepared as a table, and a control unit 1101 converts input data for R0, G0 and B0 or data for C0, M0, Y0 and K0 into C1, M1, Y1 and K1. And a 46 conversion/interpolation processing unit 1102 employs the 46 conversion table unit 1103 to perform the processes at steps S301 to S313 in FIG. 3. Color separation may be performed in this manner.

Figure 12:
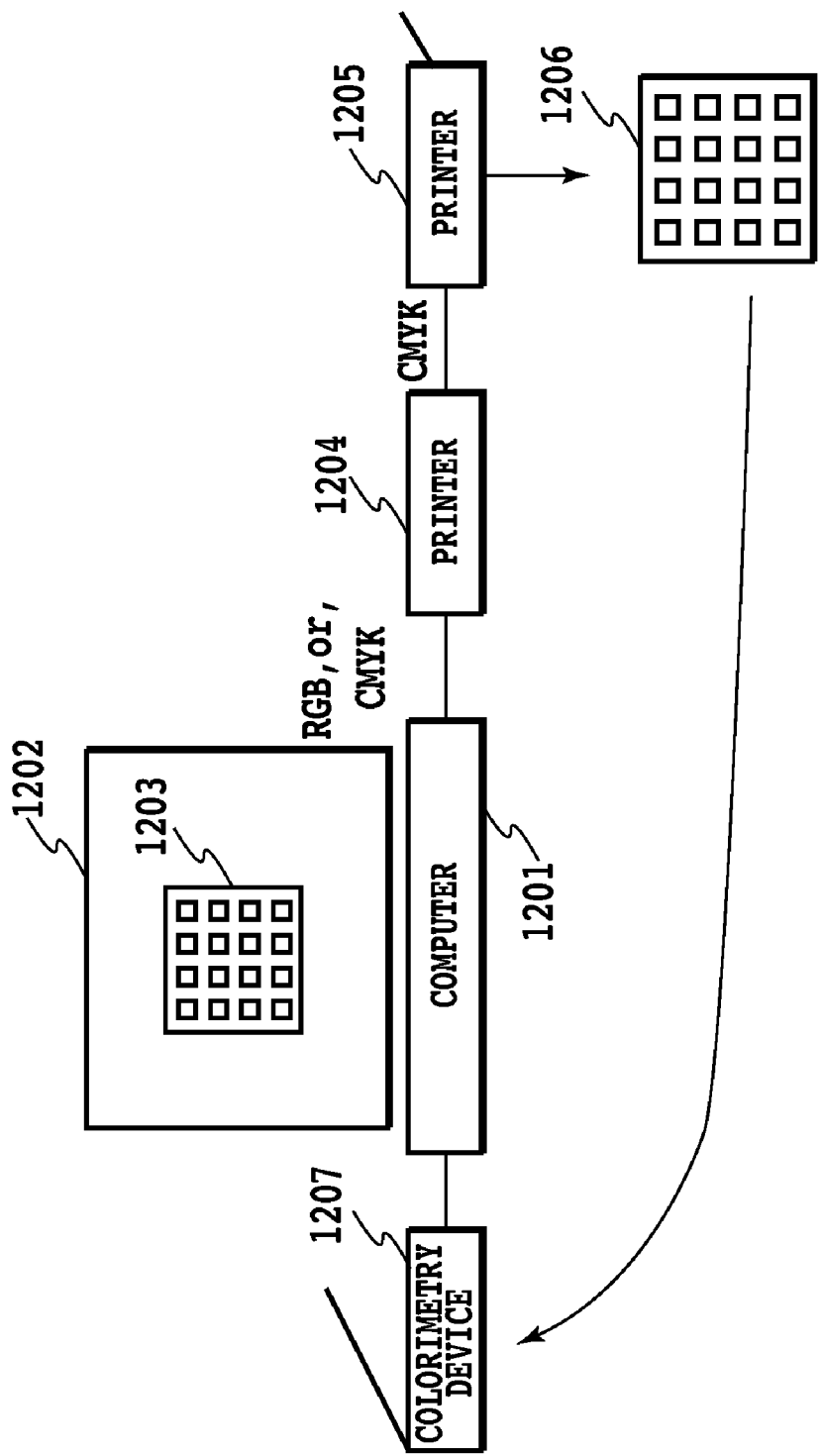
FIG. 12 is a block diagram showing the configuration of another printing system according to first embodiment of the present invention.

Further, this embodiment is not limited to the arrangement shown in FIG. 2 that employs the printer 204 that incorporates the control unit 1101, and may employ the arrangement shown in FIG. 12. That is, an embodiment wherein a controller 1204 is located between the computer 1201 and the printer 1205 may be employed via a network (not shown), etc. Or, an embodiment wherein the function of the control unit in FIG. 11 is incorporated in a computer or is performed by software may be employed.

In addition, the image forming apparatus, for which the color separation processing apparatus and method of this embodiment are applied, may be an inkjet printer, an electrophotographic printer, or a heat sublimation type printer.

That is, so long as a system employs colorants such as light cyan and light magenta in addition to the four basic colors cyan, magenta, yellow and black, the system can be used by any type of image forming apparatus.

Furthermore, in this embodiment, an explanation has been given by using a colorant system that employs cyan and magenta as light colorants. However, the light colorants are not limited to these, and the system can also be applied for an image forming apparatus that employs light yellow and light black colorants.

In this embodiment, an explanation has been given for a case wherein ink is a colorant. The present invention is not limited to ink, and can also be applied for another colorant, such as toner.

Figure 13:
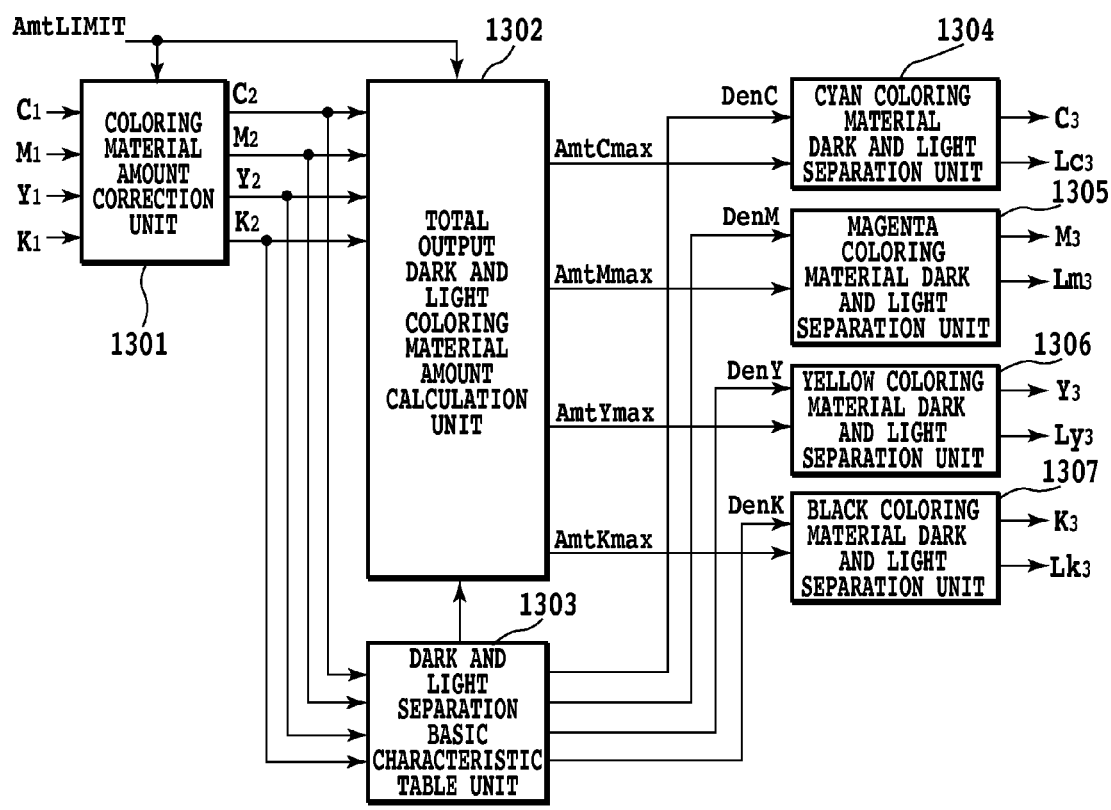
FIG. 13 is a block diagram showing the configuration of an additional image processing apparatus according to first embodiment of the present invention.

Further, in this embodiment, a configuration example is employed by performing color separation for a four basic colorant system of cyan, magenta, yellow and black to obtain a six colorant dark and light system that includes light cyan and light magenta colorants. However, the present invention is not limited to this, and an apparatus configuration shown in FIG. 13 may be employed to perform color separation for four basic colorants to obtain eight dark and light colorants.

That is, an example apparatus arrangement may also be available to perform color separation to change a basic four colorant system of cyan, magenta, yellow and black into an eight dark and light colorant system that includes light cyan, light magenta, light yellow and light black colorants.

In this drawing, reference numeral 1301 denotes a colorant amount correction unit, which performs a colorant amount correction process so that colorant amount data for C1, M1, Y1 and K1 become equal to or lower than a colorant amount limit value (AmtLIMIT), and which outputs colorant amount data for cyan C2, magenta M2, yellow Y2 and black K2. Reference numeral 1302 denotes a total dark and light colorant output amount calculation unit, which employs a dark and light separation, basic characteristic table unit 1303, and calculates a total dark and light colorant amount for each of the cyan, magenta, yellow and black colorants. Reference numeral 1303 denotes a dark and light separation, basic characteristic table unit, in which a basic colorant amount for each dark and light, used to perform dark and light separation, and an output density characteristic, obtained after dark and light separation, are stored for the individual colors.

Reference numeral 1304 denotes a cyan colorant, dark and light separation unit, which performs dark and light separation based on the cyan output density (DenC) received from the dark and light separation, basic characteristic table unit 1303, and the total cyan dark and light colorant amount (AmtCmax), received from the total dark and light colorant output calculation unit 1302. And cyan C3 and light cyan Lc3 are output. Similarly, reference numeral 1305 denotes a magenta colorant, dark and light separation unit, which performs dark and light separation based on the magenta output density (DenM) and the total magenta dark and light colorant amount (AmtMmax), and outputs magenta M3 and light magenta Lm3.

Likewise, reference numeral 1306 denotes a yellow colorant, dark and light separation unit, which performs dark and light separation based on the yellow output density (DenY) and the total yellow dark and light colorant amount (AmtYmax) and outputs yellow Y3 and light yellow Ly3.

Also, reference numeral 1307 denotes a black colorant, dark and light separation unit, which performs dark and light separation based on the black output density (DenK) and the total black dark and light colorant amount (AmtKmax), and outputs black K3 and light black Lk3.

Detailed processing is performed by referring to the flowchart in FIG. 3. This embodiment employs only the case for light cyan and light magenta. However, in a case for additionally employing light yellow and light black colorants, parameters corresponding to cyan yellow and light black are added to the expressions employed at step S309 and step S310.

In addition, in the embodiment described above, color separation has been performed employing a density as a characteristic for the reproduction of a colorant amount. However, the present invention is not limited to this, and color separation may be performed using a value, such as a brightness and a luminance, or a CIE Lab value.

(Second Embodiment)

In first embodiment, to perform dark and light color separation, the total dark and light colorant output amount calculation unit 102 has employed the one-dimensional dark and light separation basic characteristic table unit 103, and calculated a density to be output and the total colorant amount of dark ink and light ink to be output. However, the present invention is not limited to this, and a three-dimensional dark and light separation basic characteristic table may be prepared to perform dark and light color separation.

Figure 14:
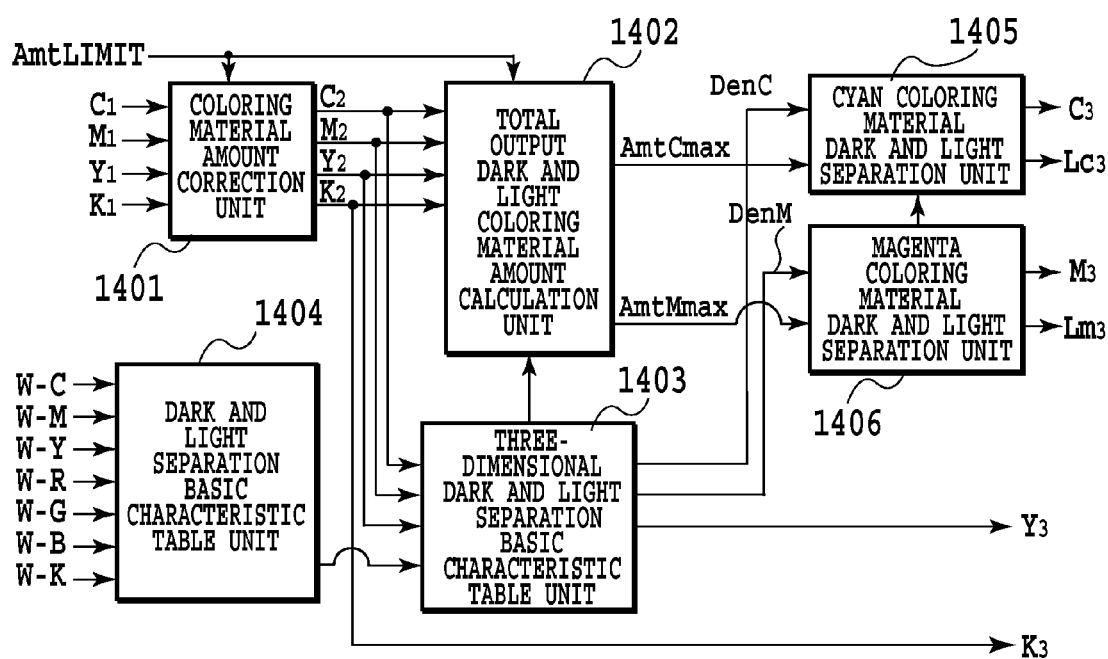
FIG. 14 is a block diagram showing the configuration of an image processing apparatus according to second embodiment of the present invention.

FIG. 14 is a block diagram showing a configuration for performing a color separation process according to second embodiment of the present invention. Color separation is performed to convert the colorant values for four colorants, which are the basic colors of C, M, Y and K, into the colorant values for six colorants, C, M, Y, K and Lc and Lm, including light colors.

In this drawing, a colorant amount correction unit 1401, as well as the colorant amount correction unit 101 in FIG. 1 for first embodiment, performs colorant correction for C1, M1, Y1 and K1, which are obtained based on R, G and B image data of eight bits each, and provides C2, M2, Y2 and K2.

That is, the colorant correction process is performed, so that the total colorant amount for C, M, Y and K is equal to or smaller than a colorant amount limit value (AmtLIMIT) that is the maximum amount of ink a printing medium of a predetermined area size can absorb, and corrected colorant amount data C2, M2, Y2 and K2 are output.

In this embodiment, as for data C2 and M2, a total dark and light colorant output amount calculation unit 1402 employs a three-dimensional dark and light separation, basic characteristic table unit 1403, and calculates a density to be output and the total colorant amount of dark ink (C or M) and light ink (Lc or Lm) to be output. As for data Y2, Y3, output is based on the yellow input/output characteristic that is defined in the three-dimensional dark and light separation basic characteristic table unit 1403. Data K2 is output as K3 without being processed.

Here, the three-dimensional dark and light separation, basic characteristic table unit 1403, which is to be prepared at S1506 in FIG. 15, which will be described later, is provided using a one-dimensional dark and light separation, basic characteristic table unit 1404, in which a colorant amount ratio is defined. For the three-dimensional dark and light separation basic characteristic table unit 1403, based on dark and light separation basic characteristic tables that are defined for seven lines that connect the vertexes of a cube in three-dimensional CMY space, the colorant input/output amount ratio is obtained for all the grid points in the CMY space.

Here it should be noted that the seven lines are a white-cyan line, a white-magenta line, a white-yellow line, a white-red line, a white-green line and a white-blue line.

And based on AmtCmax and DenC obtained by 1402 and 1403, a cyan colorant dark and light separation unit 1405 performs color separation using a map that will be described later, and obtains color separation data C3 for cyan ink and color separation data Lc3 for light cyan ink. Similarly, based on AmtMmax and DenM obtained by 1402 and 1403, a magenta colorant dark and light separation unit 1406 performs color separation using the map that will be described later, and obtains color separation data M3 for magenta ink and color separation data Lm3 for light magenta ink.

Figure 15:
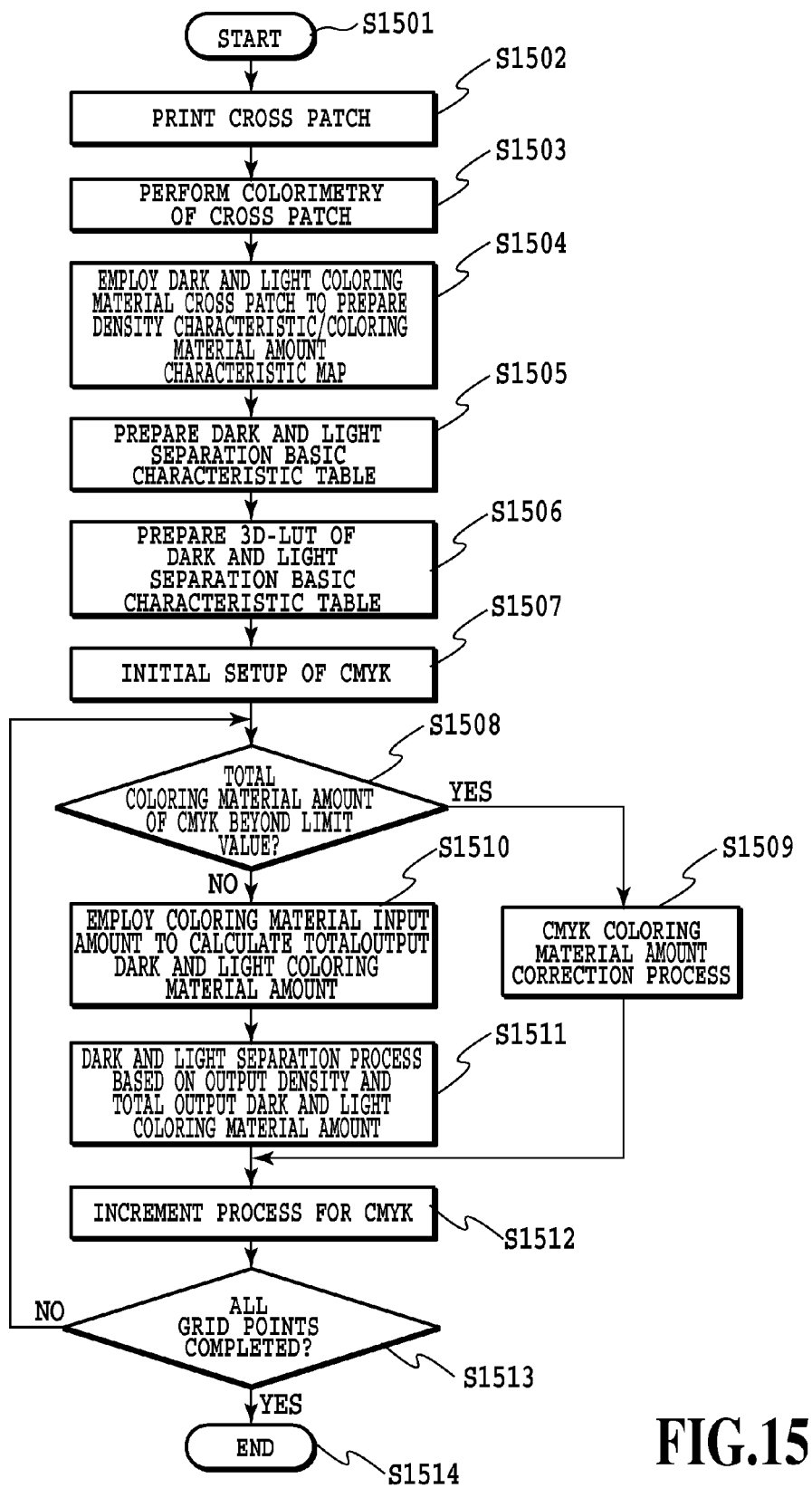
FIG. 15 is a flowchart showing the color separation processing performed for second embodiment of the present invention.

FIG. 15 is a flowchart showing the processing during which the image processing apparatus performs color separation to convert the colorant values for four colorants, which are the basic C, M, Y and K colors, into the colorant values for six colorants, C, M, Y, K, Lc and Lm, including light colors.

For color separation in this embodiment, a process (step S1506) for employing a dark and light separation, basic characteristic table to calculate a colorant amount characteristic (C, Lc, M, Lm or Y) for all the grid points is performed in addition to that for first embodiment described above.

Steps S1505 and S1506 for creating the dark and light separation basic table for this embodiment will now be described.

Step 1505 is a process for preparing a dark and light separation, basic characteristic table. In this embodiment, as explained for 1404 in FIG. 14, the dark and light separation, basic characteristic table is a one-dimensional table in which the colorant input/output amount ratio is defined for a line that connects the vertexes of a cube in three-dimensional CMY space. As described for 1403 in FIG. 14, using this table, the colorant input/output amount ratio is developed three-dimensionally, and thereafter, the total colorant amount of dark ink (C or M) and light ink (Lc or Lm), which is output by the total dark and light colorant output amount calculation unit 1402, is calculated. The dark and light separation, basic characteristic table defines the colorant amount data (0% to 100%) for dark ink (C, M or Y) to be entered in this table, and the colorant amount characteristic (C, Lc, M, Lm or Y).

Figure 16:
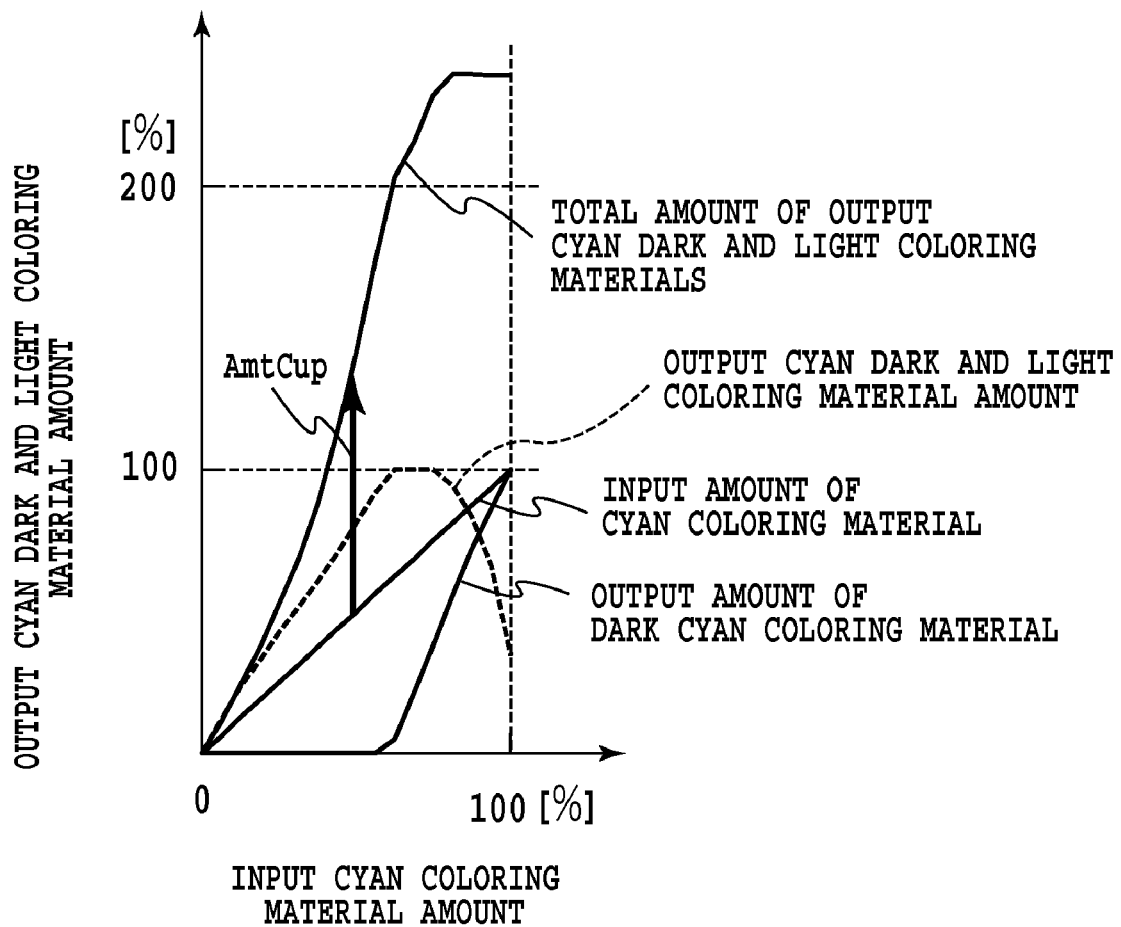
FIG. 16 is a diagram showing a basic characteristic table example for primary color dark and light separation in a CMY space according to second embodiment of the present invention.

FIG. 16 shows an example dark and light separation, basic characteristic table for the primary color that is defined for the white-cyan line (primary line) that connects the vertexes of white 0% and cyan 100% of a cube in the CMY space. In this drawing, a relationship of the colorant amount of input dark ink, relative to the colorant output amount of dark ink, and the colorant output amount of light ink is specified. The horizontal axis represents the colorant input amount (C, M or Y) to be entered in the table, and the vertical axis represents the colorant amount (C, Lc, M, Lm or Y) to be output, based on the table. It should be noted that since the colorant input amount (M or Y) is 0% along the white-cyan line, the colorant output amount (M, Lm or Y) is also 0% in this drawing.

Further, this drawing shows an example dark and light separation, basic characteristic table defined for the white-cyan line. Furthermore, the same explanation is applied for the white-magenta line (primary line) that connects the vertexes of white 0% and magenta 100% for a cube in the CMY space. That is, the same explanation is applied for a relationship of the colorant amount of input dark magenta ink, relative to the colorant output amount of dark magenta ink, and the colorant output amount of light magenta ink. Also, as for the white-yellow line (a primary line) that connects the vertexes of white 0% and yellow 1005 of a cube in the CMY space, a relationship between the colorant input amount of yellow ink and the colorant output amount of yellow ink is unchanged.

Figure 17:
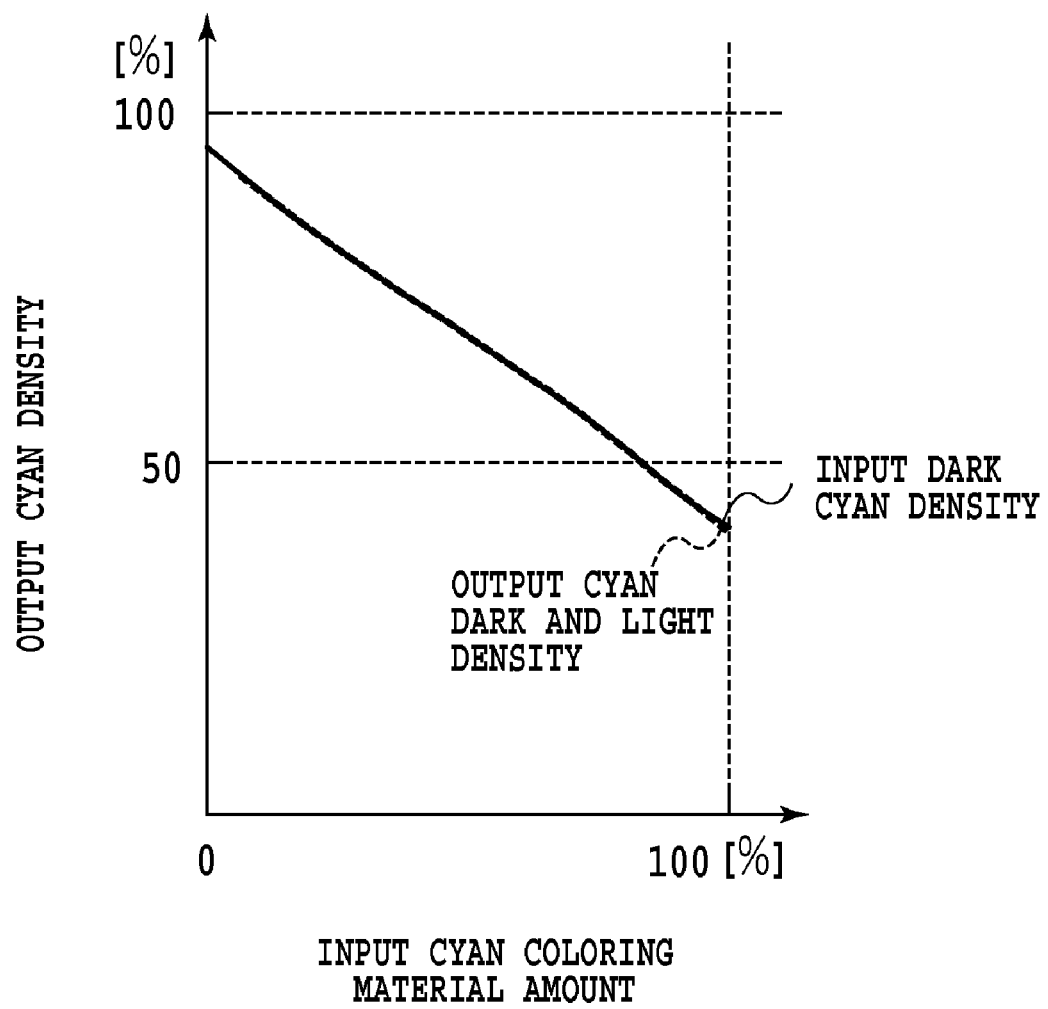
FIG. 17 is a diagram showing a basic characteristic table example for dark and light separation that supplies an input/output density characteristic according to second embodiment of the present invention.

FIG. 17 is a table showing the input/output density characteristics, included in the dark and light separation, basic characteristictable in FIG. 16 that shows the relationship between the output density characteristic and the colorant amount characteristic. The horizontal axis represents a cyan colorant input amount, and the vertical axis represents a cyan output density.

According to the relationship shown in the table in FIG. 16, as shown in FIG. 17, the density characteristic reproduced by dark and light colorants that are output is equal to the density characteristic of the colorant input amount, so that the total colorant amount of dark cyan ink and light cyan ink to be output does not exceed the total colorant amount limit value. In this drawing, a characteristic is provided so that, as the input cyan colorant value is increased, the total cyan dark and light colorant output amount is monotonously increased. In this table, in the range wherein the value of cyan colorant input amount data is small, the colorant output amount of light cyan ink is greater than the colorant output amount of dark cyan ink. And according to the colorant quality characteristic, when the colorant input amount of cyan is increased, the colorant output amount of dark cyan ink is greater than the colorant output amount of light cyan ink. Therefore, using this dark and light separation, basic characteristic table, color separation can be performed in a manner such that on the highlighted side, light cyan ink is dominant over dark cyan ink, and as the density is increased, dark cyan ink is dominant over light cyan ink.

Moreover, it is understood that, as shown in FIG. 17, the dark cyan input density is approximately equal to the cyan dark and light output density used in the case for the performance of color separation for dark and light ink. Therefore, in a case wherein color separation has been performed using the above described dark and light separation basic characteristic table, granularity can be reduced.

Figure 18:
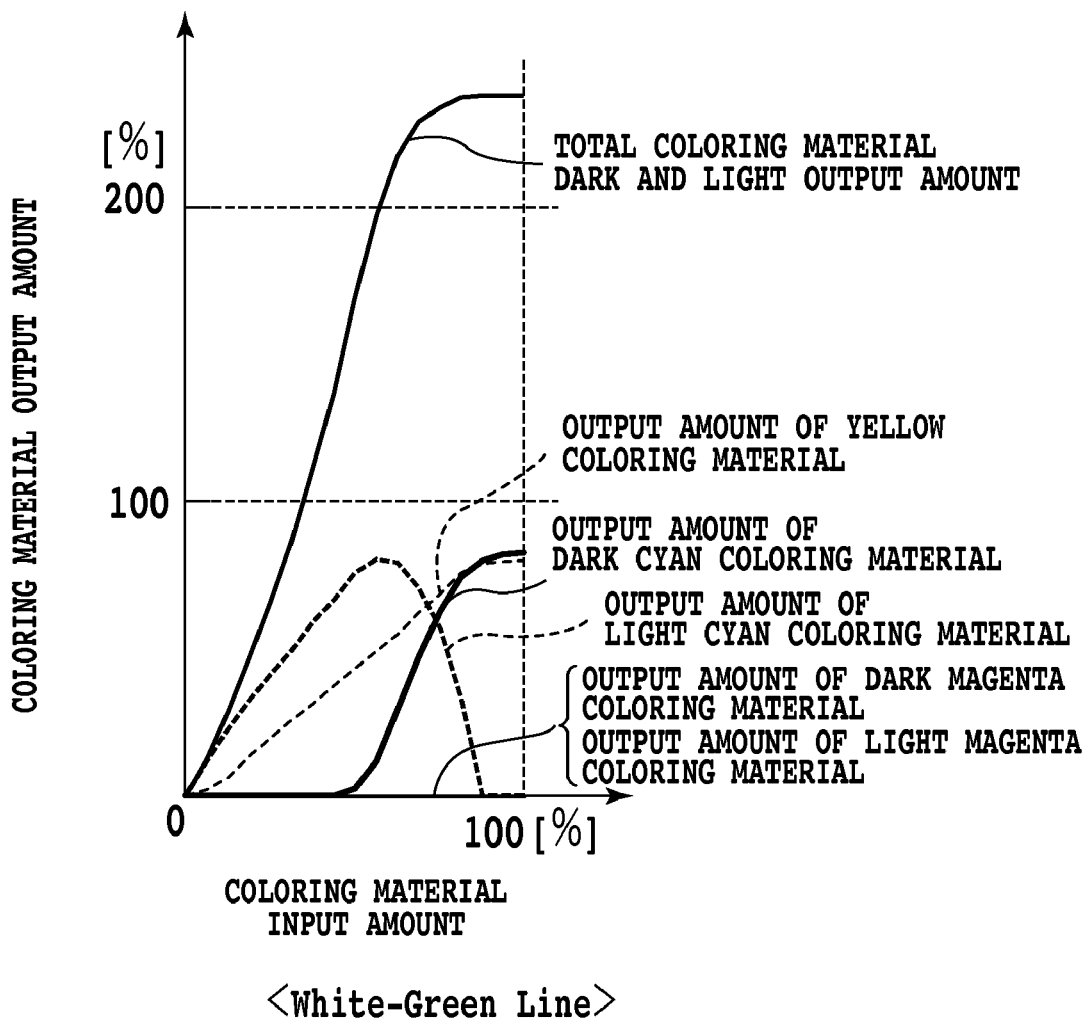
FIG. 18 is a diagram showing a basic characteristic table example for secondary color dark and light separation according to second embodiment of the present invention.

FIG. 18 shows an example dark and light separation, basic characteristic table for the secondary color that is defined for the white-green line (a primary line) that connects the vertexes of white 0% and green 100% for a cube in the CMY space. The following method is employed to prepare a dark and light separation basic characteristictable for the secondary color.

A patch (a cross patch) of n rows and n columns, in which a dark and light separation, basic characteristic (FIG. 16) that is generated for the white-cyan line and the colorant amount of Y are distributed like a cross, is printed by an image output apparatus, such as a printer. And colorimetry is performed for this printed matter. Sequentially, interpolation means processes the discrete Lab value obtained by the colorimetry, and generates a Lab characteristic map constituted by cells in m rows and m columns. The interpolation means processes the colorant amount corresponding to the printed matter, and generates a colorant amount characteristic map constituted by cells for m rows and m columns. Following this, the total colorant amount limit value and the two contiguous Lab characteristic map and colorant amount characteristic map, which are constituted by cells for m rows and m columns, are employed, and the Lab of a target dark colorant input and the cells of dark and light colorants output that provide the smallest color difference are searched for by referring to the Lab characteristic map. And the cells that are found are employed as a combination of colorant amount for a light colorant, a dark colorant and yellow. When the combination of a light colorant, a dark colorant and a yellow colorant is searched for in the color reproduction range (blank 0% to solid printing 100%) of the target dark colorant input, the dark and light separation, basic characteristic table in which the colorant amount ratio for the white-green line is defined is obtained.

While an example dark and light separation, basic characteristic table defined for the white-green line is shown in FIG. 18, tables for the other secondary colors (a white-red line and a white-blue line) can also be obtained in the same manner.

At step S1506, as indicated by 1404 in FIG. 14, dark and light separation, basic characteristic tables are prepared, which are defined for seven lines that connect the vertexes of a cube in the three-dimensional CMY space. And during this process, by referring to the dark and light separation basic characteristic tables, the colorant amount characteristics (C, Lc, M, Lm and Y) are calculated for coordinates of all the grid points. A detailed explanation will now be given.

Figure 19:
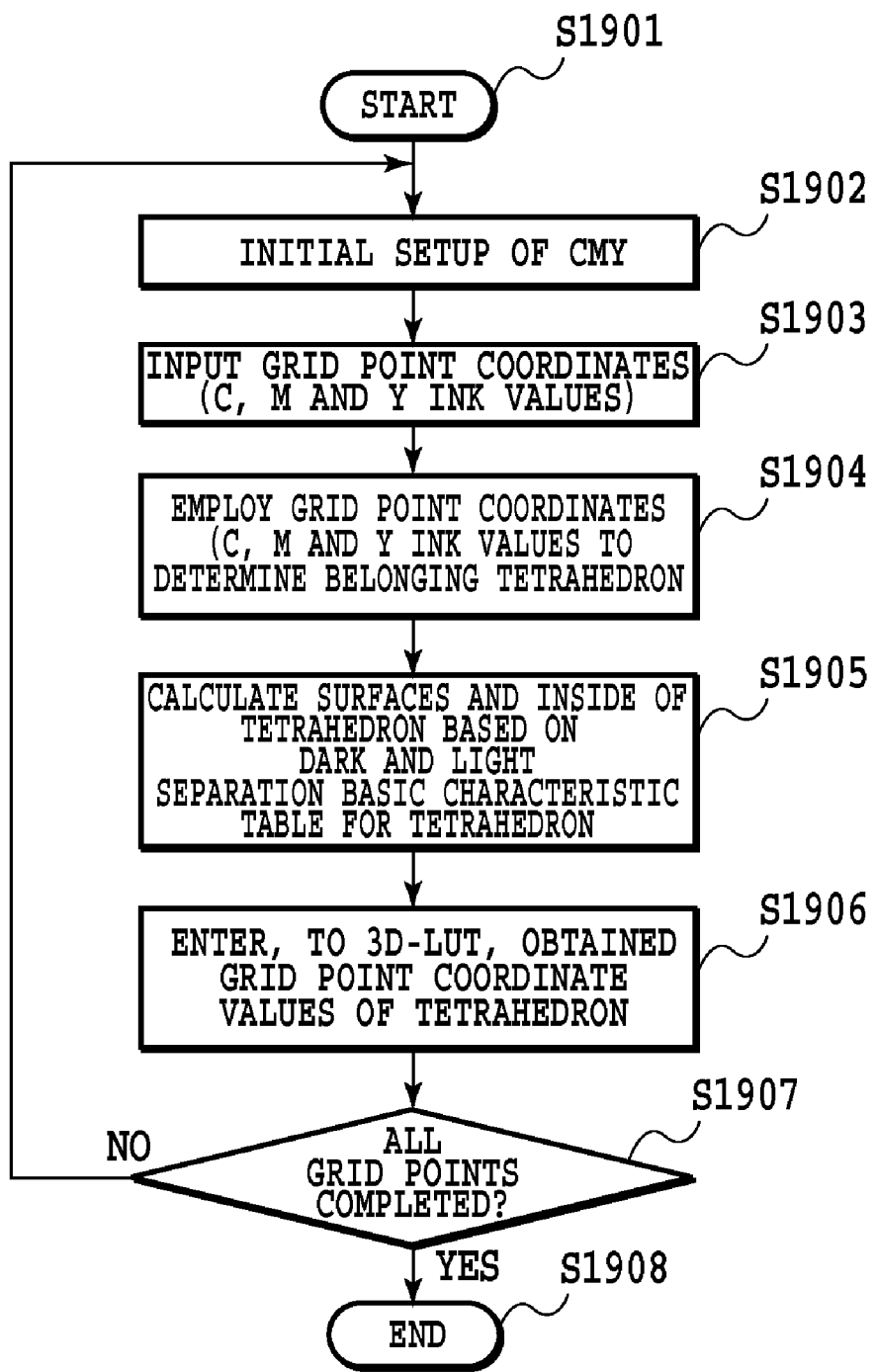
FIG. 19 is a flowchart showing the processing for preparing colorant amount characteristics for all the grid points based on the basic characteristic table for dark and light separation according to second embodiment of the present invention.

FIG. 19 is a flowchart showing the processing by which a colorant amount characteristic (3D-LUT) for all the grid points is prepared, based on the dark and light separation, basic characteristic tables for the seven lines.

Figure 20:
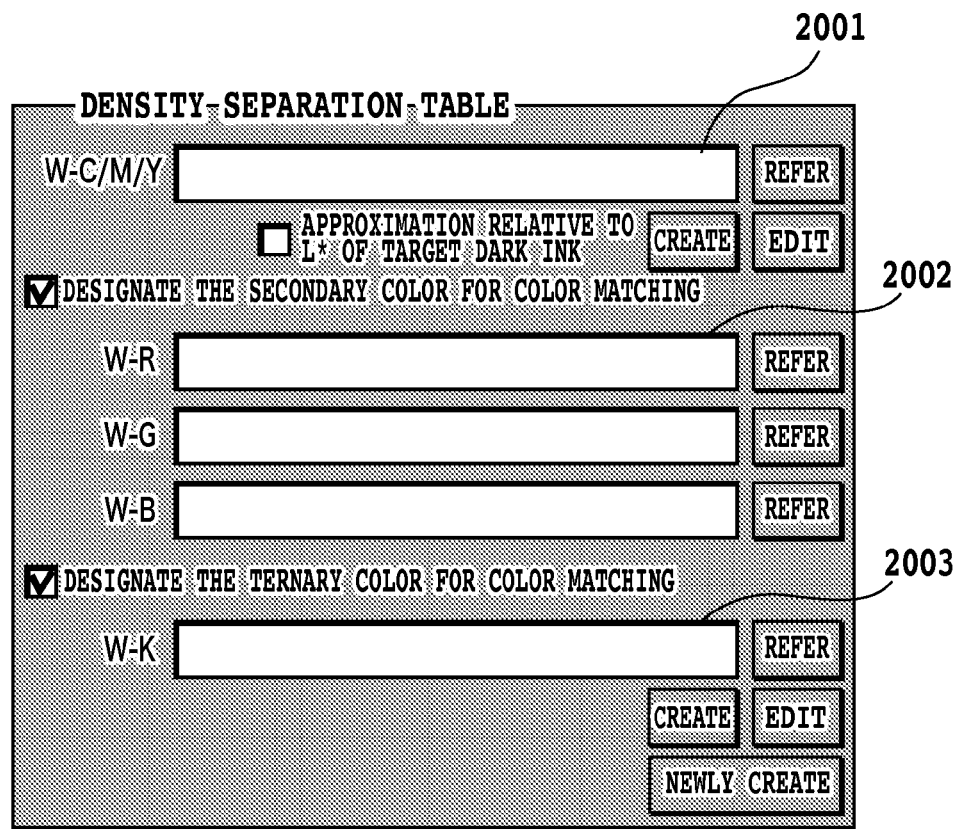
FIG. 20 is a diagram showing a UI screen according to second embodiment of the present invention.

FIG. 20 is a diagram showing a UI screen for setting up a dark and light separation, basic characteristic table.

Reference numeral 2001 denotes a one-dimensional dark and light separation, basic characteristic table setup section.

Reference numeral 2002 denotes a two-dimensional dark and light separation, basic characteristic table setup section.

Reference numeral 2003 denotes a three-dimensional dark and light separation, basic characteristic table setup section.

In a case wherein a user has already prepared a one-dimensional dark and light separation, basic characteristic table, the user then clicks on a "reference" button for the one-dimensional dark and light separation, basic characteristic table setup section 2001. When the "reference" button is clicked on, a file name can be selected, for example, from a holder where a table prepared in advance is stored, and can be entered in the one-dimensional color separation, basic characteristic table setup section 2001. When the file name is designated, the one-dimensional dark and light separation, basic characteristic table prepared in advance is read. Thus, the setup is performed.

Further, in a case wherein a user creates a new one-dimensional dark and light separation, basic characteristic table, the user can click on a "create" button, and create a one-dimensional dark and light separation, basic characteristic table. In this case, a new one-dimensional dark and light separation basic characteristic table is prepared, based, for example, on a file in which a table prepared using a cross patch and the amount of input data are defined. And a file name is provided for the new table, and is designated for the one-dimensional color separation, basic characteristic table setup unit 2001. Thus, the setup is performed.

Also, by clicking on an "edit" button, a one-dimensional dark and light separation, basic characteristic table prepared in advance can be edited and set up. That is, when an ink value in the one-dimensional dark and light separation, basic characteristic table prepared in advance is changed, this table is assigned a new file name, and is designated for the one-dimensional color separation, basic characteristic table setup unit 2001. In this manner, the setup is performed.

In addition, a two-dimensional dark and light separation, basic characteristic table can be selected and entered in the two-dimensional dark and light separation, basic table setup unit 2002. In the three-dimensional dark and light separation basic table setup unit 2003, as in the one-dimensional dark and light separation basic table setup unit 2001, a three-dimensional dark and light separation basic, characteristic table can be referred to, created, or edited. In this manner, the setting up of the table can be performed.

When the setting up by the one-dimensional color separation basic characteristic table setup unit 2001, the two-dimensional color separation basic characteristic table setup unit 2002 and the three-dimensional color separation basic characteristic table setup unit 2003 has been completed, a "new create" button is clicked on, and a 3D-LUT is obtained.

In this embodiment, a 3D-LUT is prepared by referring to, creating or editing the one-dimensional, the two-dimensional and the three-dimensional dark and light separation, basic characteristic tables. However, the present invention is not limited to this, and a table previously prepared and employed may be read and used.

Further, in this embodiment, the two-dimensional dark and light separation, basic characteristic table is set up by referring to a table that has been prepared in advance.

However, the present invention is not limited to this. That is, like the one-dimensional dark and light separation, basic characteristic table or the three-dimensional dark and light separation, basic characteristic table, a table may be prepared or edited.

Furthermore, the one-dimensional dark and light separation basic characteristic table and the three-dimensional dark and light separation basic characteristic table are not limited to those for which all of the reference, preparation and editing processes can be performed. That is, a table may be set us simply through reference, or may be set up by newly preparing, or may be set up simply by editing, or may be set up by performing all these processes together.

The following steps are performed based on the individual tables that are input.

Step S1901 is a start step, and preparation of colorant amount characteristics (3D-LUT) is started for all the grid points in the CMY space, i.e., for the surfaces and the inside of a tetrahedron. Step S1902 is a process for performing the C, M and Y initial setup to determine C, M and Y ink values for the individual grid points. Step S1903 is a process for setting colorant input amount. Step S1904 is a process for employing a colorant input amount to determine a tetrahedron that includes this colorant input amount. Step S1905 is a process for employing the dark and light separation, basic characteristic table for the tetrahedron to calculate the colorant output amount for the surfaces and the inside of the tetrahedron. Step S1906 is a process for setting up, for the 3D-LUT, the colorant output amount for the tetrahedron that is obtained at step S1906.

Figure 21:
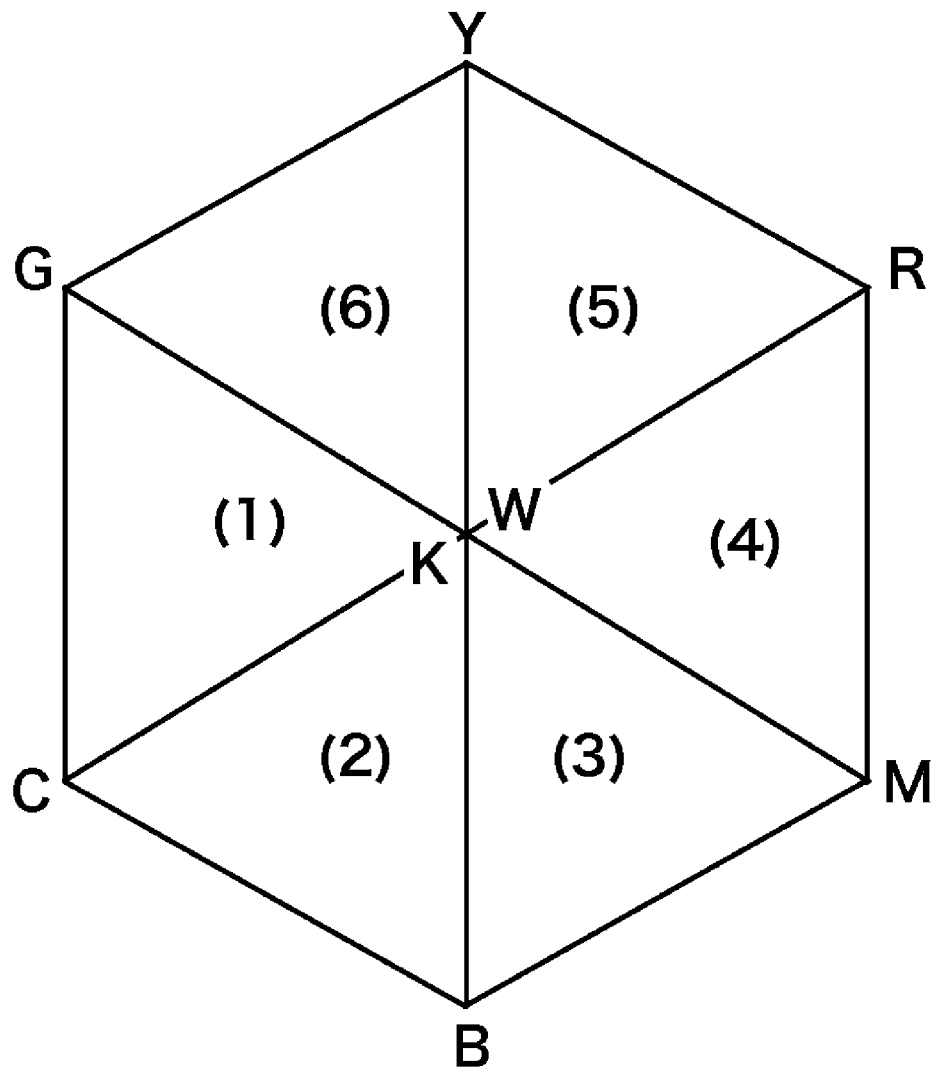
FIG. 21 is a diagram showing six tetrahedrons obtained by dividing a CMY three-dimensional space.

FIG. 21 is a diagram showing six tetrahedrons obtained by dividing the three-dimensional CMY space. A method for calculating a colorant amount at a grid point for each tetrahedron will now be descried while referring to FIGS. 22 to 30.

Figure 22:
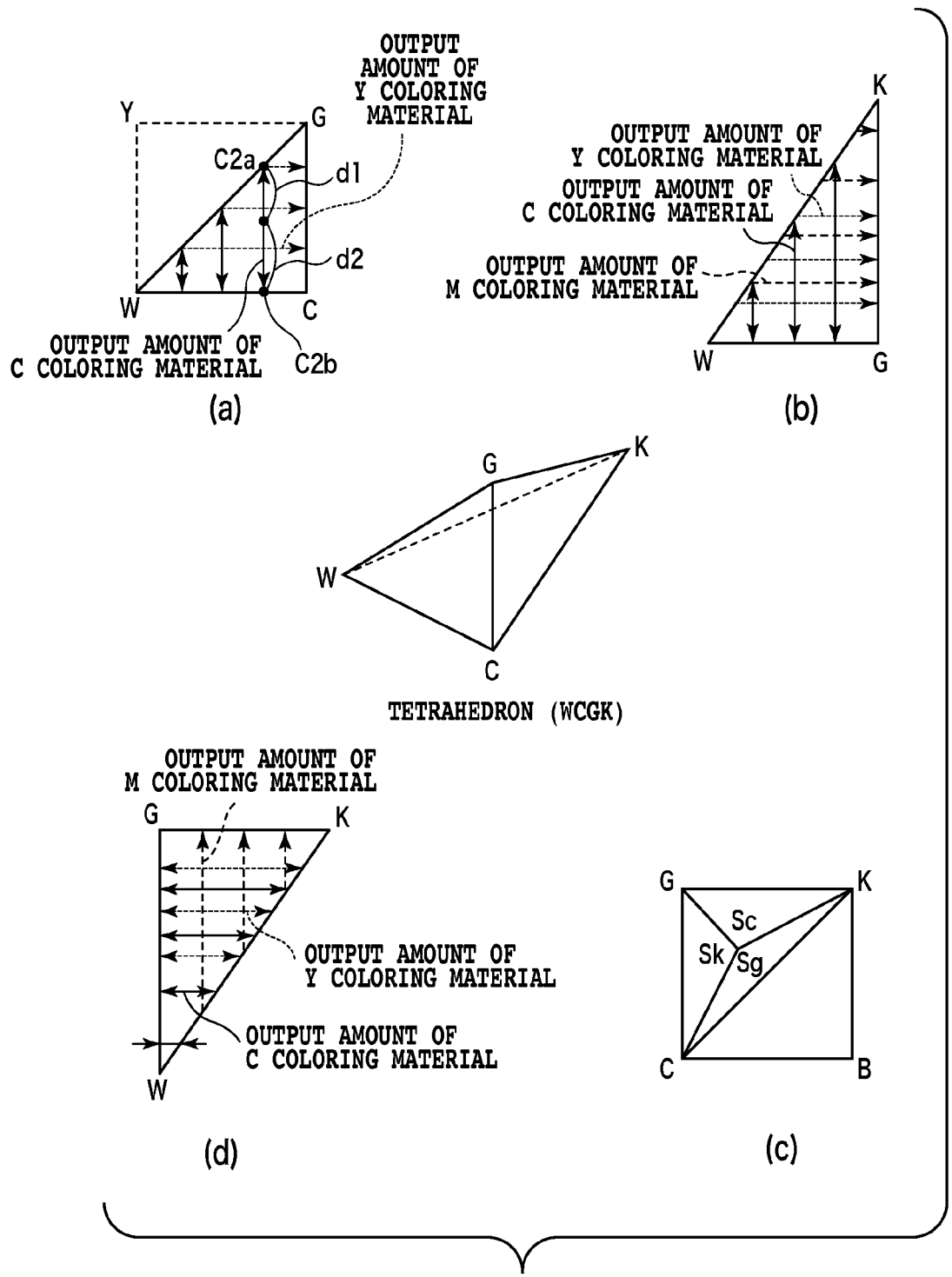
FIG. 22 is a diagram for explaining a method for calculating the amount output for C, M and Y colorants according to second embodiment of the present invention.

FIG. 22 is a diagram for explaining the method for calculating the colorant output amount for C, M and Y that belong to a tetrahedron (WCGK) (corresponding to (1) in FIG. 21).

In FIG. 22(a), the following expressions are employed in a case for calculating the colorant output amount of C, M and Y on the WCG plane. That is, as a method for calculating a C colorant output amount Cx, the following expressions are employed, based on the dark and light separation, basic characteristic table in FIG. 16 for the white-cyan line and the dark and light separation, basic characteristic table in FIG. 18 for the white-green line.

$$Cx=(d1C2b+d2C2a)/(d1+d2) \quad (1)$$

C2a=C colorant amount for the white-cyan line C2b=C colorant amount for the white-green line d1=distance between the grid point for Cx and the grid point for C2a d2=distance between the grid point for Cx and the grid point for C2b As for M, since the colorant input amount is 0 on the WCG plane, the colorant output amount for M and Lm are 0.

As a method for calculating the Y colorant output amount, the same amount of Y as in the dark and light separation, basic characteristic table for the white-green line is employed. For example, on the WCG plane in FIG. 22(a), a value equal to the colorant output amount for the white-green line is employed as a colorant output amount at the position where a perpendicular line is drawn from WG to GC. In this manner, the Y colorant output amount is calculated.

In FIG. 22(b), the colorant output amount for C, M and Y on the WCK plane are calculated. In this case, the dark and light separation, basic characteristic table in FIG. 16 for the white-cyan line and the dark and light separation, basic characteristic table in FIG. 23 for the white-black line are employed as a method for calculating the C colorant output amount. That is, a calculation is performed in the same manner as when using expression (1).

The amount of M equal to that in the dark and light separation, basic characteristic table for the white-black line is employed as a method for the calculation of the m colorant output amount. Likewise, an amount of Y equal to that in the dark and light separation, basic characteristic table for the white-black line is employed as a method for the calculation of the Y colorant output amount.

In FIG. 22(c), the colorant output amount for C, M and Y on the WKG plane are calculated. In this case, the dark and light separation, basic characteristic table in FIG. 18 for the white-green line and the dark and light separation, basic characteristic table in FIG. 23 for the white-black line are employed as a method for calculating the C colorant output amount. That is, a calculation is performed in the same manner as when using expression (1).

An amount for M equal to that in the dark and light separation, basic characteristic table for the white-black line is employed as a method for the calculation of them colorant output amount.

Figure 23:
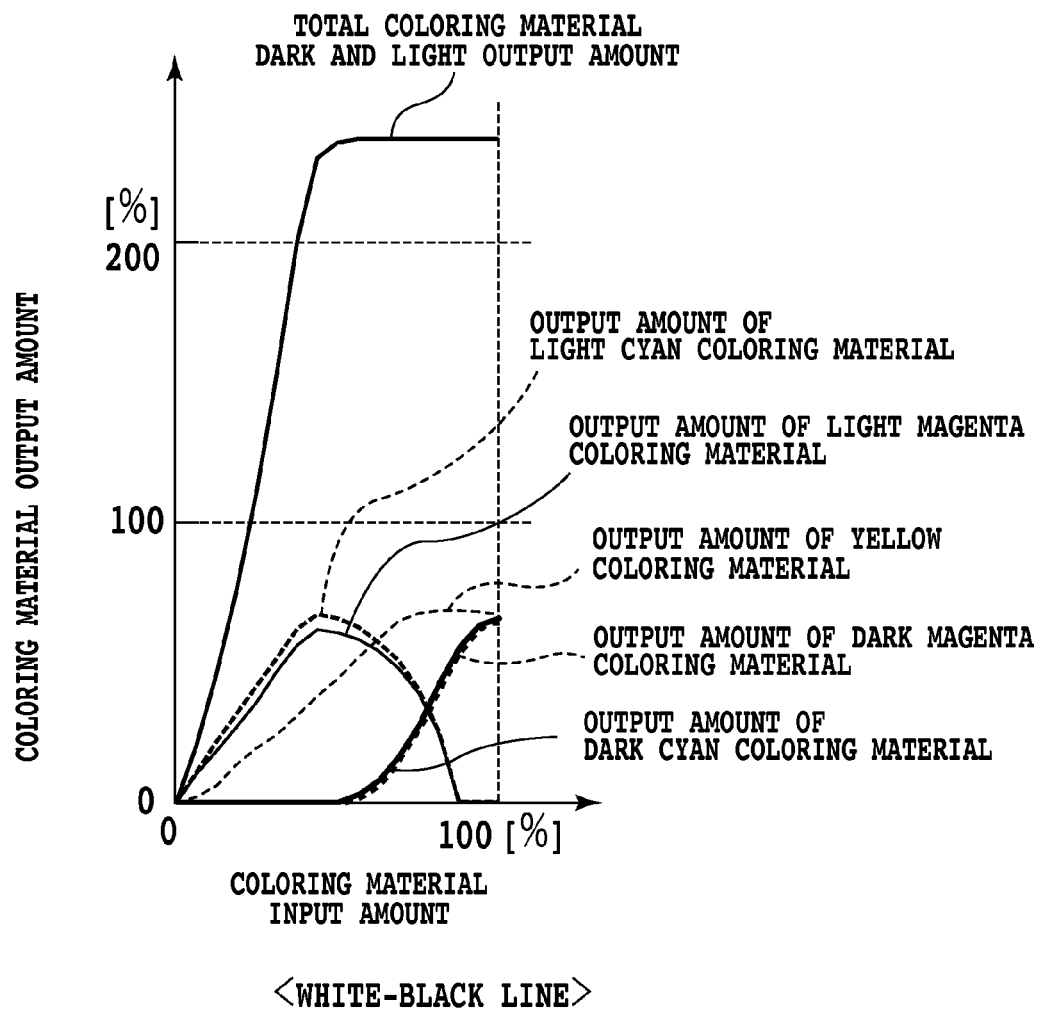
FIG. 23 is a diagram showing a basic characteristic table example for dark and light separation according to second embodiment of the present invention.

As a method for calculating the Y colorant output amount, the dark and light separation, basic characteristic table in FIG. 18 for the white-green line and the dark and light separation, basic characteristic table in FIG. 23 for the white-black line are employed, and a calculation is performed in the same manner as when using expression (1).

In FIG. 22(d), in a case for the calculation of the colorant output amount for C, M and Y on the GCK plane and inside a tetrahedron (WCGK), the following expression is employed as a method for calculating the C colorant output amount Cx.

$$Cx=(CCsC+CgSg+CkSk)/(Sc+Sg+Sk) \quad (2)$$

Here, Cx denotes the output amount of the colorant C at an arbitrary grid point x, and a grid value of x relative to C is defined as y. And Cc is C relative to input y for the white-cyan line, Cg is C relative to input y for the white-green line, and Ck is C relative to input y for the white-black line, and Sc, Sg and Sk are defined as the dimensions of triangles.

An amount of M equal to that for the white-black line is employed as a calculation method for the output amount of the colorant M.

Y calculated for the WGK plane is employed as a calculation method for the output amount of the colorant Y.

Figure 24:
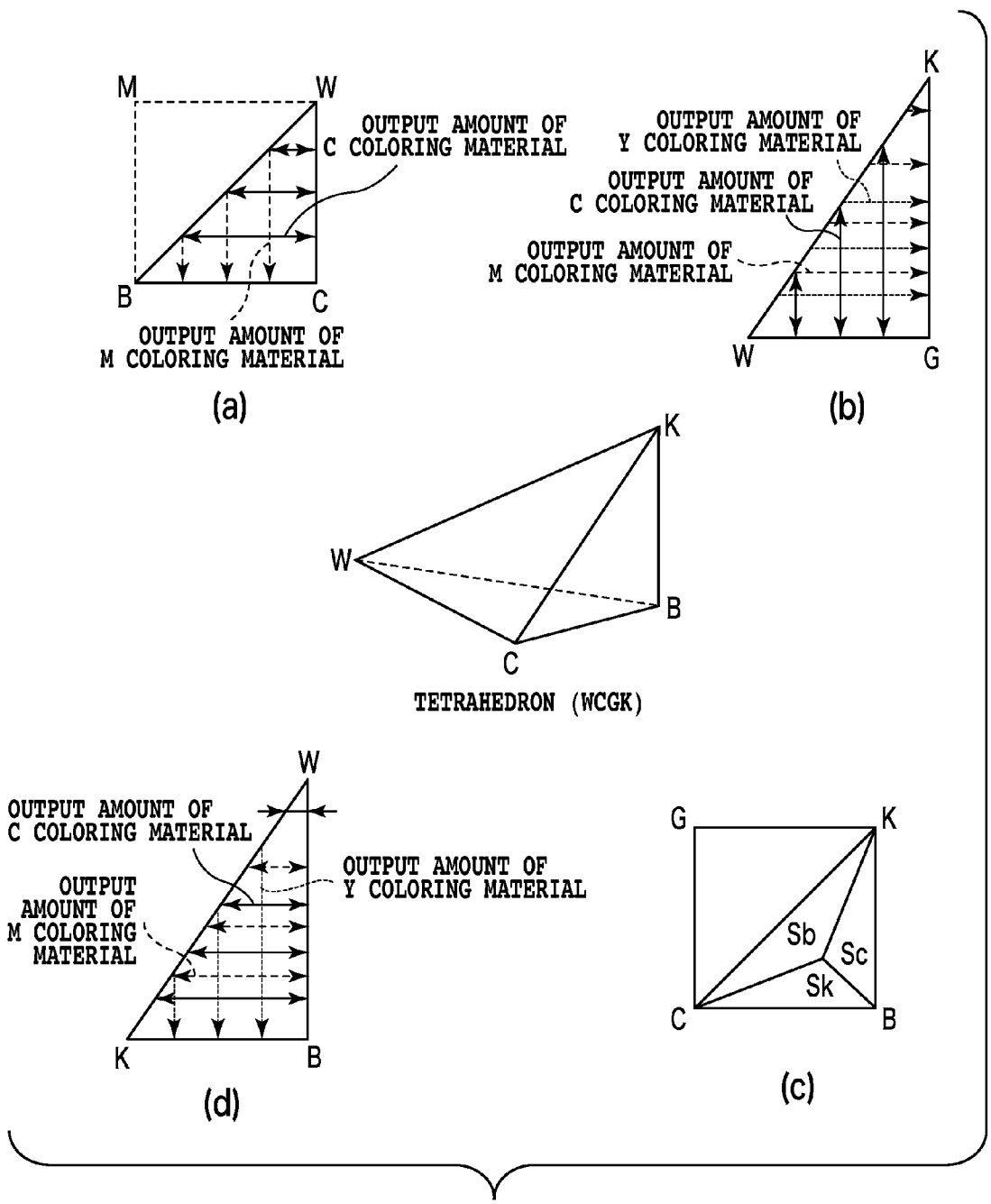
FIG. 24 is a diagram for explaining a method for calculating the amount output for C, M and Y colorants according to second embodiment of the present invention.

FIG. 24 is a diagram for explaining a method for calculating the output amount of the colorants C, M and Y that belong to a tetrahedron (WCBK) (corresponding to (2) in FIG. 21).

In FIG. 24(a), the output amount of the colorants C, M and Y on the WBC plane are calculated. In this case, the dark and light separation, basic characteristic table in FIG. 16 for the white-cyan line and the dark and light separation, basic characteristic table in FIG. 25 for the white-blue line are employed as a method for calculating the output amount of the colorant C. That is, a calculation is performed in the same manner as when using expression (1).

An amount of M equal to that in the dark and light separation, basic characteristic table for the white-blue line is employed as a method for the calculation of the output amount of the colorant M. As for Y, since the colorant input amount is 0, the output amount of the colorant Y on the WBC plane is 0.

In FIG. 24(b), the output amount of the colorants C, M and Y on the WCK plane are calculated. In this case, the dark and light separation, basic characteristic table in FIG. 16 for the white-cyan line and the dark and light separation, basic characteristic table in FIG. 23 for the white-black line are employed as a method for calculating the output amount of the colorant C. That is, a calculation is performed in the same manner as when using expression (1).

An amount of M equal to that in the dark and light separation, basic characteristic table for the white-black line is employed as a method for the calculation of the output amount of the colorant M. Likewise, an amount of Y equal to that in the dark and light separation, basic characteristic table for the white-black line is employed as a method for the calculation of the output amount of the colorant Y.

In FIG. 24(c), the output amount of the colorants C, M and Y on the WKB plane are calculated. In this case, the dark and light separation, basic characteristic table in FIG. 25 for the white-blue line and the dark and light separation, basic characteristic table in FIG. 23 for the white-black line are employed as a method for calculating the output amount of the colorant C. That is, a calculation is performed in the same manner as when using expression (1). The same process is applied for a method for calculating the colorant output amount of M.

An amount of Y equal to that in the dark and light separation, basic characteristic table for the white-black line is employed as a method for the calculation of the output amount of the colorant Y.

In FIG. 24(d), in a case for the calculation of the output amount of the colorants C, M, Y on the BCK plane and inside a tetrahedron (WCBK), a calculation method for the output amount of the colorant C employs the weighted average of dimensions Sc, Sb and Sk in the same manner as when using expression (2). A calculation method for the output amount of the colorant M employs M obtained on the WBK plane. A calculation method for the output amount of the colorant Y employs an amount of Y equal to that for the white-black line.

Figure 26:
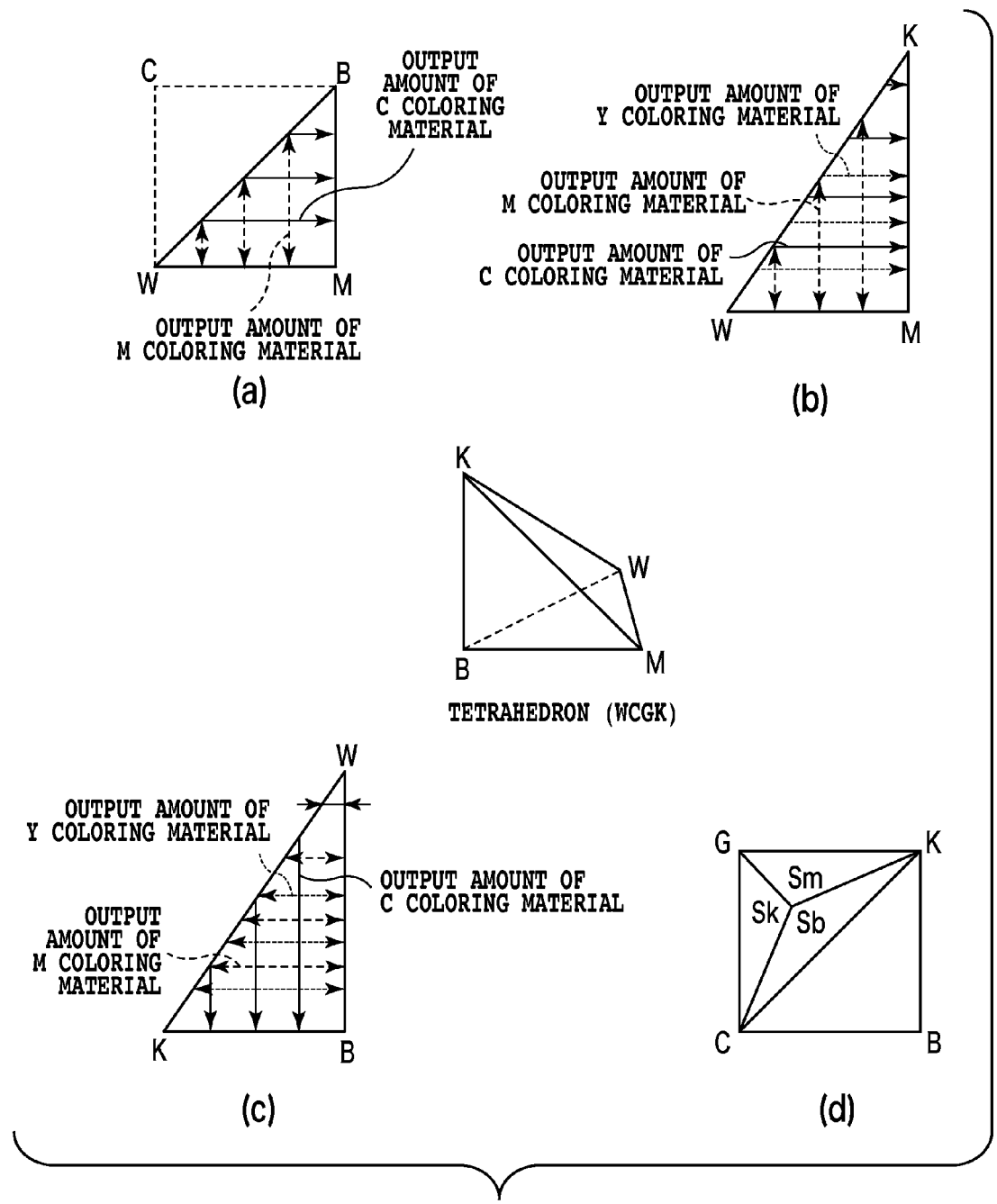
FIG. 26 is a diagram for explaining a method for calculating the amount output for C, M and Y colorants according to second embodiment of the present invention.

FIG. 26 is a diagram for explaining a method for calculating the output amount of the colorants C, M and Y that belong to a tetrahedron (WBMK) (corresponding to (3) in FIG. 21).

Figure 25:
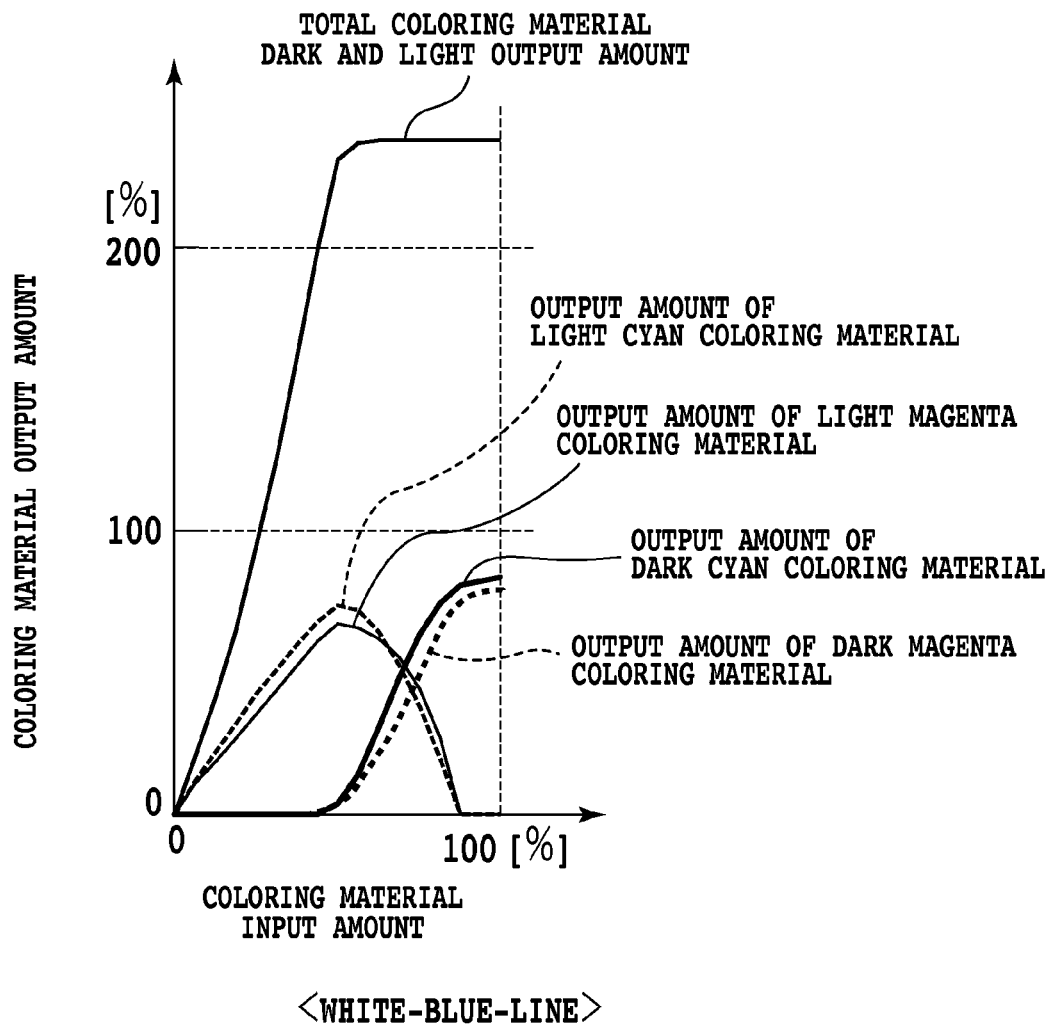
FIG. 25 is a diagram showing a basic characteristic table example for dark and light separation according to second embodiment of the present invention.

In FIG. 26(a), in the case for the calculation of the output amount of the colorants C, M and Y on the WBM plane, an amount of C equal to that in the dark and light separation, basic characteristic table in FIG. 25 for the white-blue line is employed as a method for calculating the output amount of the colorant C.

The dark and light separation, basic characteristic table for the white-blue line and a dark and light separation basic characteristic table (not shown) for the white-magenta line are employed as a method for the calculation of the output amount of the colorant M. That is, the same process is performed in the same manner as in expression (1). As for Y, since the colorant input amount is 0, the output amount of the colorant Y is 0.

In FIG. 26(b), the output amount of the colorants C, M and Y on the WMK plane are calculated. In this case, the amount of M equal to that in the dark and light separation basic characteristic table in FIG. 23 for the white-black line is employed as a method for calculating the output amount of the colorant C.

The calculation method for the output amount of the colorant M is performed in the same manner as in expression (1), by employing the dark and light separation, basic characteristic table for the white-blue line and the dark and light separation, basic characteristic table (not shown) for the white-magenta line. The calculation method for the output amount of the colorant Y is also performed in the same manner.

In FIG. 26(c), the output amount of the colorants C, M and Y on the WKB plane are calculated. In this case, the dark and light separation, basic characteristic table in FIG. 25 for the white-blue line and the dark and light separation, basic characteristic table in FIG. 23 for the white-black line are employed as a method for calculating the output amount of the colorant C. That is, a calculation is performed in the same manner as when using expression (1). The same process is applied for a method for calculating the colorant output amount of M.

An amount of Y equal to that in the dark and light separation basic characteristic table for the white-black line is employed as a calculation method for the output amount of the colorant Y.

In FIG. 26(d), in a case for calculating the output amount of the colorants C, M, Y on the GCK plane and inside a tetrahedron (WBMK), a calculation method for the output amount of the colorant C employs C obtained for the WBK plane. A calculation method for the output amount of the colorant M employs the weighted average of dimensions Sc, Sb and Sk in the same manner as when using expression (2). A calculation method for the output amount of the colorant Y employs an amount of Y equal to that for the white-black line.

Figure 27:
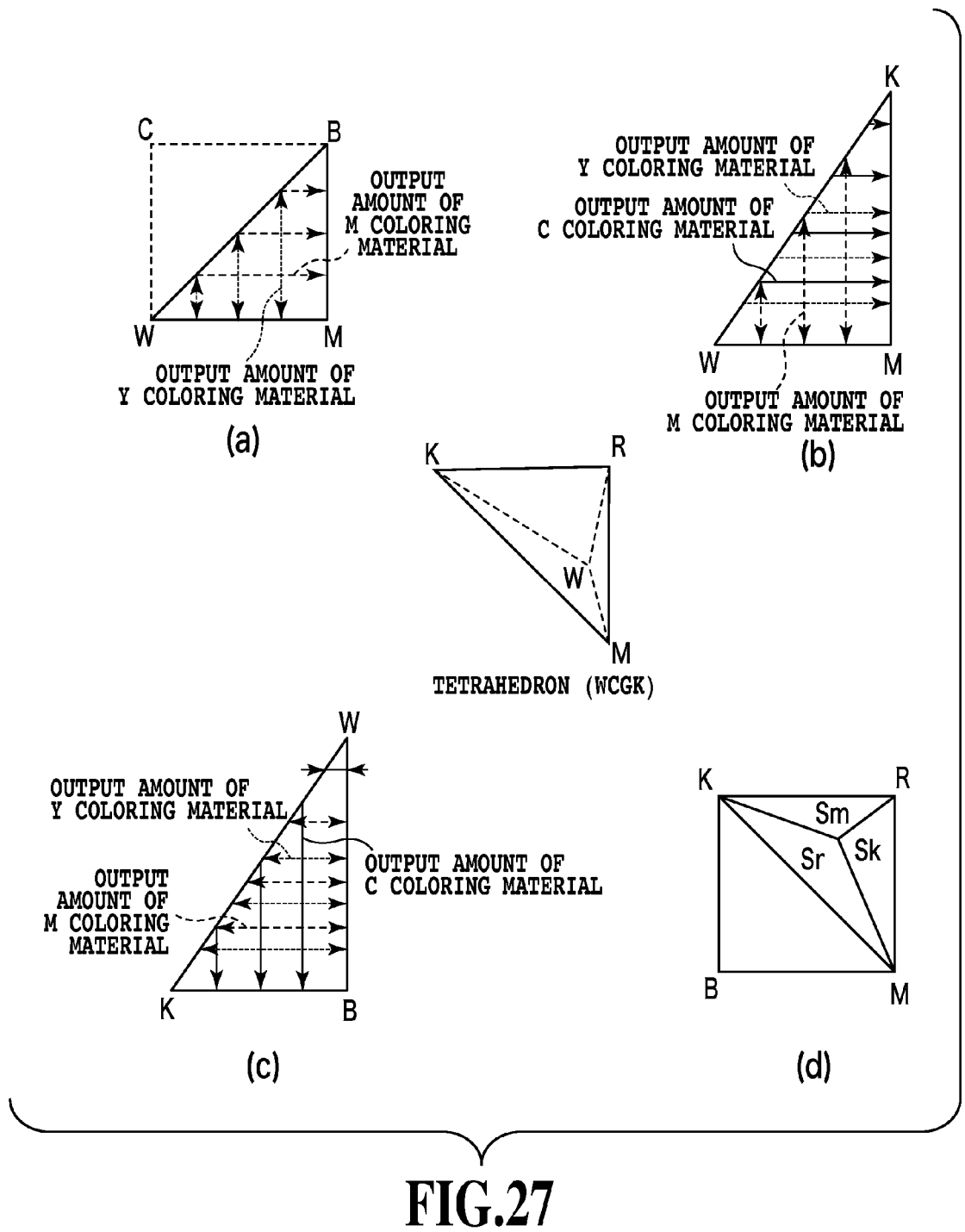
FIG. 27 is a diagram for explaining a method for calculating the amount output for C, M and Y colorants according to second embodiment of the present invention.

FIG. 27 is a diagram for explaining a method for calculating the output amount of the colorants C, M and Y that belong to a tetrahedron (WMRK) (corresponding to (4) in FIG. 21).

In FIG. 27(a), in a case for the calculation of the output amount of the colorants C, M and Y on the WRM plane, since the colorant input amount of C is 0, the output amount of the colorant C is 0.

A dark and light separation, basic characteristic table shown in FIG. 27 for a white-red line and a dark and light separation, basic characteristic table (not shown) for the white-magenta line are employed as a calculation method for the output amount of the colorant M. That is, the same process is performed in the same manner as in expression (1). As for Y, an amount of Y equivalent to that in the dark and light separation, basic characteristic table for the white-red line is employed.

In FIG. 27(b), in a case for the of calculation of the output amount of the colorants C, M and Y on the WMK plane, an amount of C equal to that in the dark and light separation, basic characteristic table in FIG. 23 for the white-black line is employed as a method for calculating the output amount of the colorant C.

The calculation method for the output amount of the colorant M is performed in the same manner as in expression (1), by employing the dark and light separation, basic characteristic table for the white-black line and the dark and light separation, basic characteristic table (not shown) for the white-magenta line. The calculation method for the output amount of the colorant Y is also performed in the same manner.

In FIG. 27(c), in the case for the calculation of the output amount of the colorants C, M and Y on the WKR plane, an amount of C equal to that in the dark and light separation, basic characteristic table for the white-black line is employed as a method for calculating the output amount of the colorant C.

Figure 28:
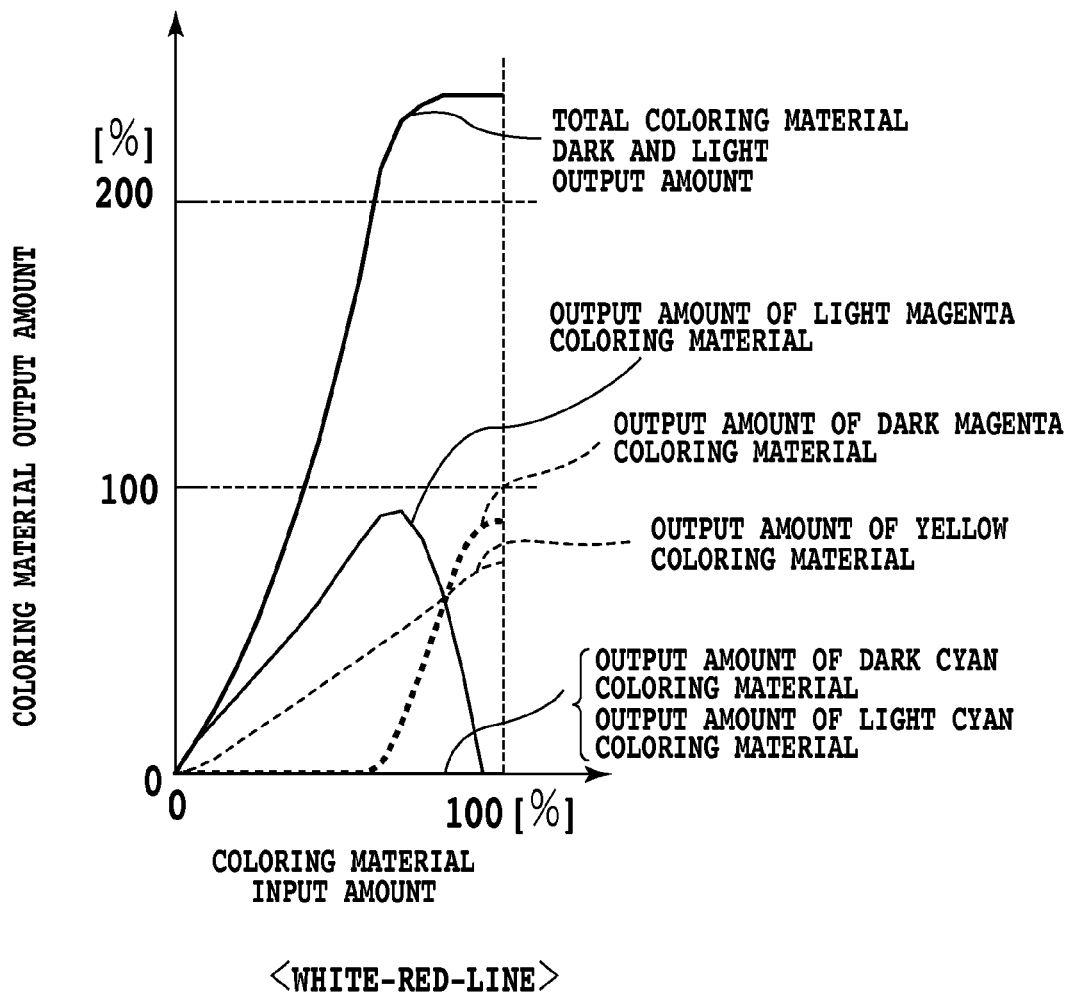
FIG. 28 is a diagram showing a basic characteristic table example for dark and light separation according to second embodiment of the present invention.

The calculation method for the output amount of the colorant M is performed in the same manner as in expression (1), by employing the dark and light separation, basic characteristic table in FIG. 23 for the white-black line and a dark and light separation, basic characteristic table in FIG. 28 for the white-red line. The calculation method for the output amount of the colorant Y is also performed in the same manner.

In FIG. 27(d), in a case for the calculation of the output amount of the colorants C, M, Y on the MRK plane and inside a tetrahedron (WMRK), a calculation method for the output amount of the colorant C employs an amount of C equal to that for the white-black line. A calculation method for the output amount of the colorant M employs the weighted average of dimensions Sm, Sr and Sk in the same manner as when using the expression (2). A calculation method for the output amount of the colorant Y employs the Y obtained for the WRK plane.

Figure 29:
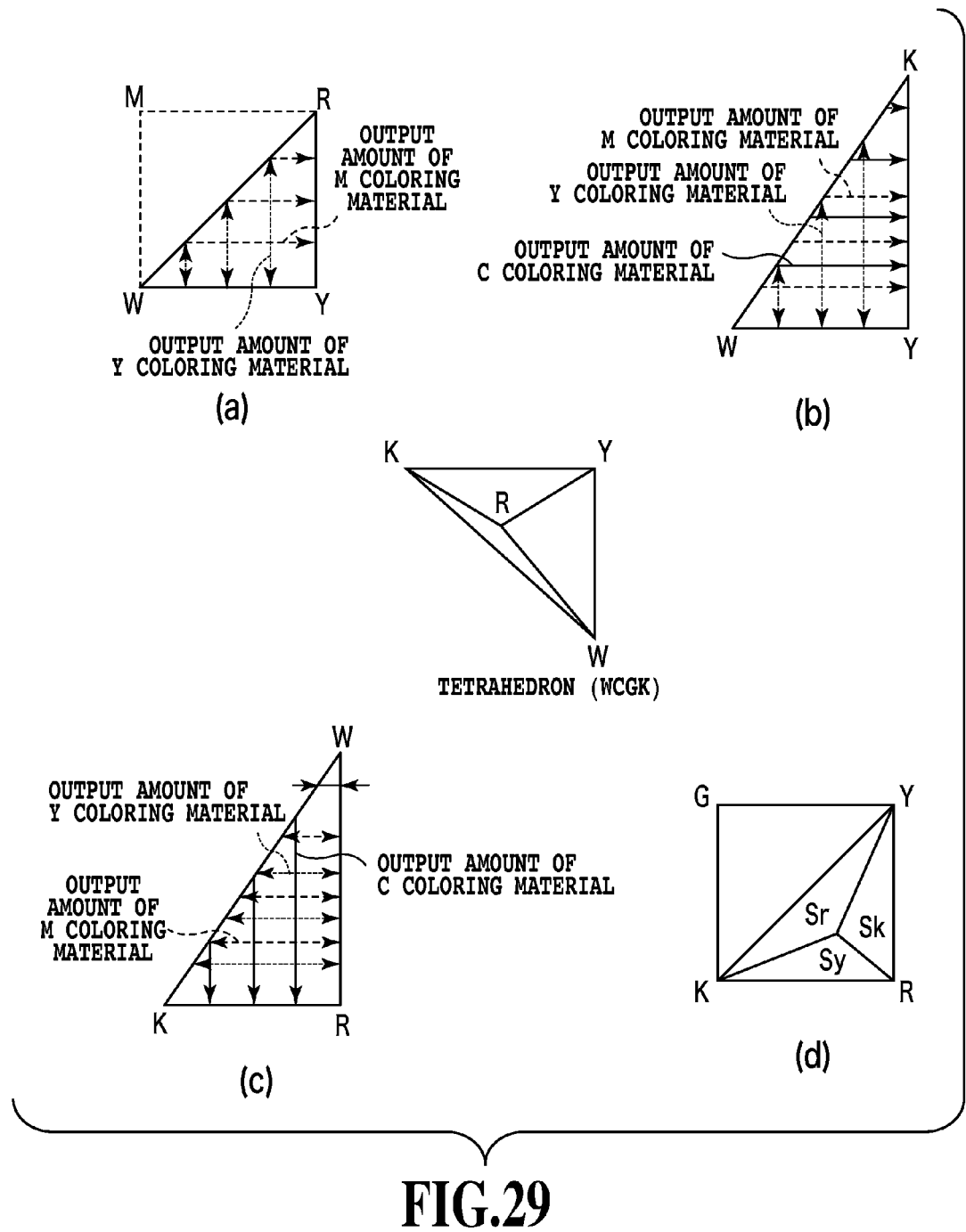
FIG. 29 is a diagram for explaining a method for calculating the amount output for C, M and Y colorants according to second embodiment of the present invention.

FIG. 29 is a diagram for explaining a method for calculating the output amount of the colorants C, M and Y that belong to a tetrahedron (WRYK) (corresponding to (5) in FIG. 21).

In FIG. 29(a), in a case for the calculation of the output amount of the colorants C, M and Y on the WYR plane, since the colorant input amount of C is 0, the output amount of the colorant C is 0.

An amount of M equal to that in the dark and light separation basic characteristic table shown in FIG. 28 for the white-red line is employed for a calculation method for the output amount of the colorant M. The calculation method for the output amount of the colorant Y is performed, in the same manner as when using expression (1), by employing the dark and light separation, basic characteristic table for the white-red line and a dark and light separation basic characteristic table for the white-yellow line.

In FIG. 29(b), in a case for the calculation of the output amount of the colorants C, M and Y on the WYK plane, an amount of C equal to that in the dark and light separation, basic characteristic table in FIG. 23 for the white-black line is employed for a calculation method for the output amount of the colorant C. The calculation method for the output amount of the colorant M is performed in the same manner. The calculation method for the output amount of the colorant Y is performed in the same manner as when using expression (1), by employing the dark and light separation, basic characteristic table for the white-black line and the dark and light separation, basic characteristic table (not shown) for the white-yellow line.

In FIG. 29(c), in a case for the calculation of the output amount of the colorants C, M and Y on the WKR plane, an amount of C equal to that in the dark and light separation, basic characteristic table for the white-black line is employed as a calculation method for the output amount of the colorant C.

The calculation method for the output amount of the colorant M is performed in the same manner as in expression (1), by employing the dark and light separation basic characteristic table in FIG. 23 for the white-black line and the dark and light separation basic characteristic table in FIG. 28 for the white-red line. The calculation method for the output amount of the colorant Y is also performed in the same manner.

In FIG. 29(d), in a case for the calculation of the output amount of the colorants C, M, Y on the YRK plane and inside a tetrahedron (WYRK), a calculation method for the output amount of the colorant C employs an amount of C equal to that for the white-black line. A calculation method for the output amount of the colorant M employs the M obtained for the WRK plane. The calculation method for the output amount of the colorant Y employs the weighted average of dimensions Sy, Sr and Sk in the same manner as when using the expression (2).

Figure 30:
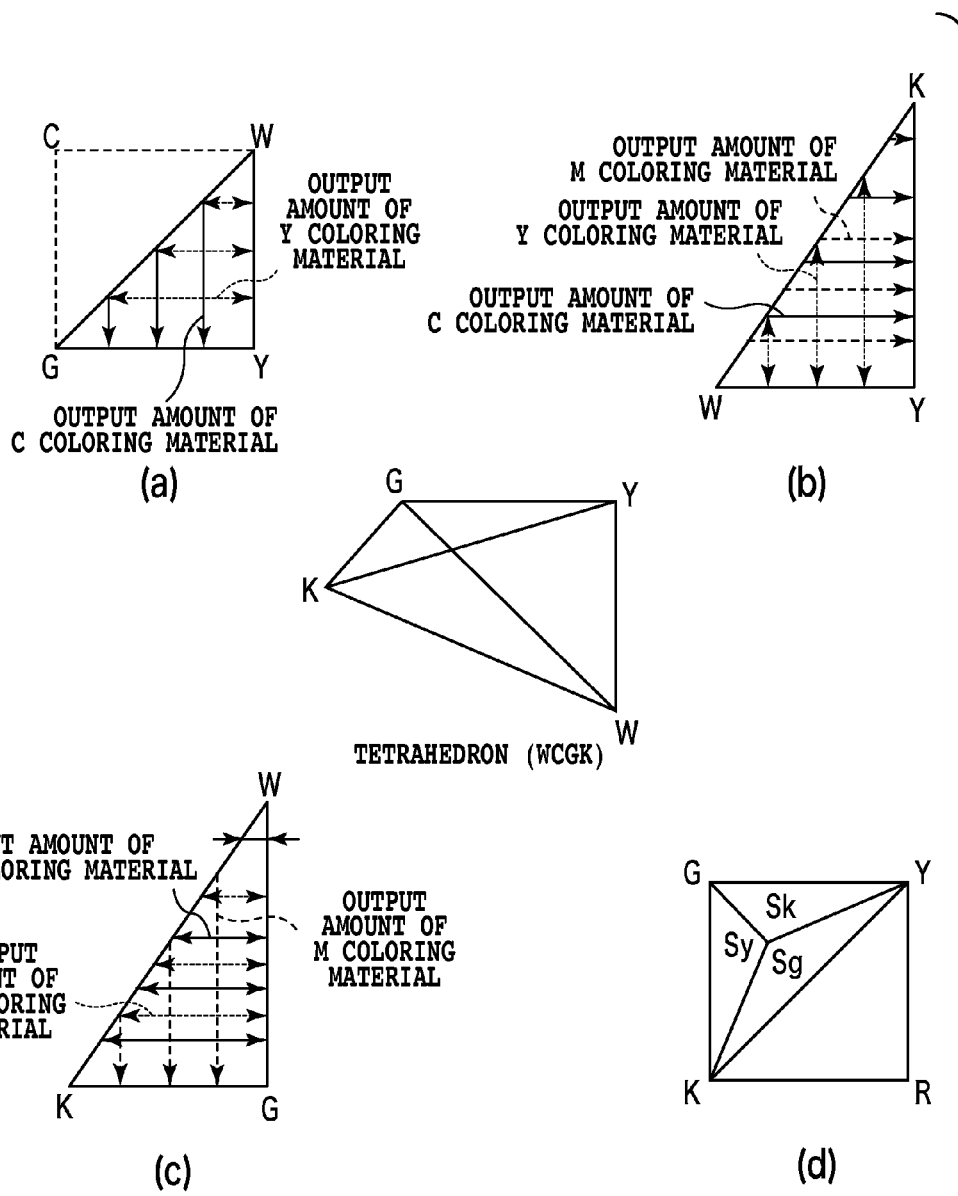
FIG. 30 is a diagram for explaining a method for calculating the amount output for C, M and Y colorants according to second embodiment of the present invention.

FIG. 30 is a diagram for explaining a method for calculating the output amount of the colorants C, M and Y that belong to a tetrahedron (WYGK) (corresponding to (6) in FIG. 21).

In FIG. 30(a), the output amount of the colorants C, M and Y on the WGY plane are calculated. In this case, an amount of C equal to that in the dark and light separation, basic characteristic table for the white-green line is employed.

Since the input amount of the colorant M is 0, the output amount of the colorant M is 0.

The calculation method for the output amount of the colorant Y is performed, in the same manner as when using expression (1), by employing the dark and light separation, basic characteristic table for the white-green line and the dark and light separation, basic characteristic table for the white-yellow line.

In FIG. 30(b), in a case for the calculation of the output amount of the colorants C, M and Y on the WYK plane, an amount of C equal to that in the dark and light separation, basic characteristic table in FIG. 23 for the white-black line is employed for the calculation method for the output amount of the colorant C. The calculation method for the output amount of the colorant M is performed in the same manner. The calculation method for the output amount of the colorant Y is performed, in the same manner as when using expression (1), by employing the dark and light separation, basic characteristic table for the white-black line and the dark and light separation, basic characteristic table (not shown) for the white-yellow line.

In FIG. 30(c), the output amount of the colorants C, M and Y on the WKG plane are calculated. In this case, the calculation method for the output amount of the colorant C is performed, in the same manner as when using expression (1), by employing the dark and light separation, basic characteristic table in FIG. 22 for the white-green line and the dark and light separation, basic characteristic table in FIG. 23 for the white-black line. That is, the calculation is performed in the same manner as when using expression (1).

The calculation method for the output amount of the colorant M is performed by employing a quality of M equal to that in the dark and light separation, basic characteristic table for the white-black line.

The calculation method for the output amount of the colorant Y is performed in the same manner as in expression (1), by employing the dark and light separation, basic characteristic table in FIG. 22 for the white-green line and the dark and light separation, basic characteristic table in FIG. 23 for the white-black line.

In FIG. 30(d), in a case of calculating the output amount of the colorants C, M, Y on the YGK plane and inside a tetrahedron (WYGK), a calculation method for the output amount of the colorant C employs the C obtained for the plane WKG. The calculation method for the output amount of the colorant M employs an amount of M equal to that for the white-black line. The calculation method for the output amount of the colorant Y employs the weighted average of dimensions Sy, Sr and Sk in the same manner as when using the expression (2).

In the explanation for this embodiment, the dark and light separation, basic characteristic table for the primary color shown in FIG. 16 has been employed as an example. However, for the preparation of a color dark and light separation, basic characteristic table, a relationship between the colorant amount data of dark ink and the characteristic of the colorant output amount is not limited to this type of table.

When the three-dimensional dark and light separation, basic characteristic table has been prepared at step S1506, at step S1507, the initial setup for C, M, Y and K is performed in order to determine the C, M, Y and K ink values at the individual grid points. And as in first embodiment, the C, M, Y and K ink values are determined for the individual grid points.

It should be noted that in this embodiment the ink values for the grid points on the seven lines can be independently adjusted.

Figure 31:
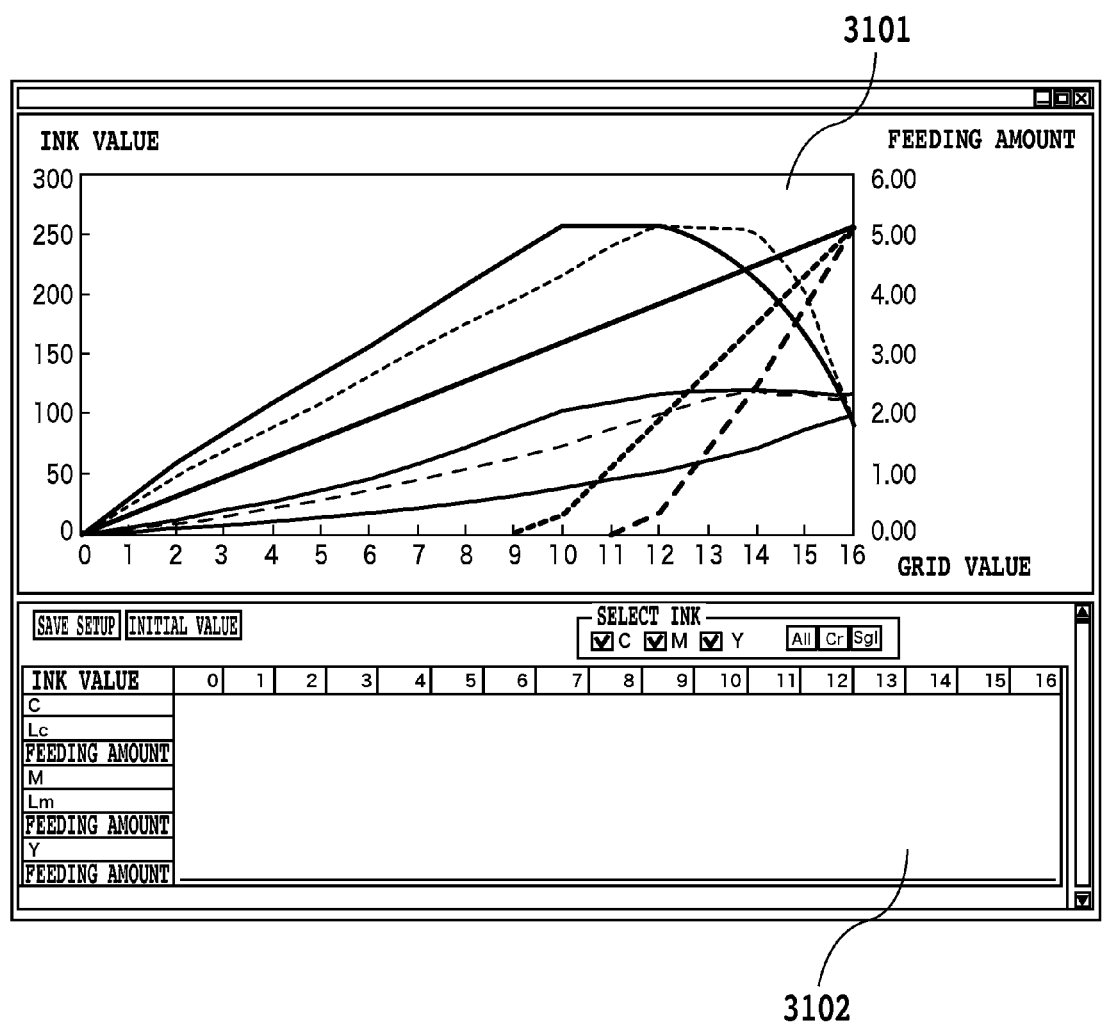
FIG. 31 is a diagram showing a UI screen for adjusting an ink value at a grid point according to second embodiment of the present invention.

FIG. 31 is a diagram showing a UI screen for adjusting ink values at grid points on the seven lines. In a line plot section 3101, ink values at grid points are plotted for each line, and a dark and light separation, basic characteristic table is graphically displayed. In a table data section 3102, the ink values are displayed using a table form, while the horizontal axis represents the individual points, and the vertical axis represents the individual lines. A user can designate, for each grid line, a plotted ink value or an grid point in a table form. That is, for adjustment, while visually confirming the curve of a line displayed in the line plot section 3101, the user can change the ink value corresponding to the grid point on the display. And the selected ink value is stored in the dark and light separation, basic characteristic table.

It should be noted that the UI screen shown in FIG. 31 is related to a three-dimensional dark and light separation, basic characteristic table. A one-dimensional dark and light separation, basic characteristic table and a two-dimensional dark and light separation, basic characteristic table can be displayed in the same manner, and can be adjusted.

This dark and light separation, basic characteristic table can be edited by clicking on the "edit" button on the UI screen in FIG. 20.

As described above, according to this embodiment, the dark and light separation processing is performed based on the density characteristic and the total dark and light colorant amount that are output. Therefore, a problem that arises in the conventional art, i.e., a remarkable reduction in density occurring because the total colorant amount should be equal to or smaller than the limited value, can be removed. Further, in the conventional art, only the one-dimensional dark and light separation table for cyan and magenta is employed to convert four-dimensional input CMYK data into six-dimensional data. Thus, a problem exists in that smoothing and optimizing of four-dimensional gradation is not ensured. However, according to this embodiment, an amount surplus of the total colorant amount limit value (AmtLIMIT) is divided in accordance with the ratio of the increasable amount (AmtCup and the AmtMup) of cyan and magenta colorants, and the total output amount of dark and light colorants is obtained. And for calculation of the 46 conversion table, the optimal color separation can be performed, while taking into account the colorant amount of four colors of cyan, magenta, yellow and black.

(Modification of Second Embodiment)

In second embodiment, an explanation has been given for the 3D-LUT preparation of dark and light separation, basic characteristic tables, according to which the dark and light separation, basic characteristic tables defined for the seven lines in the CMY space are prepared in advance, and for all the grid points, the colorant amount characteristics are calculated based on the dark and light separation, basic characteristic tables. However, this embodiment is not limited to this, and these tables may be replaced with dark and light separation, basic characteristic tables of the primary colors W-C, M and Y. That is, in a case where in dark and light separation, basic characteristic tables are not prepared for the secondary colors W-C, M, Y, R, G and B or the ternary colors W-C, M, Y, r, G, B and K, dark and light separation, basic characteristic tables for the primary colors may be employed. In this case, the user need not designate a dark and light separation, basic characteristic table in the secondary color and the ternary color table setup sections on the UI screen in FIG. 20, and the dark and light separation, basic characteristic table for the primary color can be employed as a replacement. As a result, the user can change the adjustment level of the dark and light separation, basic characteristic table.

Figure 32:
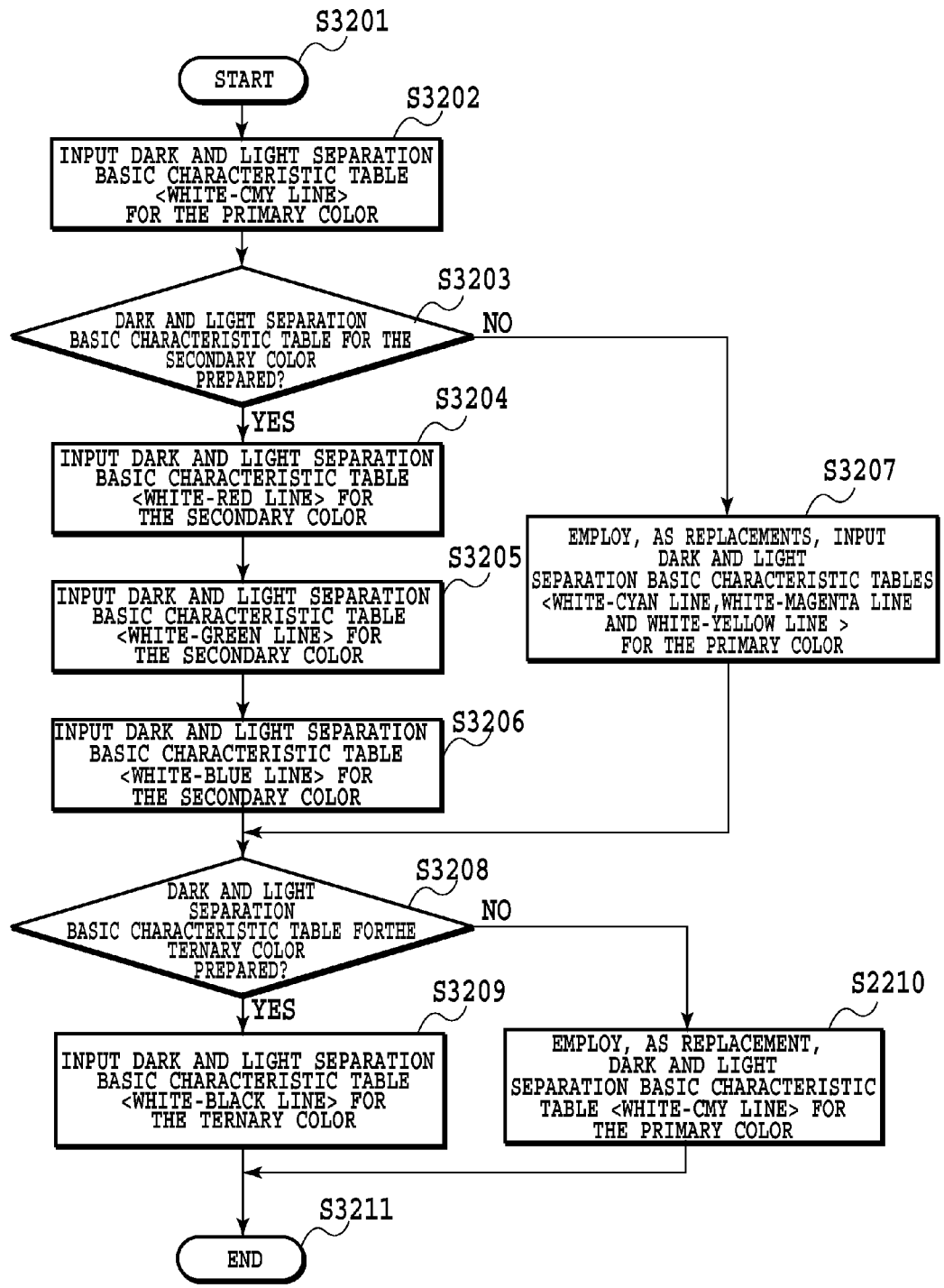
FIG. 32 is a flowchart showing another color separation table preparation process according to second embodiment of the present invention.

FIG. 32 is a flowchart for the 3D-LUT preparation of a dark and light separation, basic characteristic table, by determining whether dark and light separation, basic tables for the primary color, the secondary color and the ternary color are present. At step S3201, three lines of the dark and light separation, basic characteristic table for the primary line, i.e., the white-cyan line, the white-magenta line and the white-yellow line, are input. Then, at step S3203, a check is performed to determine whether a dark and light separation, basic characteristic table for the secondary color has been prepared in advance. When a dark and light separation, basic characteristic table for the secondary color has been prepared, at steps S3204 to S3206, three lines in the dark and light separation, basic characteristic table for the secondary color are input. That is, the white-red line, the white-green line and the white-blue line are input. On the other hand, when a dark and light separation, basic characteristic table for the secondary color has not been prepared, at steps S3207 to S3209, the dark and light separation, basic characteristic table for the primary color is employed as a replacement to calculate values at grid points. That is, the colorant values for the white-cyan line, the white-magenta line and the white-yellow line are calculated by referring to the white-red line, the white-green line and the white-blue line. Sequentially, at step S3208, a check is performed to determine whether a dark and light separation, basic characteristic table for the ternary color has been prepared in advance. When a dark and light separation, basic characteristic table for the ternary color has been prepared, at step S3209, the white-black line in the dark and light separation, basic characteristic table for the ternary color is input. That is, the same results are obtained as in the embodiment for the above described case wherein the dark and light separation, basic characteristic table for the ternary color is present. On the other hand, when a dark and light separation, basic characteristic table for the ternary color has not been prepared, at step S3210, a dark and light separation, basic characteristic table for the primary color is used as a replacement to calculate values at grid points. That is, the colorant values for the white-cyan line, the white-magenta line and the white-yellow line are calculated by referring to the white-black line.

(Third Embodiment)

According to third embodiment of the present invention, a smoothing process is additionally performed during color separation in first embodiment or 2 to convert four colorants of C, M, Y and K into six colorants of C, M, Y, K, Lc and Lm.

Specifically, in a case of performing color dark and light separation using another table, the individual colorant amount obtained using tables can not be correlated in the smoothing process. As a result, there is a case wherein, even through the smoothing process, the colorant amount finally obtained is not smoothly changed between grid points.

Even when a table, based on which the amount of the colorants C, M, Y, K, Lc and Lm can be output in correlation with each other, can be taken into account, another problem below arises. In the smoothing process, correction is performed after the filtering process, so that the total colorant amount becomes equal to or smaller than the total colorant amount limit value. Thus, the value of the colorant amount is corrected after the filtering. Therefore, sometimes, after the smoothing process is ended, the total colorant amount becomes greater than the total colorant amount limit value.

Further, in a case wherein the smoothing process is performed, and thereafter, correction of the total colorant amount is performed for a grid point, at which the total colorant amount limit is exceeded, smoothness obtained by the previous smoothing process is deteriorated, and a quasi-contour would occur.

Therefore, using color separation provided by this embodiment, the smoothing process is additionally performed between image signals. As a result, color separation that maintains four-dimensional gradation and optimization can be provided.

Figure 33:
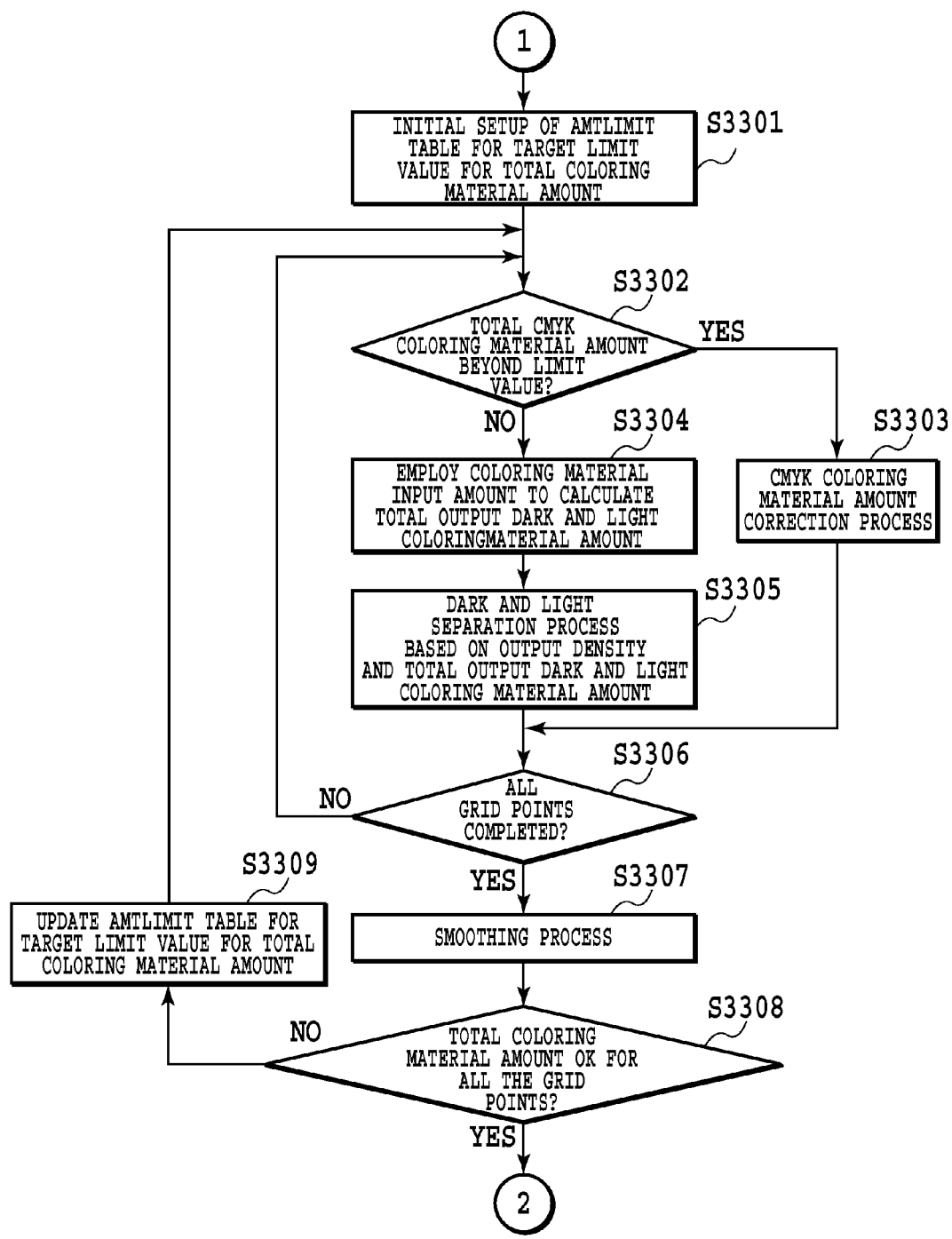
FIG. 33 is a flowchart showing a color separation table preparation process according to third embodiment of the present invention.

FIG. 33 is a flowchart showing the color separation processing performed by the image processing apparatus to convert four colorants of C, M, Y and K, which are basic colors for which the smoothing process has been performed, to six colorants of C, M, Y, K, Lc and Lm, including light colors. It should be noted that processes corresponding to steps S301 to S305 and the process at S313 in FIG. 3 and the processes at steps S1501 to S1506 and the process at S1504 in FIG. 15 are not shown in FIG. 33.

Processes at S3307 to S3309 for this embodiment, which correspond to the smoothing process, will now be described.

In a case wherein it is ascertained at step S3306 that ink values have been decided for all the grid points, at step S3307, the smoothing process is performed using a filter of N×N×N×N (N is a constant). In the smoothing process for this embodiment, a filter of 3×3×3×3 is employed.

Figure 34:
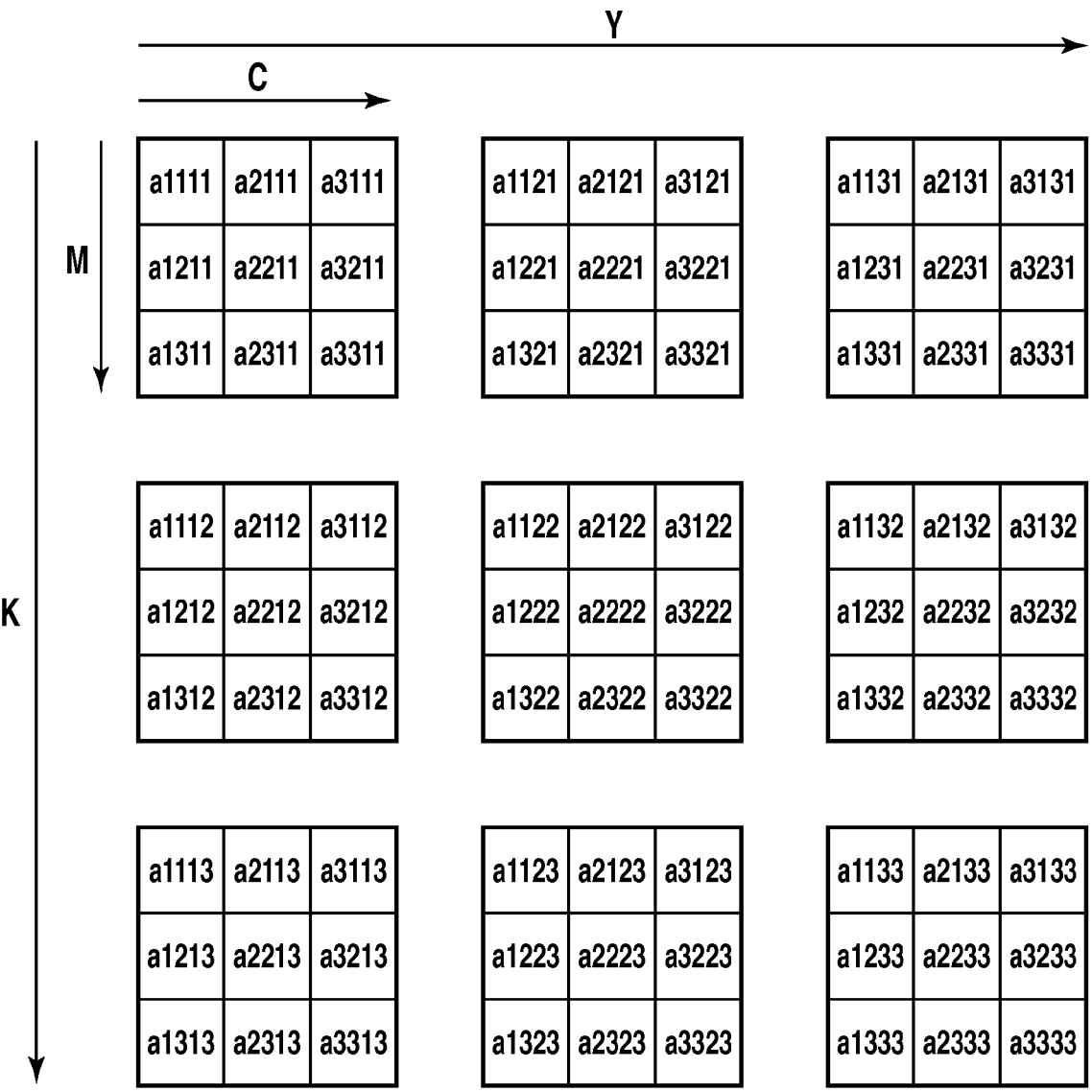
FIG. 34 is a diagram showing the structure of a filter according to third embodiment of the present invention.

FIG. 34 is a diagram showing the structure of the filter according to this embodiment. Preferably, filter coefficients a1111 to a3333 include the characteristic of a low-pass filter; however, these coefficients may include the characteristic of another filter. Assume that the coordinates of an input grid point is (C, M, Y, K)=(i, j, k, l). The filter shown in FIG. 34 changes C and Y transversely, and changes M and K vertically. And the output amount of the cyan colorant before smoothing is defined as C_ink(i, j, k, l), and the output amount of the cyan colorant after smoothing is defined as C_ink_sm (i, j, k, l). Also, the total of a1111 to a3333 is defined as sam. By using the filter in FIG. 34, smoothing is performed as follows for each image signal:

$$\begin{aligned}C\_ink\_sm(i,j,k,l) = \{&a1111 \times C\_ink(i-1, j-1, k-1, l-1) + \\&a2111 \times C\_ink(i, j-1, k-1, l-1) + a3111 \times C\_ink(i+1, j-1, k-1, l-1) + a1211 \times C\_ink(i-1, j, k-1, l-1) + a2211 \times C\_ink(i, j, k-1, l-1) + a3211 \times C\_ink(i+1, j, k-1, l-1) + a1311 \times C\_ink(i-1, j+1, k-1, l-1) + a2311 \times C\_ink(i, j+1, k-1, l-1) + a3311 \times C\_ink(i+1, j+1, k-1, l-1) + a1121 \times C\_ink(i-1, j-1, k, l-1) + a2121 \times C\_ink(i, j-1, k, l-1) + a3121 \times C\_ink(i+1, j-1, k, l-1) + a1221 \times C\_ink(i-1, j, k, l-1) + a2221 \times C\_ink(i, j, k, l-1) + a3221 \times C\_ink(i+1, j, k, l-1) + a1321 \times C\_ink(i-1, j+1, k, l-1) + a2321 \times C\_ink(i, j+1, k, l-1) + a3321 \times C\_ink(i+1, j+1, k, l-1) + a1131 \times C\_ink(i-1, j-1, k+1, l-1) + a2131 \times C\_ink(i, j-1, k+1, l-1) + a3131 \times C\_ink(i+1, j-1, k+1, l-1) + a1231 \times C\_ink(i-1, j, k+1, l-1) + a2231 \times C\_ink(i, j, k+1, l-1) + a3231 \times C\_ink(i+1, j, k+1, l-1) + a1331 \times C\_ink(i-1, j+1, k+1, l-1) + a2331 \times C\_ink(i, j+1, k+1, l-1) + a3331 \times C\_ink(i+1, j+1, k+1, l-1) + a1112 \times C\_ink(i-1, j-1, k-1, l) + a2112 \times C\_ink(i, j-1, k-1, l) + a3112 \times C\_ink(i+1, j-1, k-1, l) + a1212 \times C\_ink(i-1, j, k-1, l) + a2212 \times C\_ink(i, j, k-1, l) + a3212 \times C\_ink(i+1, j, k-1, l) + a1312 \times C\_ink(i-1, j+1, k-1, l) + a2312 \times C\_ink(i, j+1, k-1, l) + a3312 \times C\_ink(i+1, j+1, k-1, l) + a1122 \times C\_ink(i-1, j-1, k, l) + a2122 \times C\_ink(i, j-1, k, l) + a3122 \times C\_ink(i+1, j-1, k, l) + a1222 \times C\_ink(i-1, j, k, l) + a2222 \times C\_ink(i, j, k, l) + a3222 \times C\_ink(i+1, j, k, l) + a1322 \times C\_ink(i-1, j+1, k, l) + a2322 \times C\_ink(i, j+1, k, l) + a3322 \times C\_ink(i+1, j+1, k, l) + a1132 \times C\_ink(i-1, j-1, k+1, l) + a2132 \times C\_ink(i, j-1, k+1, l) + a3132 \times C\_ink(i+1, j-1, k+1, l) + a1232 \times C\_ink(i-1, j, k+1, l) + a2232 \times C\_ink(i, j, k+1, l) + a3232 \times C\_ink(i+1, j, k+1, l) + a1332 \times C\_ink(i-1, j+1, k+1, l) + a2332 \times C\_ink(i, j+1, k+1, l) + a3332 \times C\_ink(i+1, j+1, k+1, l) + a1113 \times C\_ink(i-1, j-1, k-1, l+1) + a2113 \times C\_ink(i, j-1, k-1, l+1) + a3113 \times C\_ink(i+1, j-1, k-1, l+1) + a1213 \times C\_ink(i-1, j, k-1, l+1) + a2213 \times C\_ink(i, j, k-1, l+1) + a3213 \times C\_ink(i+1, j, k-1, l+1) + a1313 \times C\_ink(i-1, j+1, k-1, l+1) + a2313 \times C\_ink(i, j+1, k-1, l+1) + a3313 \times C\_ink(i+1, j+1, k-1, l+1) + a1123 \times C\_ink(i-1, j-1, k, l+1) + a2123 \times C\_ink(i, j-1, k, l+1) + a3123 \times C\_ink(i+1, j-1, k, l+1) + a1223 \times C\_ink(i-1, j, k, l+1) + a2223 \times C\_ink(i, j, k, l+1) + a3223 \times C\_ink(i+1, j, k, l+1) + a1323 \times C\_ink(i-1, j+1, k, l+1) + a2323 \times C\_ink(i, j+1, k, l+1) + a3323 \times C\_ink(i+1, j+1, k, l+1) + a1133 \times C\_ink(i-1, j-1, k+1, l+1) + a2133 \times C\_ink(i, j-1, k+1, l+1) + a3133 \times C\_ink(i+1, j-1, k+1, l+1) + a1233 \times C\_ink(i-1, j, k+1, l+1) + a2233 \times C\_ink(i, j, k+1, l+1) + a3233 \times C\_ink(i+1, j, k+1, l+1) + a1333 \times C\_ink(i-1, j+1, k+1, l+1) + a2333 \times C\_ink(i, j+1, k+1, l+1) + a3333 \times C\_ink(i+1, j+1, k+1, l+1)\}/\text{sum}\end{aligned}$$

Likewise, the smoothing is performed in the same manner, while the output amount of the magenta colorant before smoothing is defined as M_ink(i, j, k, l), and the output amount of the magenta colorant after smoothing is defined as M_ink_sm(i, j, k, l); the output amount of the yellow colorant before smoothing is defined as Y_ink(i, j, k, l), and the output amount of the yellow colorant after smoothing is defined as Y_ink_sm(i, j, k, l); the output amount of the black colorant before smoothing is defined as K_ink(i, j, k, l) and the output amount of the black colorant after smoothing is defined as K_ink_sm(i, j, k, l); the output amount of the light cyan colorant before smoothing is defined as Lc_ink(i, j, k, l), and the output amount of the light cyan colorant after smoothing is defined as Lc_ink_sm(i, j, k, l); and the output amount of the light magenta colorant before smoothing is defined as Lm_ink(i, j, k, l), and the output amount of the light magenta colorant after smoothing is defined as Lm_ink_sm(i, j, k, l).

Here, since the values of the output amount of the individual colorants are changed through the smoothing process, the total colorant amount Amt(C, M, Y, K, Lc, Lm) for a grid point may exceed the target limit value for the total colorant amount. At step S3308, a check is performed to determine whether the total colorant amount for each grid point obtained after the smoothing process does not exceed the target limit value for the total colorant amount. In a case wherein the total colorant amount for the individual grid points do not exceed the total colorant limit value, the color separation table preparation processing is terminated. On the other hand, in a case wherein there is even one grid point for which the total colorant amount exceeds the total colorant amount limit value, program control is shifted to step 3309.

At step 3309, the target limit value for the total colorant amount is updated for the grid point where the total colorant amount limit value is exceeded. The target limit value to be updated for the total colorant amount is defined as AmtLIMIT'(C, M, Y, K)=α×AmtLIMIT(C, M, Y, K)(0<α<1). Then, as for the grid point where the limit value for the total colorant amount is, the target total colorant amount is designated as the AmtLIMIT'(C, M, Y, K), and program control repeats the processing from S3302 to S3308.

Through these processes, an accurate correction can be performed for the total colorant amount limit value, although the processes at S3302 to S3308 should be repeated for a case wherein α is a value near 1.

According to the above explanation, in a case wherein color separation is performed for ink, including light ink, and the values of the colorant output amount are changed through the smoothing process and are therefore exceed the limit value for the total colorant value, color separation is enabled, so that a correction is performed to prevent the total colorant value from exceeding the limit value.

That is, in a case wherein color dark and light separation is performed using another table, during the smoothing process, the colorant amount obtained using the table can not be correlated with each other. As a result, there is a case wherein the colorant amount obtained through the smoothing process are still not smoothly changed between the grid points (see, for example, patent document 5). Further, even when a table, based on which the amount of the colorants C, M, Y, K, Lc and Lm can be output in correlation with each other, can be taken into account, another problem below arises. During the smoothing process, correction is performed after the filtering process, so that the total colorant amount becomes equal to or smaller than the total colorant amount limit value. Thus, the value of the colorant amount is corrected after the filtering. Therefore, sometimes, after the smoothing process has ended, the total colorant amount becomes greater than the total colorant amount limit value.

Further, in a case wherein the smoothing process is performed, and thereafter, correction of the total colorant amount is performed for a grid point, at which the total colorant amount is exceeded, smoothness obtained by the previous smoothing process is deteriorated, and a quasi-contour occurs.

To cope with these problems, when the above described structure is employed, a table can be provided that enables color separation, so that the density characteristic to be output is maintained, and the total colorant amount does not exceed the total colorant amount limit value. Further, a table that enables color separation, so that smoothing and optimizing of four-dimensional gradation is performed, is maintained.

(Modification of Third Embodiment)

According to third embodiment, the smoothing process at step S3307 employing a low-pass filter, etc., has been performed for all of the colorants. However, according to the present invention, the smoothing process need not be performed for all the colorants, and depending on a dark and light color separation process method, the smoothing process may be performed for only a specific colorant, or a plurality of selected colorants.

For example, since the correction process is not performed for a black colorant, the smoothing process may not be performed.

(Fourth Embodiment)

According to fourth embodiment of the present invention, a color separation process taking glossiness into account is performed, in addition to the color separation performed in first, second and third embodiments described above, to convert the colorant values of four colorants C, M, Y and K into the colorant values of six colorants of C, M, Y, K, Lc and Lm.

Specifically, in a case wherein, when color separation is not performed while taking into account the glossiness of a recorded image, the glossiness characteristic is changed in accordance with the colorant amount, the glossiness may become uneven, and the image quality would be deteriorated.

That is, since the color separation is performed only for reproducing the target density characteristic, and not for providing the glossiness characteristic, reproduction of the glossiness may be degraded, for example, in an electrophotographic image.

Therefore, in the present invention, a table can be provided with which a color separation process is performed while taking into account the glossiness characteristic of a colorant, so that an output density characteristic and an output glossiness characteristic are maintained, and the total colorant amount does not become greater than the total colorant amount limit value. Further, color separation can be performed, while the smoothing and optimizing of four-dimensional gradation is maintained.

Figure 35:
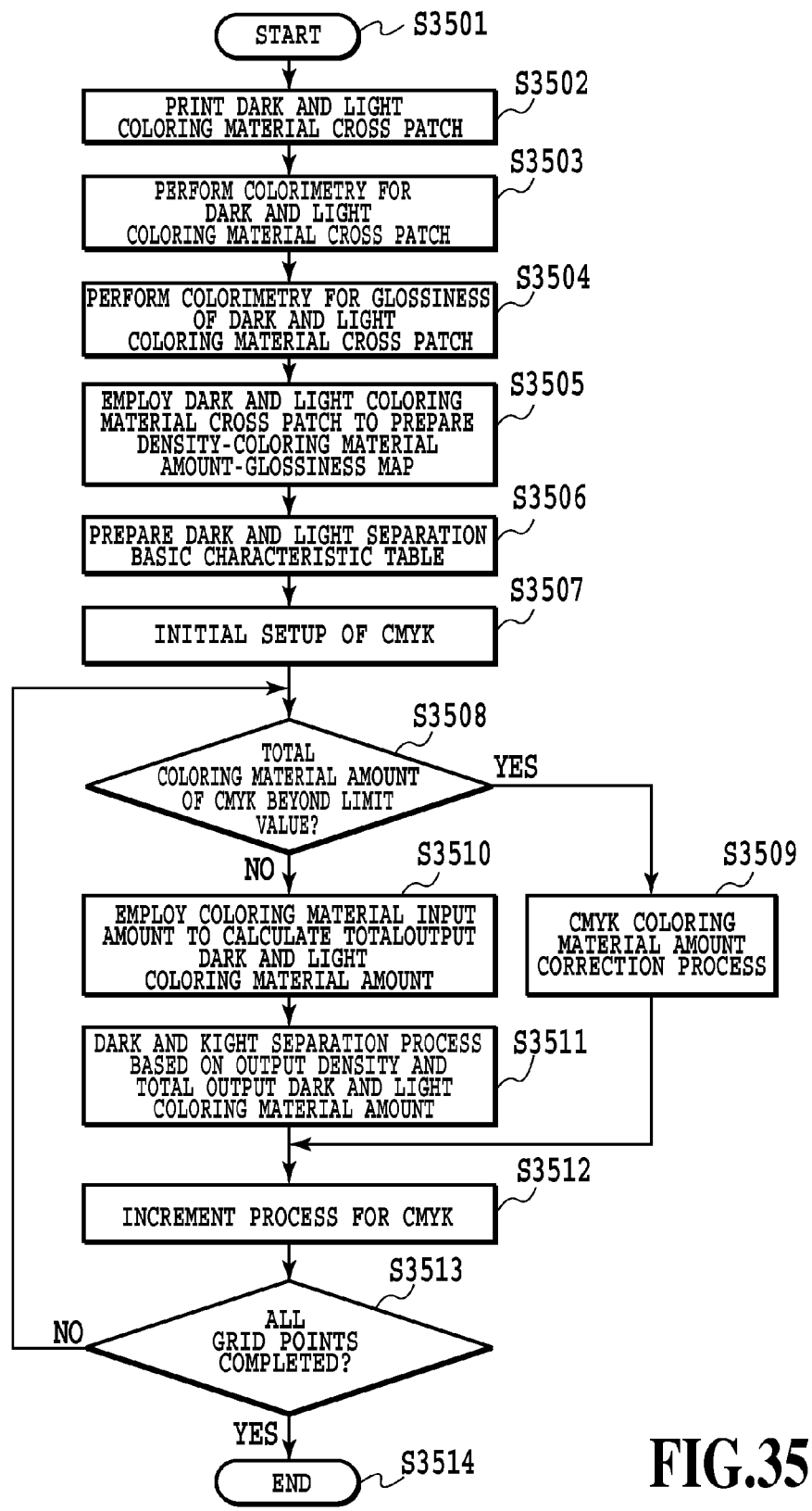
FIG. 35 is a flowchart for preparing a 46 conversion table according to forth embodiment of the present invention.

FIG. 35 is a flowchart showing the color separation processing by taking the glossiness characteristic into account to convert the colorant values of four colorants of C, M, Y and K, which are basic colors, into the colorant values of six colorants of C, M, Y, K, Lc and Lm, including light colors.

The flowchart in FIG. 35 is to be performed for preparation of a color separation table for this embodiment. Step 3501 is a start step to start preparation of a 46 color conversion/separation table.

Step S3502 is a step of printing a dark and light colorant cross patch, and as in the above described embodiments, a cross patch shown in FIG. 4 is printed.

Step S3503 is a step of performing colorimetry for the dark and light colorant cross patch printed at step S3502.

A colorimetry device is employed for measurement, and a density characteristic is obtained.

Step S3504 is a step of measuring the glossiness of the dark and light colorant cross patch printed at step S3502. When the glossiness of the dark and light cross patch is measured, the consonant glossiness characteristic can be obtained.

Step S3505 is a step of employing the density characteristic and the glossiness characteristic, obtained at steps S3503 and S3504, to prepare a density-colorant map (second map) and a glossiness-colorant amount map (first map).

Figure 36:
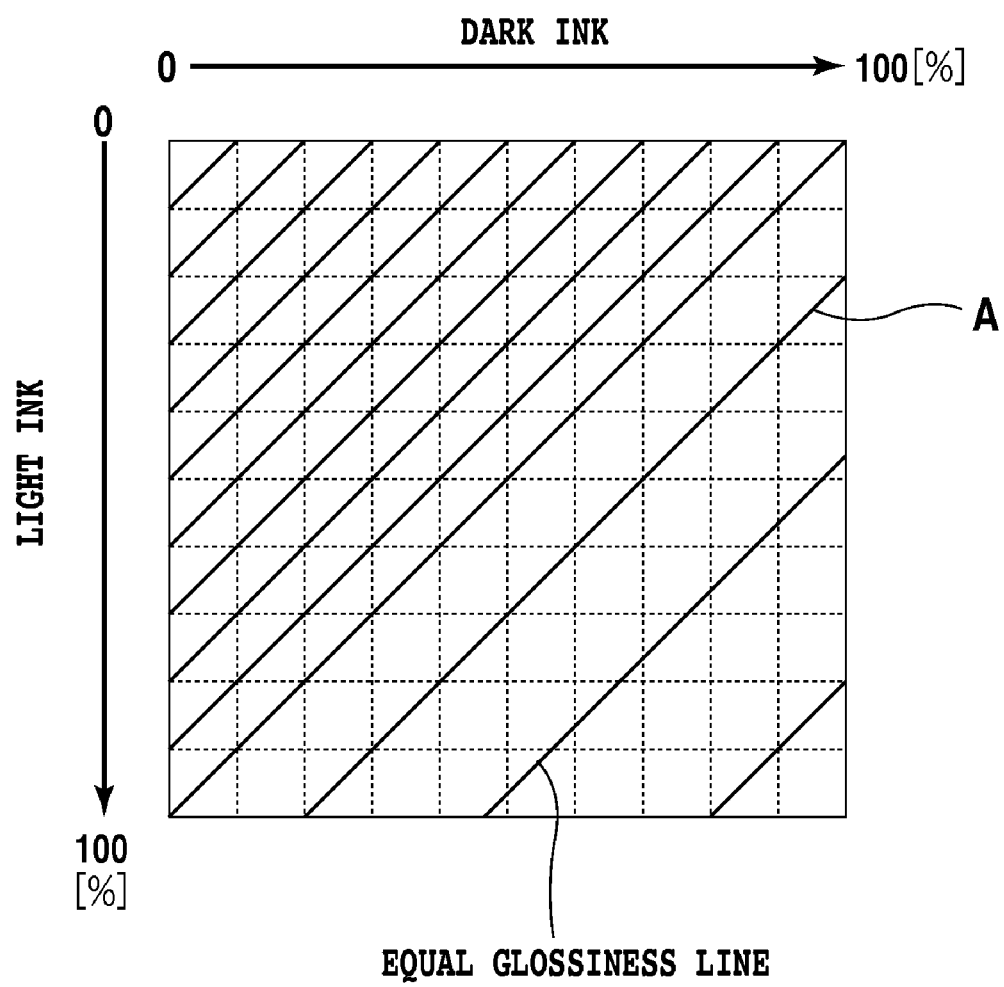
FIG. 36 is a diagram showing a map representing a glossiness and a colorant amount according to forth embodiment of the present invention.
Figure 37:
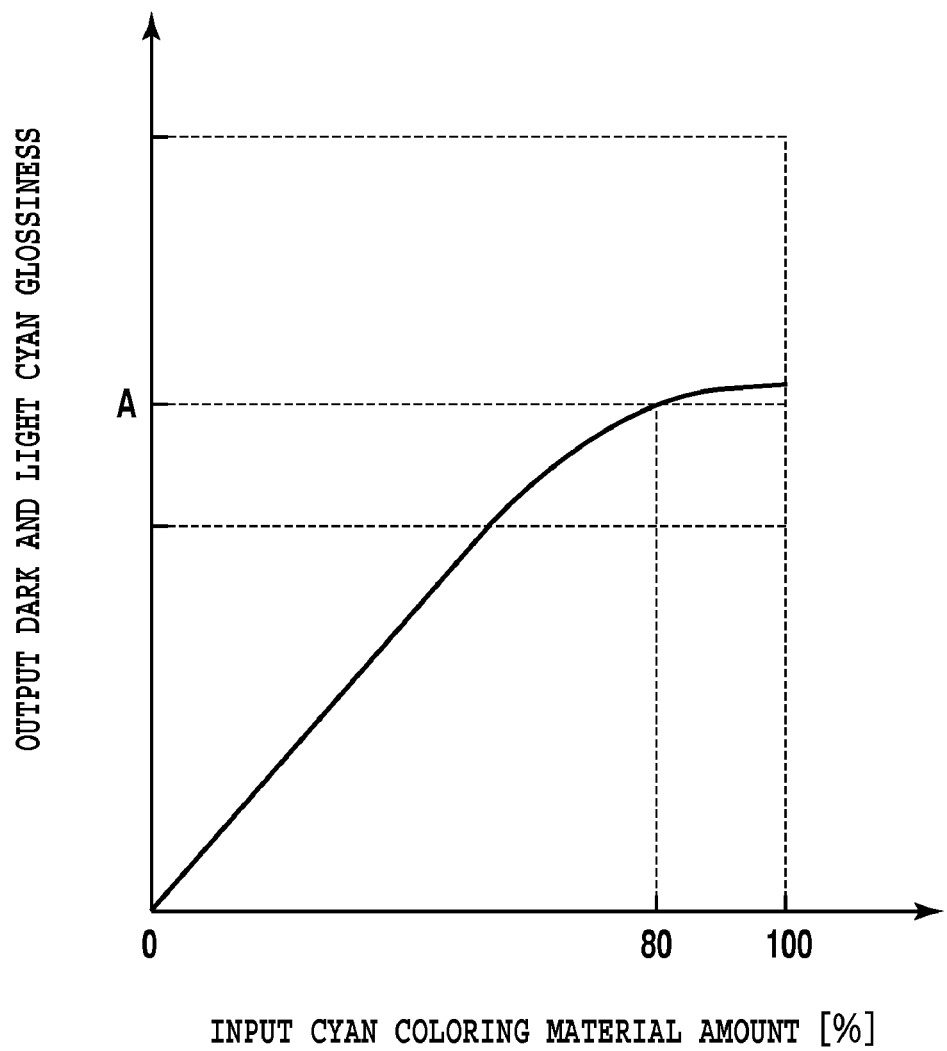
FIG. 37 is a diagram showing a table that defines a relationship between dark ink and a glossiness output characteristic according to forth embodiment of the present invention.

FIG. 36 is a diagram showing an example glossiness-colorant amount map (first map) prepared at step S3505. The density of dark ink is indicated by the horizontal axis, and the density of light ink is indicated by the vertical axis. And points at which colors with the same glossiness are reproduced by using dark ink and light ink are connected by a line, and this line is defined as an equal glossiness line.

The same density-colorant amount map as in FIG. 5 is prepared at step S3505. That is, the equal total colorant amount line and the equal density line are defined in the map.

Step S3506 is a step of preparing a dark and light separation, basic characteristic table. This dark and light color separation, basic characteristic table is referred to as a basic table when the total output dark and light colorant amount calculation unit 102 in FIG. 1 calculates a density to be output and the colorant amount of dark ink (C or M) to be output and the colorant amount of light ink (Lc or Lm). That is, relative to the colorant amount (input dark colorant amount) (0% to 100%) of input dark ink, the colorant amount of output dark ink and the colorant amount of light ink are defined in consonance with the output density characteristic and the output glossiness characteristic.

FIGS. 37, 39, 41, 43 and 45 are tables that define an example relationship between colorant amount data for dark ink, which is to be entered in the dark and light color separation basic table, and the output glossiness characteristic. In the tables, the horizontal axis represents an output cyan colorant amount to be entered in the table, and the vertical axis represents the glossiness of dark and lights to be output based on the table. Each of these tables shows a relationship between the colorant amount data of dark cyan input and the glossiness of cyan dark and light output. The same tables are applied for a relationship between the colorant amount data for input dark magenta and the glossiness of output magenta dark and light.

Further, FIGS. 38, 40, 42, 44 and 46 are dark and light color separation basic tables prepared at step S3506.

The dark and light color separation basic tables define a relationship between the colorant amount data for input dark ink and the characteristic of a colorant output amount. In the table, the horizontal axis represents a colorant amount to be entered to the table, and the vertical axis represents the colorant amount to be output based on the table. In these drawings, the graphs for the output amount of a dark cyan colorant, the output amount of a light cyan colorant, the total output amount of the dark and light cyan colorants and the input amount of a cyan colorant are shown relative to the input amount of a cyan colorant. These basic tables are prepared based on the glossiness-colorant amount map in FIG. 36, which was prepared at step S3505, and by referring to the relationship shown in FIGS. 38, 40, 42 and 46 between the input density and the glossiness.

Assume that, for example, the glossiness in the case of an input cyan colorant amount of 80% is A. Then, the equal glossiness line on which the glossiness is A is found by referring to FIG. 36. As is apparent from FIG. 36, the same glossiness is obtained when the total of the dark ink and the light ink is the same. Therefore, the total output amount of the dark and light cyan colorants is obtained in consonance with the equal glossiness line at the glossiness A. In this manner, the relation of the total output amount of the dark and light cyan colorants, relative to the input amount of the cyan colorant, can be obtained.

These tables indicate a relationship between the colorant amount data for dark cyan ink input and the output amount of dark cyan and light cyan colorants. The same tables are applied for a relationship between the colorant amount data for input dark magenta ink and the output amount of dark magenta and light magenta colorants.

FIGS. 37 to 40 are tables showing a relationship in that the density characteristic reproduced using output colorant dark and lights is equal to the density characteristic of the input colorant amount. That is, in FIG. 10, referred to in first embodiment, the density characteristic indicated by the density of input dark cyan is provided. On the other hand, FIGS. 41 to 46 are tables showing a relationship that the density characteristic reproduced using output colorant dark and lights is greater than the density characteristic of the colorant amount input. That is, referring to FIG. 10, the density characteristic indicated by the corrected cyan dark and light density is provided. In this case, since the density characteristic represented by the dark and light colorants is greater, the color reproduction range to be output can be extended.

Figure 38:
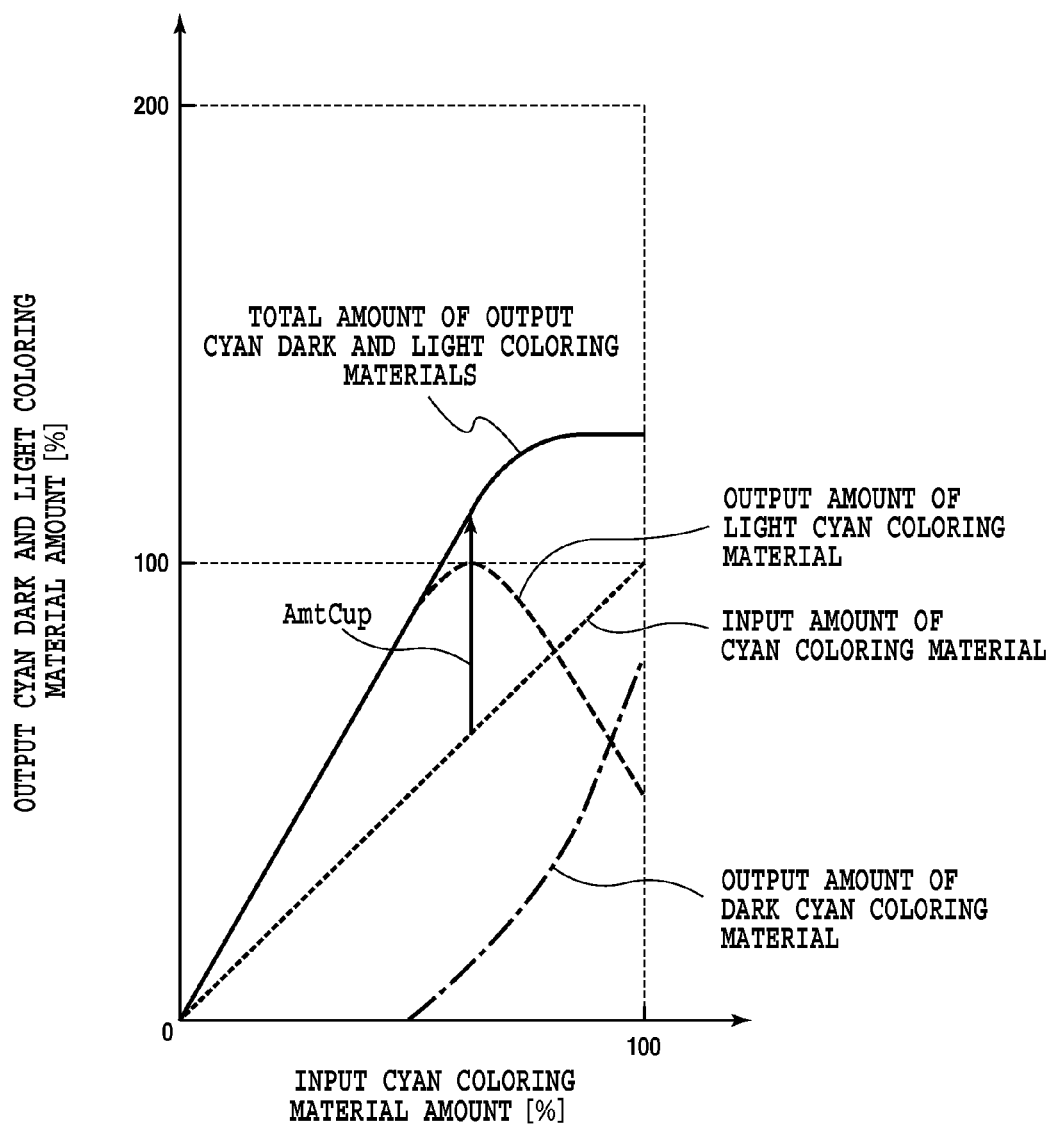
FIG. 38 is a diagram showing a table that defines a relationship between dark ink and a colorant amount output characteristic according to forth embodiment of the present invention.
Figure 39:
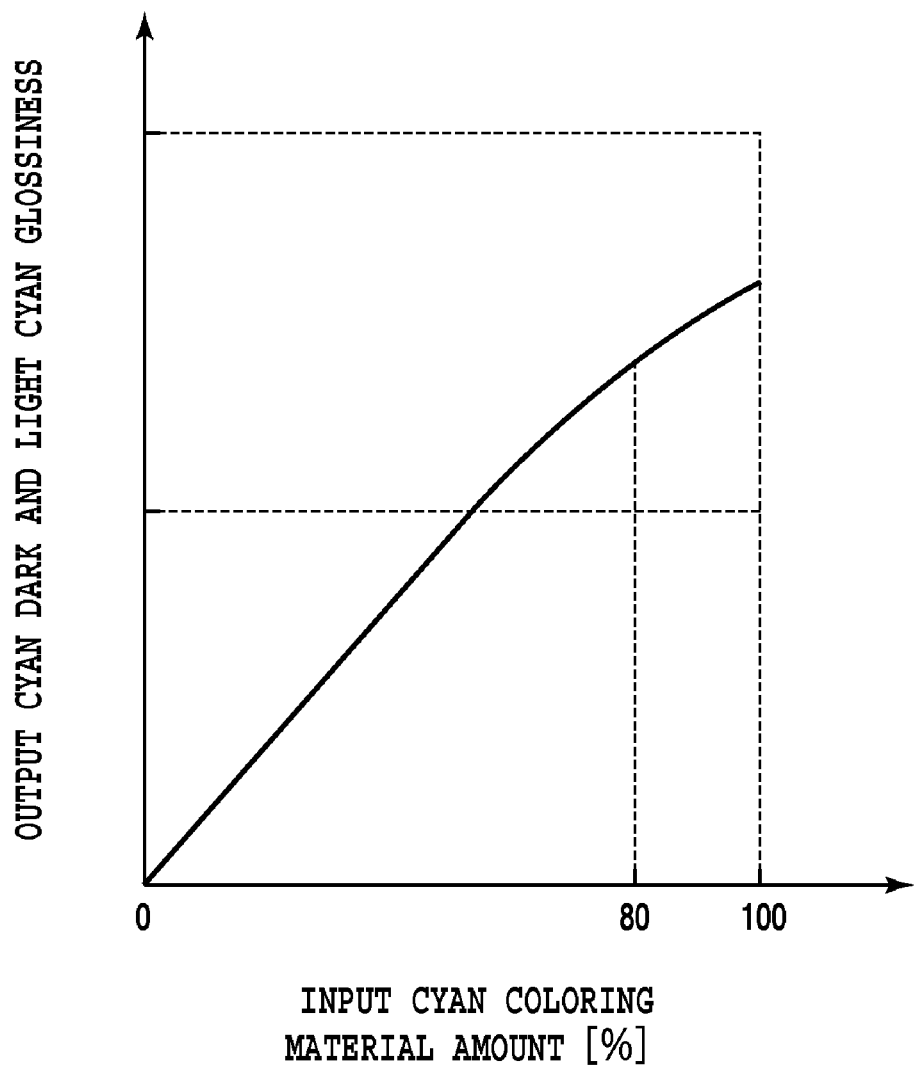
FIG. 39 is a diagram showing a table that defines a relationship between dark ink and an glossiness characteristic output according to forth embodiment of the present invention.

Since the input/output density characteristics are the same in the table in FIG. 38, the output density characteristic is the one indicated by the input cyan density in FIG. 10. Referring to FIG. 38, as described above, the total amount of the cyan dark and light colorants output is obtained based on the glossiness characteristic in FIG. 37 and the glossiness-colorant amount map in FIG. 36.

And the output amount of the dark cyan colorant and the output amount of the light cyan colorant are obtained based on the thus obtained total amount of the cyan dark and light colorants output and the output density in FIG. 10 described above, and in accordance with the density-colorant amount map in FIG. 5.

The type shown in FIG. 38 is such a type that, while the input and output density characteristics are identical, the glossiness characteristic is saturated on the way, but is monotonously increased in accordance with the increase in the amount of the cyan colorant input. Further, the total amount of the cyan dark and light colorants output is also monotonously increased, although it is saturated on the way.

Therefore, printing with comparatively low glossiness can be provided, while consumption of the colorant amount is prevented in a high density area.

Figure 40:
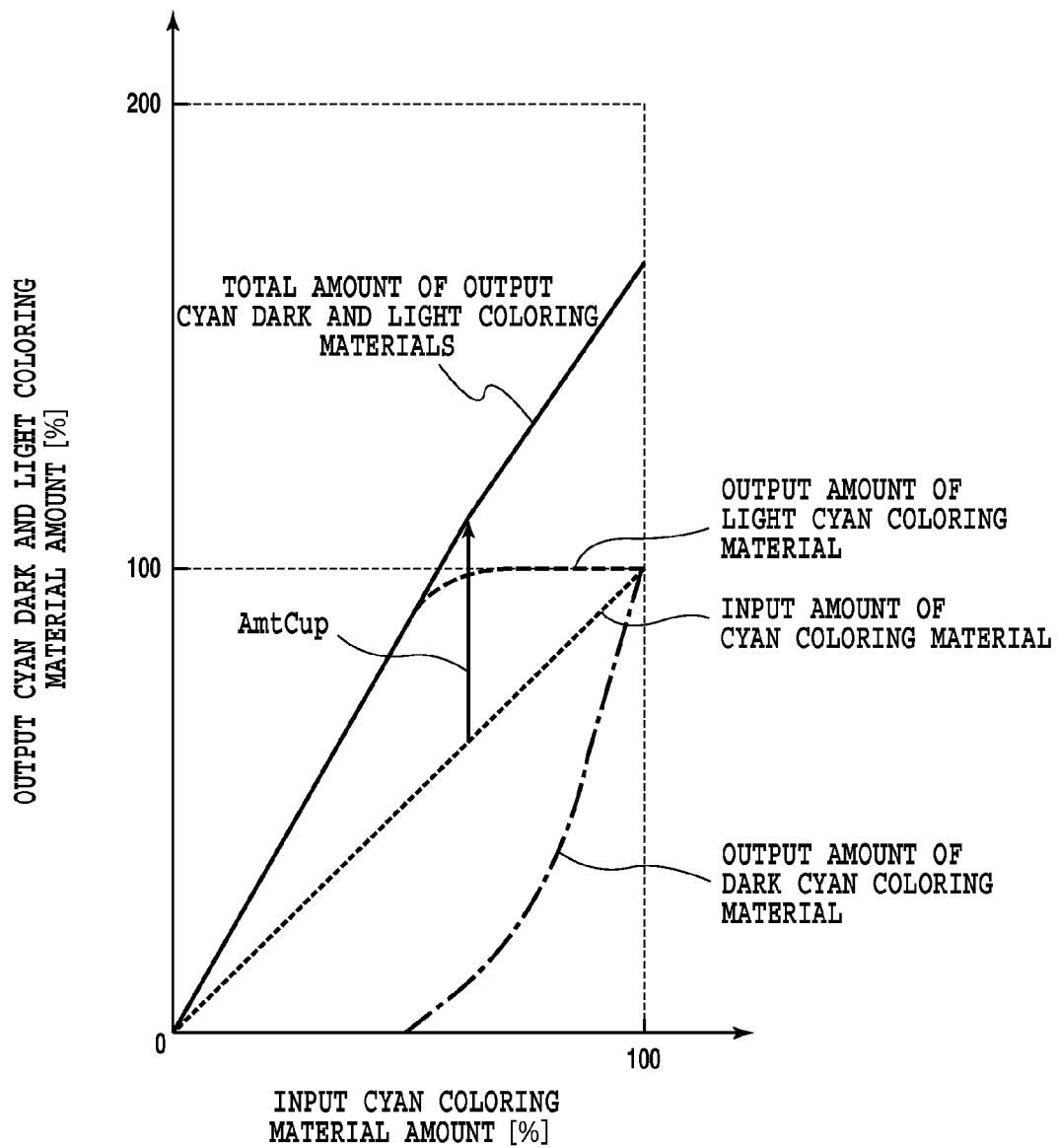
FIG. 40 is a diagram showing a table that defines a relationship between dark ink and a colorant output amount characteristic according to forth embodiment of the present invention.
Figure 41:
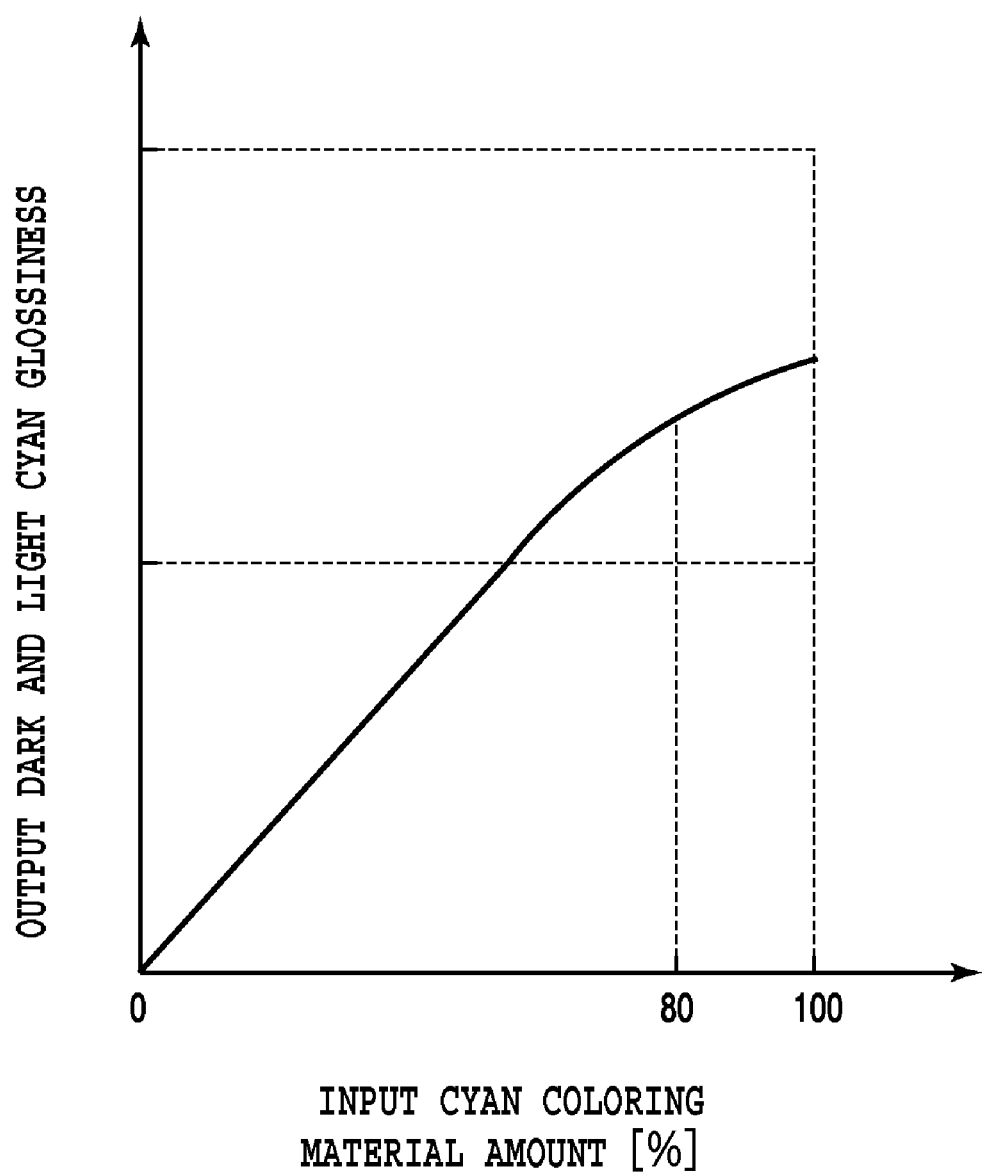
FIG. 41 is a diagram showing a table that defines a relationship between dark ink and a glossiness output characteristic according to forth embodiment of the present invention.

According to the table shown in FIG. 40, as well as in FIG. 38, since the input/output density characteristics are identical, the output density characteristic is as indicated by the density of dark cyan input in FIG. 10. The type shown in FIG. 40 is such a type that, while the input/output density characteristics are identical, the glossiness characteristic is monotonously increased, without being saturated on the way, in accordance with the increase in the amount of the input cyan colorant. Further, the total output amount of cyan dark and light colorants is also monotonously increased to the end, without being saturated. Therefore, printing at high glossiness can be provided with consumption of the colorant amount being increased in a high density area.

Figure 42:
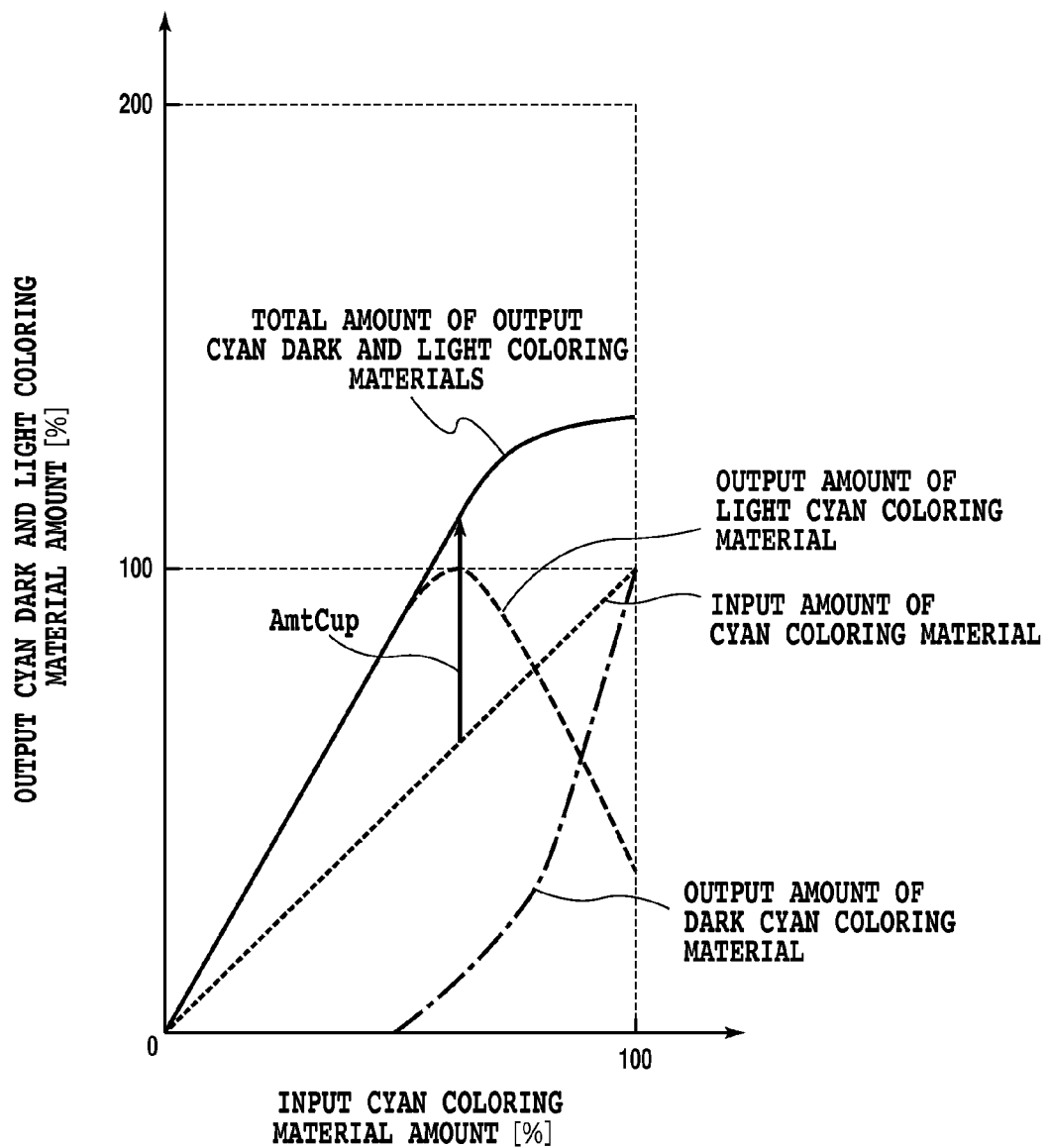
FIG. 42 is a diagram showing a table that defines a relationship between dark ink and a colorant output amount characteristic according to forth embodiment of the present invention.
Figure 43:
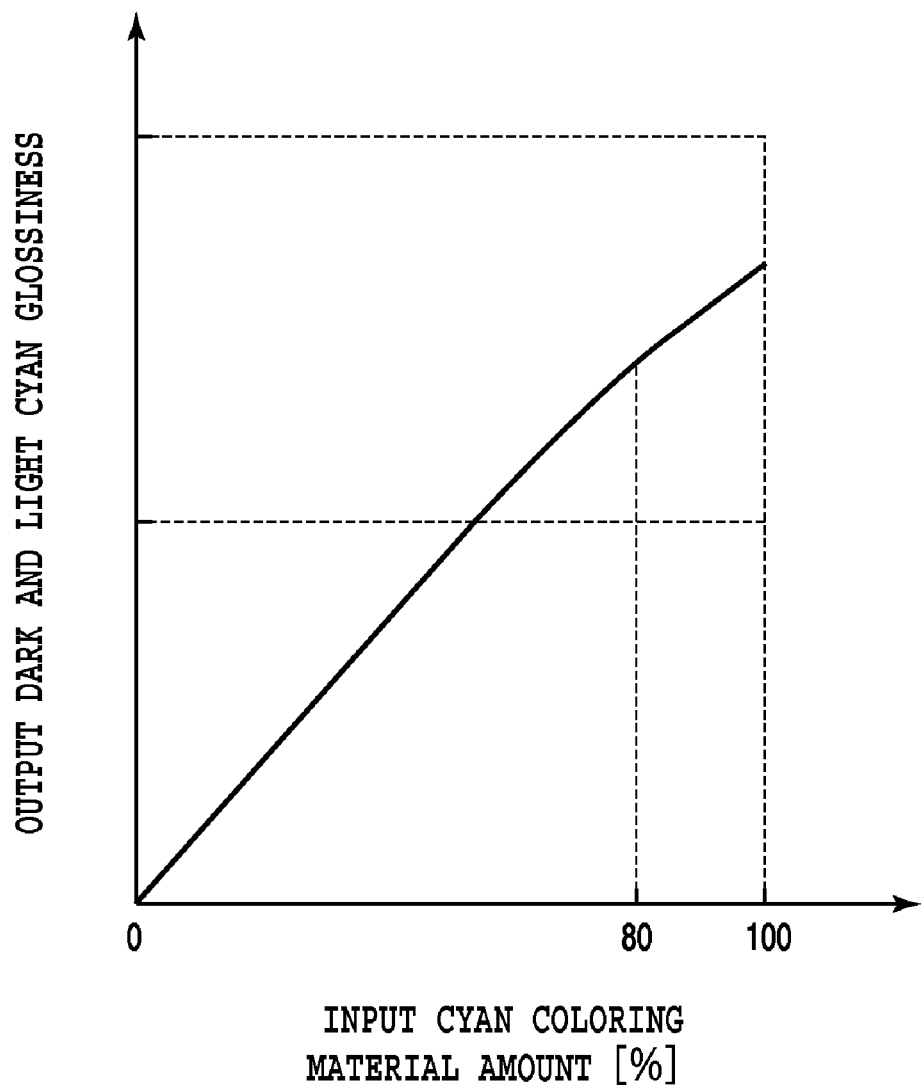
FIG. 43 is a diagram showing a table that defines a relationship between dark ink and a glossiness output characteristic according to forth embodiment of the present invention.

According to the table in FIG. 42, since the output density characteristic is greater than the input density characteristic, the density characteristic indicated by the corrected cyan dark and light density shown in FIG. 10 is obtained.

The type shown in FIG. 42 is such a type as is characterized in that the output density characteristic is greater than the input density characteristic, and that the glossiness characteristic is monotonously increased, although it is saturated on the way. Furthermore, the total amount of cyan dark and light colorants is also monotonously increased, although it is saturated on the way. Therefore, printing at a comparatively low glossiness can be provided, while consumption of the colorant amount is suppressed in a high density area.

Figure 44:
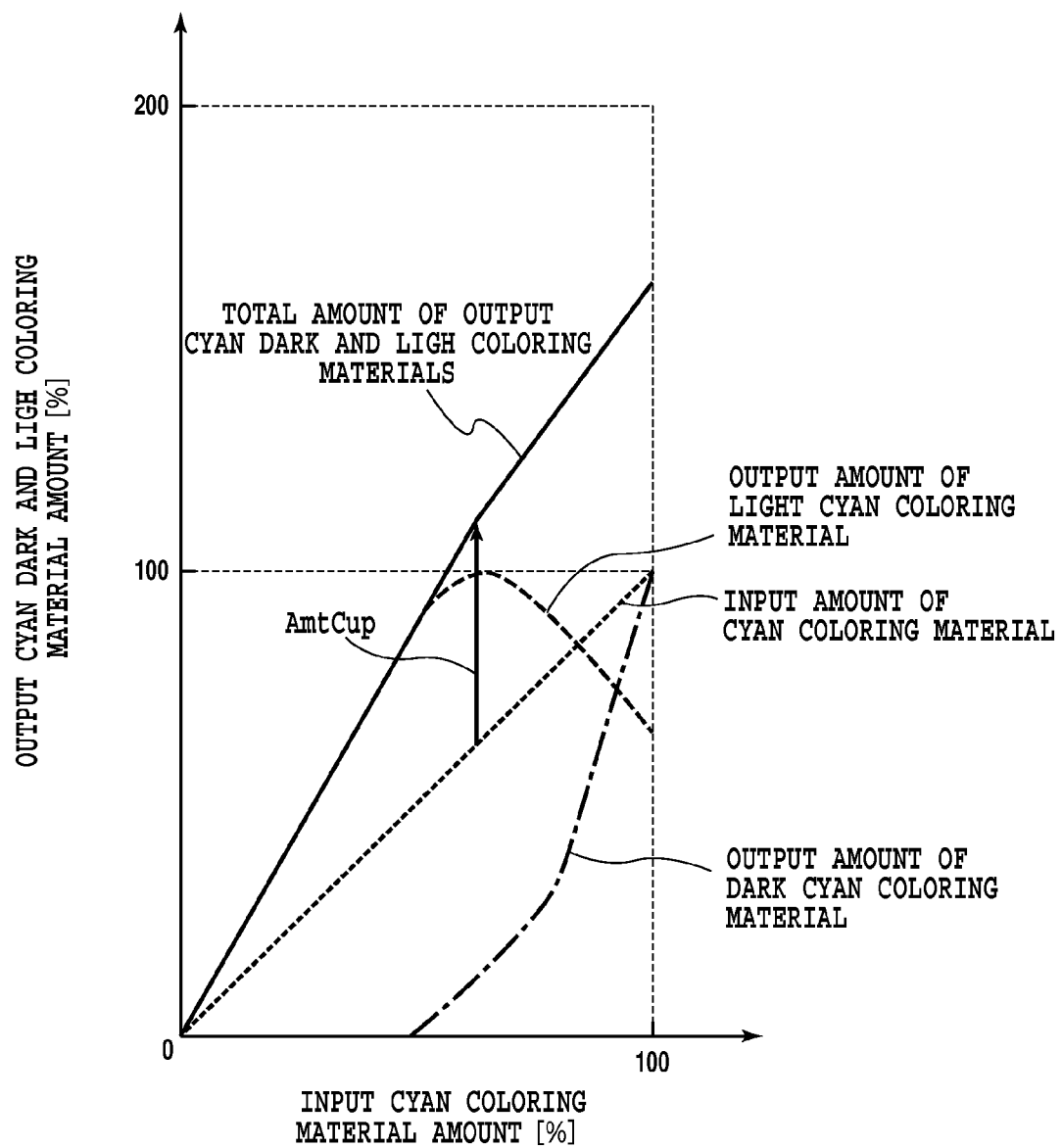
FIG. 44 is a diagram showing a table that defines a relationship between dark ink and a colorant output amount characteristic according to forth embodiment of the present invention.
Figure 45:
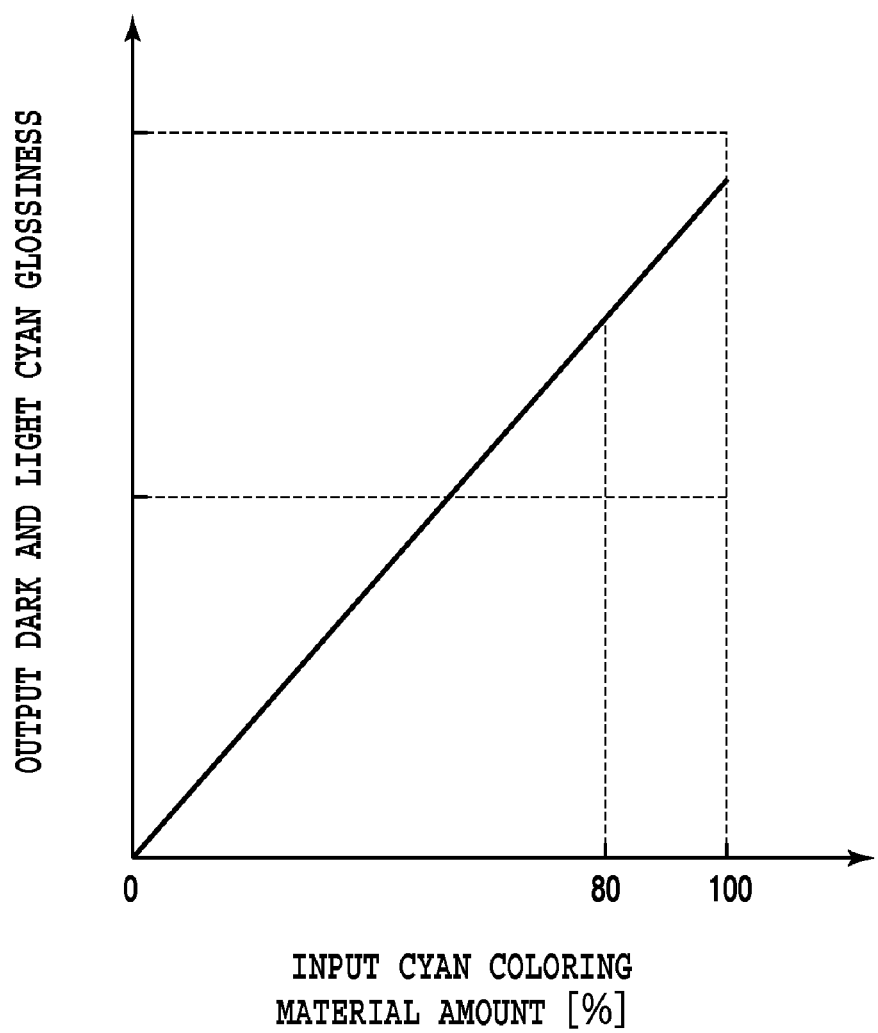
FIG. 45 is a diagram showing a table that defines a relationship between dark ink and a glossiness output characteristic according to forth embodiment of the present invention.

According to the table shown in FIG. 44, as well as in FIG. 42, since the output density characteristic is greater than the input density characteristic, the density characteristic indicated by the corrected cyan dark and light density shown in FIG. 10 is obtained. The type in FIG. 44 is a type characterized in that the output density characteristic is greater than the input density characteristic, and in that the glossiness characteristic is monotonously increased, without being saturated on the way. Moreover, the total amount of the cyan dark and light colorants output is also monotonously increased without being saturated on the way, but the colorant is not consumed until the maximum colorant amount is reached.

Therefore, printing at medium glossiness can be provided, while consumption of the colorant amount is slightly suppressed in a high density area.

Figure 46:
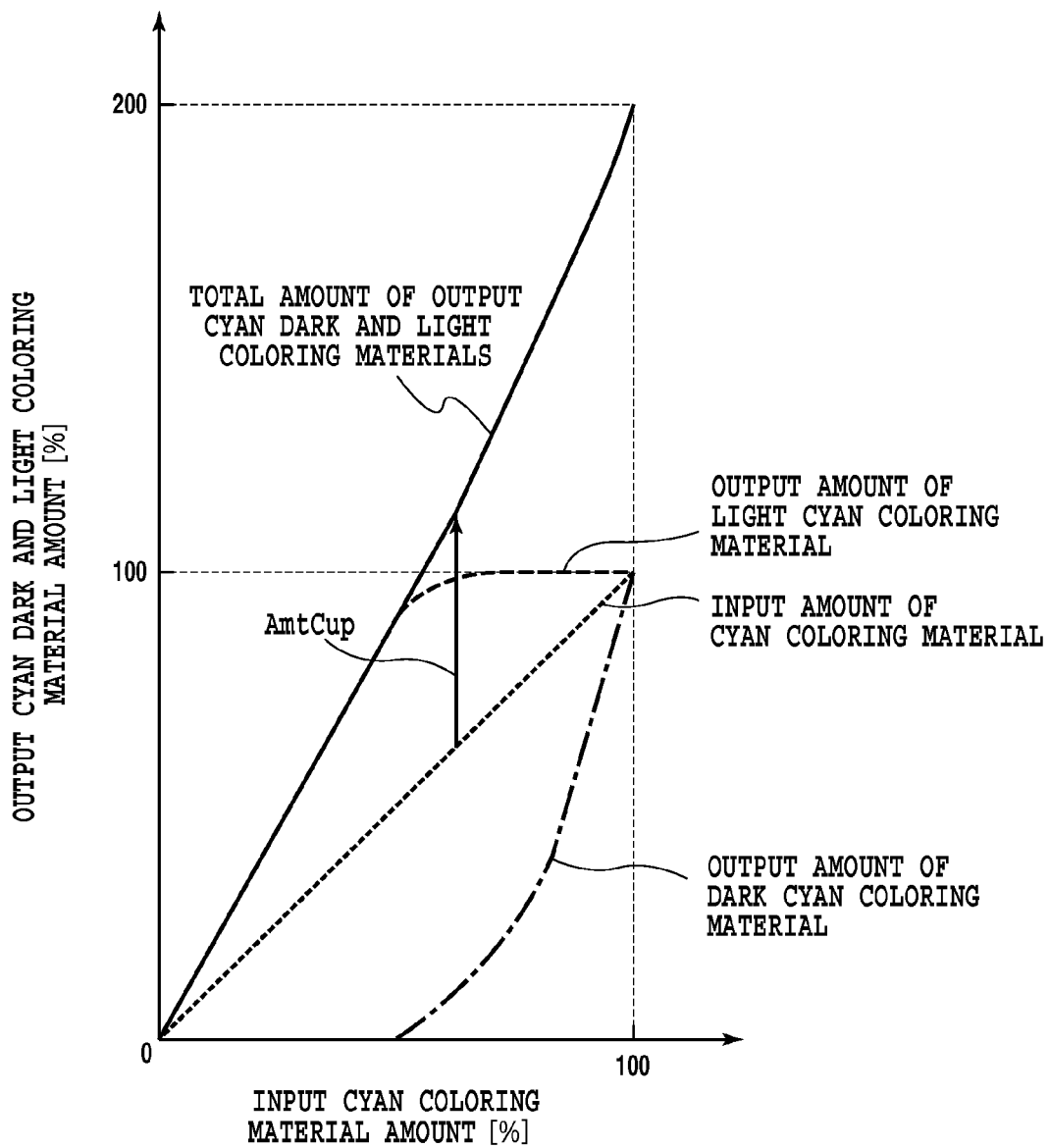
FIG. 46 is a diagram showing a table that defines a relationship between dark ink and a colorant output amount characteristic according to forth embodiment of the present invention.

According to the table in FIG. 46, as well as in FIGS. 42 and 44, since the output density characteristic is greater than the input density characteristic, the density characteristic indicated by the corrected cyan dark and light density shown in FIG. 10 is obtained. The type in FIG. 46 is a type characterized in that the output density characteristic is greater than the input density characteristic, and in that the glossiness characteristic is monotonously increased until it reaches the maximum glossiness, without being saturated on the way. Further, the total amount of the cyan dark and light colorants output is also monotonously increased without being saturated on the way, and this colorant is consumed until the maximum colorant amount is reached. Therefore, printing at high glossiness can be provided, although a large colorant amount is consumed in the high density area.

And at steps S3107 to S3114 in FIG. 35, a color dark and light separation, basic characteristic table is prepared in the same manner as the above described embodiments, and the colorant amount at the individual grid points are calculated.

As described above, in the case for the performance of color separation for ink, including light ink, the density characteristic and the glossiness characteristic that are output and the total colorant amount of dark ink and light ink that are output are employed, and color separation can be performed to convert RGB image signals into colorants, including dark ink and light ink.

Specifically, in patent document 5, for example, color separation is not performed while taking into account the glossiness of a recorded image. Thus, in a case wherein the glossiness characteristic is changed in accordance with the colorant amount, the glossiness may become uneven, and the image quality become deteriorated. Since this color separation is performed only for reproducing the target density characteristic, and not for providing the glossiness characteristic, reproduction of the glossiness may be degraded, for example, in an electrophotographic image.

In order to cope with these problems, with the above described arrangement, a table can be provided with which a color separation process is performed while taking into account the glossiness characteristic of a colorant, so that an output density characteristic and an output glossiness characteristic are maintained, and the total colorant amount does not become greater than the total colorant amount limit value. Further, color separation can be performed, while the smoothing and optimizing of a four-dimensional gradation is maintained.

(Modification 1 of Fourth Embodiment)

In the above embodiment, the same value has been employed for the total colorant amount limit value AmtLIMIT at step S3508. However, different values may be employed as the total colorant amount limit value AmtLIMIT.

For example, assume a case wherein the total colorant amount limit value is 250%. The total colorant amount limit value is 250% when the total colorant input amount is 100%, while on the other hand, the total colorant amount limit value may be 200% when the total input colorant amount is 150%. That is, at step S3509, a correction is uniformly performed in a case wherein the total input colorant amount exceeds the total colorant amount limit value. On the other hand, since, at step S3510, the total input colorant amount does not exceed the total colorant amount limit value, dark and light colorant color separation is performed up to the increasable value of the total colorant amount. Therefore, a case occurs wherein, when the total input colorant amount is increased, the glossiness is lowered.

Figure 47:
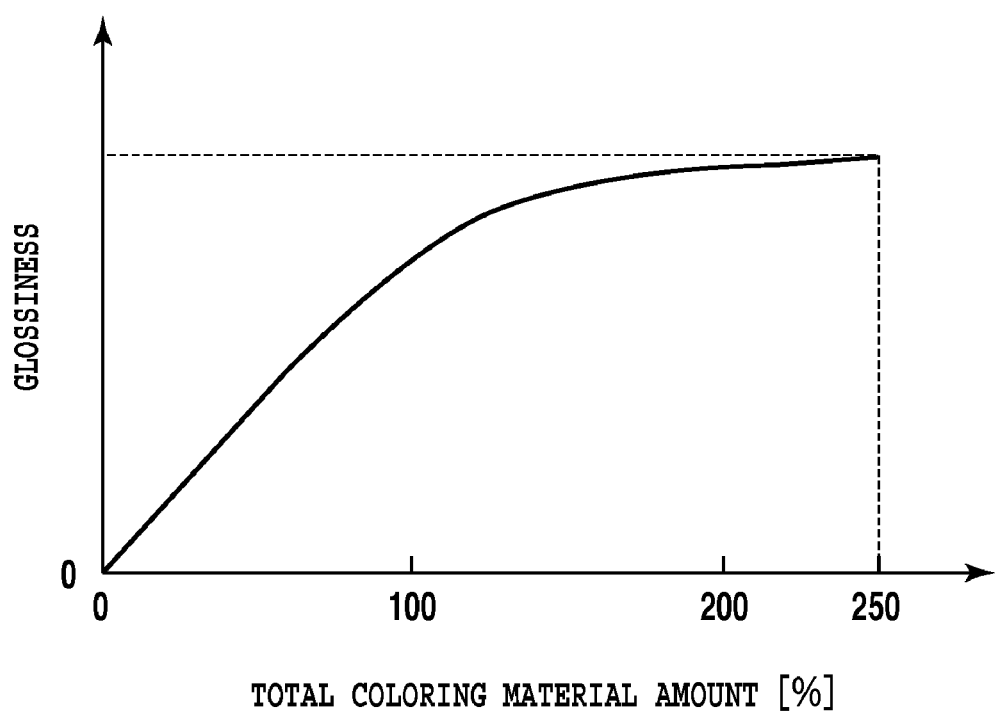
FIG. 47 is a diagram showing another relationship between a total colorant amount and glossiness according to forth embodiment of the present invention.

FIG. 47 is a diagram showing a relationship between the total colorant amount limit value and glossiness. When the total colorant amount is obtained after the colorant dark and light separation is performed, the glossiness is also increased. Therefore, when the total input colorant amount is 100%, that is, when the total input colorant amount is 150% while the total colorant amount limit value is 250%, i.e., at the time of a total colorant amount limit value of 200%, the glossiness is reduced. Through this color separation, glossiness would become uneven in an image on a printing medium, and the glossiness of a recorded image may be deteriorated.

Figure 48:
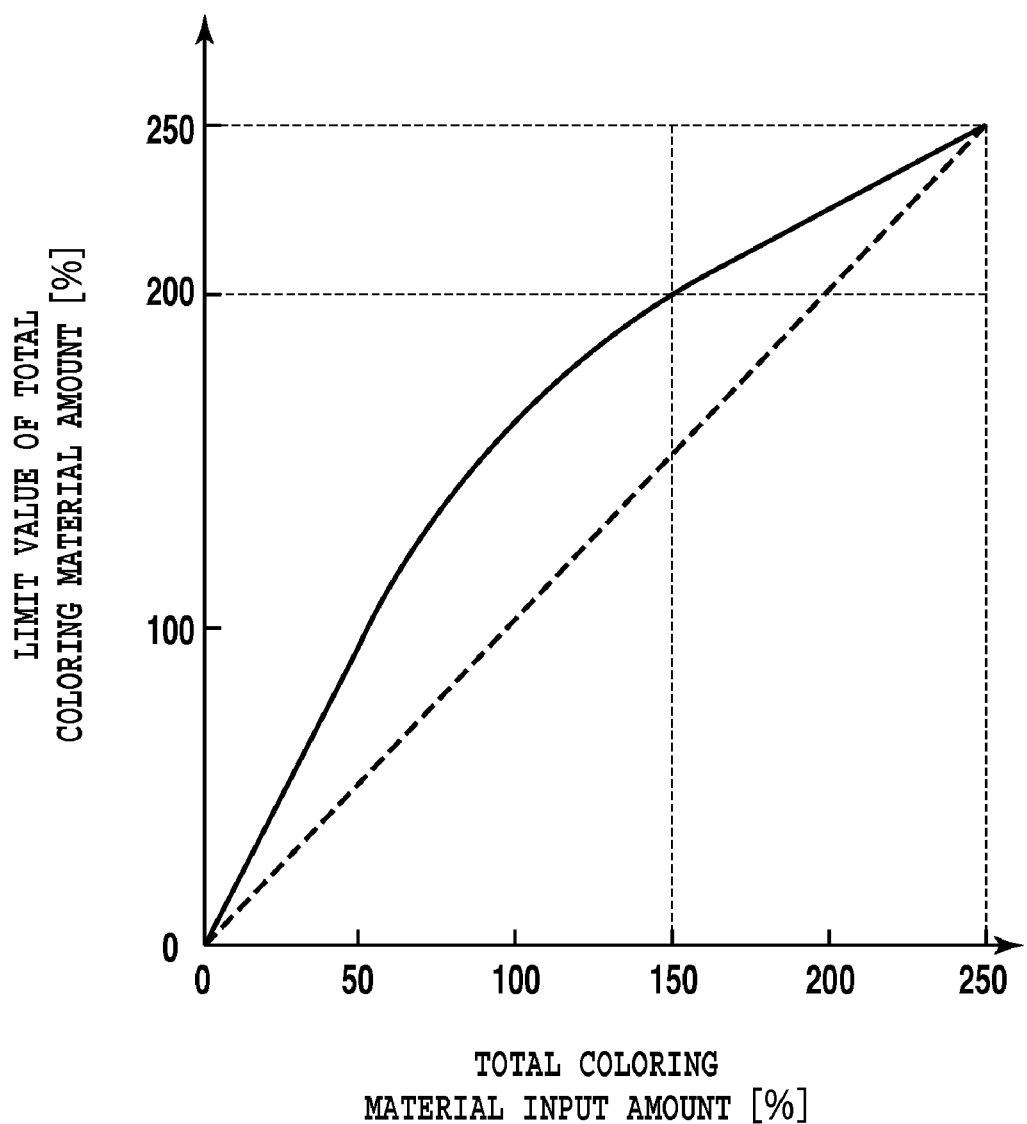
FIG. 48 is a diagram showing another relationship between a total colorant input amount and a total colorant amount limitation value according to forth embodiment of the present invention.
Figure 49:
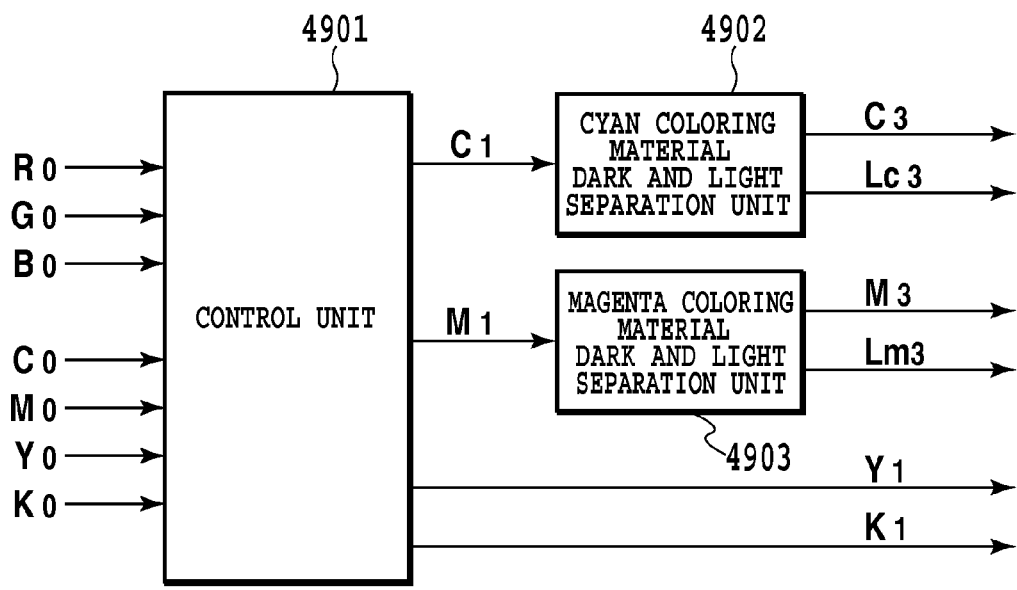
FIG. 49 is a block diagram showing an image processing configuration according to conventional art.
Figure 50:
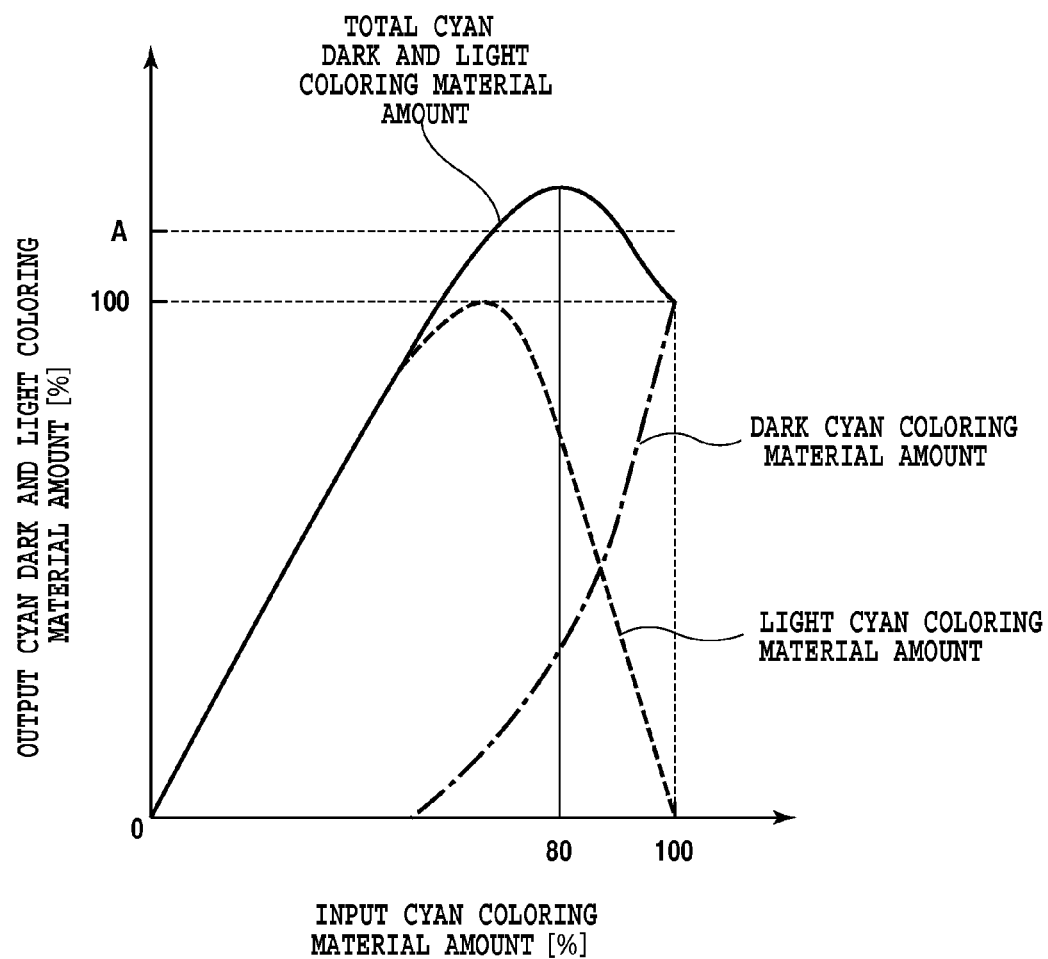
FIG. 50 is a diagram showing a color separation table according to the conventional art.

FIG. 48 is a graph showing an example relationship between the total colorant input amount and the corrected total colorant amount limit value AmtLIMIT2. At step S3519, the total colorant amount limit value AmtLIMIT2 is employed, instead of AmtLIMIT, which is used in the above embodiments, so that a smooth change of the total colorant amount is provided, and the image processing can be performed with uniform glossiness.

(Other Embodiment)

The present invention can be achieved by a program code that executes the functions of the above described embodiments and that performs the processing of the flowcharts shown in FIGS. 3, 15, 19, 32, 33 and 35, or by using a storage medium in which the program code is stored. Further, the present invention is also achieved by permitting the computer (or a CPU or an MPU) of a system or an apparatus to read and execute the program code on a storage medium. In this case, the program code read from the storage medium provides the functions of the embodiments, and the program code and the storage medium on which the program code is recorded constitutes the present invention.

The storage medium for supplying the program code can, for example, be a floppy (registered trademark) disk, a hard disk, an optical disk, a magneto-optical disk, a CD-ROM, a CD-R, a magnetic tape, a non-volatile memory card or a ROM.

Further, not only the functions of the above embodiments are provided by executing program code read by a computer, but also, based on the instructions provided by the program code, the OS operated by the computer may actually perform part or all of the processes.

Furthermore, the program code may be written in a memory prepared on a function extension board inserted into the computer or in a function extension unit connected to the computer, and based on the instructions contained in the program code, a CPU, etc., may actually perform part or all of the processes.

This application claims the benefit of Japanese Patent Application Nos. 2006-069604, filed Mar. 14, 2006, 2006-113379, filed Apr. 17, 2006, 2006-103402, filed Apr. 4, 2006 and 2007-039555, filed Feb. 20, 2007, which are hereby incorporated by reference herein in their entirety.

The invention claimed is:

1. A color separation method which is a process for converting an image signal into signals for colorants to be used by a printing apparatus, colorant value signals that include a colorant value for a dark colorant and a colorant value for a light colorant, said method comprising:

a step of calculating a total colorant amount for the dark colorant and the light colorant by employing a relationship between a total colorant amount limitation value and a colorant amount, used by the printing apparatus, that includes a colorant amount for a colorant other than the dark colorant and the light colorant, wherein, as the total colorant amount, a difference between a total colorant amount limit value and a total colorant amount before color separation is performed;

a step of employing the colorant amount before the color separation is performed, and calculating an increment available value for the total colorant amount of the dark colorant and the light colorant obtained after the color separation;

a step of adding the difference to the total colorant amount of the dark colorant and the light colorant, based on a ratio of the increment available value;

a step of calculating a density represented by a total of the dark colorant and the light colorant amount; and a step of employing the total colorant amount and the density to calculate the colorant value signals for the dark colorant and the light colorant.

2. A color separation method, which is a process for converting an image signal into signals for colorants to be used by a printing apparatus, colorant value signals that include a colorant value for a dark colorant and a colorant value for a light colorant, said method comprising:

a step of generating, for the primary color, the secondary color and the ternary color in a CMY space, a one-dimensional dark and light separation, basic characteristic table that defines input/output colorant amount ratio;

a step of calculating, for all the grid points in the CMY space, the input/output colorant amount ratio, and generating a three-dimensional dark and light separation, basic characteristic table;

a step of calculating a total colorant amount of the dark colorant and the light colorant by employing a relationship between a total colorant amount limit value and a colorant amount, which is obtained based on the three-dimensional dark and light separation, basic characteristic table and is used by the printing apparatus, which includes a colorant amount for a colorant other than the dark colorant and light colorant;

a step of calculating a density represented by a total of the dark colorant and the light colorant, based on the three-dimensional dark and light separation, basic characteristic table; and a step of employing the total colorant amount and the density to calculate the colorant value signals for the dark colorant and the light colorant.

3. A color separation method according to claim 2, wherein a setup of the one-dimensional dark and light separation, basic characteristic table is performed using a user interface.

4. A color separation method according to claim 3, wherein the setup is performed by adjusting a value of a colorant amount in a one-dimensional dark and light separation, basic characteristic table.

5. A color separation method according to claim 2, wherein a setup of the three-dimensional dark and light separation, basic characteristic table is performed using a user interface.

6. A color separation method according to claim 5, wherein the setup is performed by adjusting a value of a colorant amount in a three-dimensional dark and light separation, basic characteristic table.

7. A color separation method according to claim 2, wherein, based on a map that is prepared using colorimetry values obtained by performing colorimetry for a patch, the colorant value signal is obtained that uses the brightness and the total colorant amount.

8. A color separation method according to claim 2, wherein the step of generating the three-dimensional dark and light separation, basic characteristic table includes:
   a step of setting input grid point coordinates for grid points on a predetermined line that connects vertexes of a cube in a CMY space, and grid points inside the predetermined line;
   a step of employing the grid point coordinates to determine a belonging tetrahedron;
   a step of employing a primary line in the CMY space that includes a one-dimensional dark and light separation, basic characteristic table, and calculating colorant values for the surfaces of the tetrahedron that is determined; and
   a step of employing the primary line in the CMY space that includes a one-dimensional dark and light separation, basic characteristic table, and calculating colorant values for the inside of the tetrahedron that is determined.

9. A color separation method according to claim 2, wherein the step of generating the three-dimensional dark and light separation, basic characteristic table includes a step of:
   at least inputting a one-dimensional dark and light separation, basic characteristic table of the primary color.

10. A color separation method according to claim 2, wherein the step of generating the three-dimensional dark and light separation, basic characteristic table includes:
   a step of employing the one-dimensional dark and light separation, basic characteristic table for the primary color as a replacement when a one-dimensional dark and light separation, basic characteristic table for the ternary color is not input.

11. A color separation method according to claim 2, wherein the step of generating the three-dimensional dark and light separation, basic characteristic table includes:
   a step of employing the one-dimensional dark and light separation, basic characteristic table for the primary color as a replacement when a one-dimensional dark and light separation, basic characteristic table for the secondary color is not input.

12. A color separation method according to claim 2, wherein the colorant is ink.

13. A color separation method according to claim 2, wherein the colorant is toner.

14. A color separation method according to claim 2, wherein two types of dark and light colorants, including a dark colorant and a colorant with the same tone and a low density, are six dark and lights of colorants, including four colors of cyan, magenta, yellow and black, and light cyan and light magenta that have a lower density than cyan and magenta.

15. An image processing apparatus, which prepares a color separation table that is used for a process for converting an image signal into signals for colorants to be used by a printing apparatus, colorant value signals that include a colorant value for a dark colorant and a colorant value for a light colorant, said apparatus comprising:
   means for generating, for the primary color, the secondary color and the ternary color in a CMY space, a one-dimensional dark and light separation, basic characteristic table that defines colorant input/output amount ratio;
   means for calculating, for all the grid points in the CMY space, the colorant input/output amount ratio, and generating a three-dimensional dark and light separation, basic characteristic table;
   means for calculating a total colorant amount of the dark colorant and the light colorant by employing a relationship between a total colorant amount limit value and a colorant amount, which is obtained based on the three-dimensional dark and light separation, basic characteristic table and is used by the printing apparatus, that includes a colorant amount of a colorant other than the dark colorant and light colorant;
   means for, based on the three-dimensional dark and light separation, basic characteristic table, calculating a density represented by a total of the dark colorant and the light colorant; and
   means for employing the total colorant amount and the density to calculate the colorant value signals for the dark colorant and the light colorant.

16. A non-transitory computer-readable storage medium storing a program to cause a computer to perform a color separation process for converting an image signal into signals for colorants to be used by a printing apparatus, colorant value signals that include a colorant value for a dark colorant and a colorant value for a light colorant, wherein the color separation process comprises:
   a step of generating, for the primary color, the secondary color and the ternary color in a CMY space, a one-dimensional dark and light separation, basic characteristic table that defines colorant input/output amount ratio;
   a step of calculating, for all the grid points in the CMY space, the colorant input/output amount ratio, and generating a three-dimensional dark and light separation, basic characteristic table;
   a step of calculating a total colorant amount of the dark colorant and the light colorant by employing a relationship between a total colorant amount limit value and a colorant amount, which is obtained based on the three-dimensional dark and light separation, basic characteristic table and is used by the printing apparatus, that includes a colorant amount of a colorant other than the dark colorant and light colorant;
   a step of calculating a density represented by a total of the dark colorant and the light colorant, based on the three-dimensional dark and light separation, basic characteristic table; and
   a step of employing the total colorant amount and the density to calculate the colorant value signals for the dark colorant and the light colorant.

* * * * *